(12) United States Patent
Bourhis et al.

(10) Patent No.: US 11,737,398 B2
(45) Date of Patent: Aug. 29, 2023

(54) FLUIDIZED BED EXTRACTORS FOR CAPTURE OF CO2 FROM AMBIENT AIR

(71) Applicant: Carbon Sink, Inc., Cold Spring Harbor, NY (US)

(72) Inventors: Alain L. Bourhis, Natick, MA (US); David K. Steckler, Hollis, NH (US); Raffaella Sordella, Cold Spring Harbor, NY (US); Frank O'Keefe, Cold Spring Harbor, NY (US)

( * ) Notice: Subject to any disclaimer, the term of this patent is extended or adjusted under 35 U.S.C. 154(b) by 110 days.

(21) Appl. No.: 16/991,316

(22) Filed: Aug. 12, 2020

(65) Prior Publication Data
US 2021/0120750 A1    Apr. 29, 2021

Related U.S. Application Data

(63) Continuation of application No. PCT/US2019/018086, filed on Feb. 14, 2019.
(Continued)

(51) Int. Cl.
*A01G 9/18* (2006.01)
*B01D 53/14* (2006.01)
(Continued)

(52) U.S. Cl.
CPC ........... *A01G 9/18* (2013.01); *B01D 53/1425* (2013.01); *B01D 53/1475* (2013.01);
(Continued)

(58) Field of Classification Search
CPC ...... A01G 9/18; A01G 31/00; B01D 53/1425; B01D 53/1475; B01D 53/62; B01D 2257/504
(Continued)

(56) References Cited

U.S. PATENT DOCUMENTS 1,031,799 A    7/1912   Donald
1,296,889 A    3/1919   John
(Continued)

FOREIGN PATENT DOCUMENTS

CA    1212522 A1    10/1986
CA    1236877 A1    5/1988
(Continued)

OTHER PUBLICATIONS

Spenik et al., "Carbon Capture Unit (C2U) Design and Experimental Results Using Polyethylenimene (PEI) Immobilized on Mesoporous Silicas", National Energy Technology Laboratory Office of Research and Development, Technical Report, Dec. 2014. (Year: 2014).*

(Continued)

*Primary Examiner* — Anita Nassiri-Motlagh
(74) *Attorney, Agent, or Firm* — Whitmyer IP Group LLC

(57) ABSTRACT

Methods and apparatus for capturing carbon dioxide from ambient air and delivering said carbon dioxide to an enclosed environment are described. In general, the methods and apparatus comprise contacting a packed bed or fluidized bed device with a stream of ambient air, wherein the packed bed or fluidized bed device comprises a humidity-sensitive sorbent material that adsorbs carbon dioxide from the ambient air; contacting the packed bed or fluidized bed device with a stream of humid air to release the adsorbed carbon dioxide; delivering the released carbon dioxide to an enclosed environment; and optionally, repeating the steps of contacting the packed bed or fluidized bed device with ambient air and humid air in an alternating fashion.

15 Claims, 11 Drawing Sheets

Related U.S. Application Data

(60) Provisional application No. 62/740,261, filed on Oct. 2, 2018, provisional application No. 62/710,445, filed on Feb. 16, 2018.

(51) Int. Cl.
    *B01D 53/62* (2006.01)
    *A01K 61/10* (2017.01)
    *A01G 31/00* (2018.01)

(52) U.S. Cl.
    CPC .............. *B01D 53/62* (2013.01); *A01G 31/00* (2013.01); *A01K 61/10* (2017.01); *B01D 2257/504* (2013.01)

(58) Field of Classification Search
    USPC ........................................................ 423/220
    See application file for complete search history.

(56) References Cited

U.S. PATENT DOCUMENTS

| | | |
|---|---|---|
| 1,482,367 A | 1/1924 | Elledge |
| 2,718,454 A | 9/1955 | Wylie |
| 2,796,145 A | 6/1957 | King |
| 2,922,489 A | 1/1960 | Hollingsworth |
| 3,024,207 A | 3/1962 | Shaw et al. |
| 3,063,195 A | 11/1962 | Ravich |
| 3,111,485 A | 11/1963 | Kunin |
| 3,282,831 A | 11/1966 | Hamm |
| 3,294,488 A | 12/1966 | Dunlop et al. |
| 3,318,588 A | 5/1967 | Russell et al. |
| 3,330,750 A | 7/1967 | McRae et al. |
| 3,344,050 A | 9/1967 | Mayland et al. |
| 3,466,019 A | 9/1969 | Ronald |
| 3,466,138 A | 9/1969 | Spiegler et al. |
| 3,470,708 A | 10/1969 | Sanford et al. |
| 3,489,506 A | 1/1970 | Galstaun et al. |
| 3,498,026 A | 3/1970 | Harry et al. |
| 3,554,691 A | 1/1971 | Wen et al. |
| 3,556,716 A | 1/1971 | Frank et al. |
| 3,561,926 A | 2/1971 | James |
| 3,594,989 A | 7/1971 | Bastiaans |
| 3,627,478 A | 12/1971 | Tepper |
| 3,627,703 A | 12/1971 | Kojima et al. |
| 3,632,519 A | 1/1972 | Gustafson |
| 3,645,072 A | 2/1972 | Clapham |
| 3,691,109 A | 9/1972 | Cornelius |
| 3,710,778 A | 1/1973 | Wallace |
| 3,712,025 A | 1/1973 | Wallace |
| 3,727,375 A | 4/1973 | Wallace |
| 3,833,710 A | 9/1974 | Deschamps et al. |
| 3,841,558 A | 10/1974 | Fowler et al. |
| 3,848,577 A | 11/1974 | Storandt |
| 3,855,001 A | 12/1974 | Cheron |
| 3,865,924 A | 2/1975 | Gidaspow et al. |
| 3,876,565 A | 4/1975 | Takashima et al. |
| 3,876,738 A | 4/1975 | Marinaccio et al. |
| 3,880,981 A | 4/1975 | Garingarao et al. |
| 3,891,411 A | 6/1975 | Meyer |
| 3,907,967 A | 9/1975 | Filss |
| 3,915,822 A | 10/1975 | Veltman |
| 3,948,627 A | 4/1976 | Schwarz et al. |
| 3,981,698 A | 9/1976 | Leppard |
| 4,012,206 A | 3/1977 | Macriss et al. |
| 4,047,894 A | 9/1977 | Kuhl |
| 4,138,850 A | 2/1979 | Tchernev |
| 4,140,602 A | 2/1979 | Lewis et al. |
| 4,167,551 A | 9/1979 | Tamura et al. |
| 4,197,421 A | 4/1980 | Steinberg |
| 4,209,943 A | 7/1980 | Moeller et al. |
| 4,238,305 A | 12/1980 | Gancy et al. |
| 4,239,515 A | 12/1980 | Futami et al. |
| 4,246,241 A | 1/1981 | Mathur et al. |
| 4,249,317 A | 2/1981 | Murdock |
| 4,264,340 A | 4/1981 | Sircar et al. |
| 4,296,050 A | 10/1981 | Meier et al. |
| 4,321,410 A | 3/1982 | Ono et al. |
| 4,336,227 A | 6/1982 | Koyama et al. |
| 4,340,480 A | 7/1982 | Pall et al. |
| 4,398,927 A | 8/1983 | Asher et al. |
| 4,409,006 A | 10/1983 | Mattia |
| 4,425,142 A | 1/1984 | Mann |
| 4,436,707 A | 3/1984 | Karwat |
| 4,475,448 A | 10/1984 | Shoaf et al. |
| 4,497,641 A | 2/1985 | Brown, Jr. et al. |
| 4,511,375 A | 4/1985 | Bevier |
| 4,528,248 A | 7/1985 | Galbraith |
| 4,543,112 A | 9/1985 | Ackley et al. |
| 4,566,221 A | 1/1986 | Kossin |
| 4,569,150 A | 2/1986 | Carlson et al. |
| 4,592,817 A | 6/1986 | Chlanda et al. |
| 4,594,081 A | 6/1986 | Kroll et al. |
| 4,608,140 A | 8/1986 | Goldstein |
| 4,678,648 A | 7/1987 | Wynn |
| 4,711,097 A | 12/1987 | Besik |
| 4,711,645 A | 12/1987 | Kumar |
| 4,729,883 A | 3/1988 | Lam et al. |
| 4,735,603 A | 4/1988 | Goodson et al. |
| 4,770,777 A | 9/1988 | Steadly et al. |
| 4,804,522 A | 2/1989 | Hass |
| 4,810,266 A | 3/1989 | Zinnen et al. |
| 4,861,360 A | 8/1989 | Apffel |
| 4,869,894 A | 9/1989 | Wang et al. |
| 4,899,544 A | 2/1990 | Boyd |
| 4,906,263 A | 3/1990 | Von et al. |
| 4,941,898 A | 7/1990 | Kimura |
| 4,946,620 A | 8/1990 | Kadono et al. |
| 4,953,544 A | 9/1990 | Hansen et al. |
| 4,957,519 A | 9/1990 | Chen |
| 4,980,098 A | 12/1990 | Connery |
| 5,069,688 A | 12/1991 | Wells |
| 5,070,664 A | 12/1991 | Groh et al. |
| 5,170,633 A | 12/1992 | Kaplan |
| 5,180,750 A | 1/1993 | Sugaya et al. |
| 5,203,411 A | 4/1993 | Dawe et al. |
| 5,215,662 A | 6/1993 | Johnson et al. |
| 5,232,474 A | 8/1993 | Jain |
| 5,253,682 A | 10/1993 | Haskett et al. |
| 5,277,915 A | 1/1994 | Provonchee et al. |
| 5,281,254 A | 1/1994 | Birbara et al. |
| 5,304,234 A | 4/1994 | Takatsuka et al. |
| 5,308,466 A | 5/1994 | Ganzi et al. |
| 5,316,637 A | 5/1994 | Ganzi et al. |
| 5,318,758 A | 6/1994 | Fujii et al. |
| 5,328,851 A | 7/1994 | Zaromb |
| 5,344,627 A | 9/1994 | Fujii et al. |
| 5,385,610 A | 1/1995 | Deerer et al. |
| 5,389,257 A | 2/1995 | Todd et al. |
| 5,401,475 A | 3/1995 | Ayala et al. |
| 5,409,508 A | 4/1995 | Erickson |
| 5,414,957 A | 5/1995 | Kenney |
| 5,443,740 A | 8/1995 | Schmitt |
| 5,454,189 A | 10/1995 | Graham et al. |
| 5,520,894 A | 5/1996 | Heesink et al. |
| 5,525,237 A | 6/1996 | Birbara et al. |
| 5,535,989 A | 7/1996 | Sen |
| 5,636,472 A | 6/1997 | Spira et al. |
| 5,658,372 A | 8/1997 | Gadkaree |
| 5,659,974 A | 8/1997 | Graeff |
| 5,682,709 A | 11/1997 | Erickson |
| 5,711,770 A | 1/1998 | Malina |
| 5,747,042 A | 5/1998 | Choquet |
| 5,756,207 A | 5/1998 | Clough et al. |
| 5,779,767 A | 7/1998 | Golden et al. |
| 5,788,826 A | 8/1998 | Nyberg |
| 5,792,440 A | 8/1998 | Huege |
| 5,797,979 A | 8/1998 | Quinn |
| 5,833,747 A | 11/1998 | Bleakley et al. |
| 5,876,488 A | 3/1999 | Birbara et al. |
| 5,887,547 A | 3/1999 | Caveny et al. |
| 5,914,455 A | 6/1999 | Jain et al. |
| 5,917,136 A | 6/1999 | Gaffney et al. |
| 5,934,379 A | 8/1999 | Oestlyngen et al. |
| 5,955,043 A | 9/1999 | Neuman et al. |

(56) References Cited

U.S. PATENT DOCUMENTS

| | | | |
|---|---|---|---|
| 5,962,545 A | 10/1999 | Chaudhary et al. | |
| 5,972,080 A | 10/1999 | Nagata | |
| 5,980,611 A | 11/1999 | Kumar et al. | |
| 6,004,381 A | 12/1999 | Rohrbach et al. | |
| 6,027,552 A | 2/2000 | Ruck et al. | |
| 6,048,509 A | 4/2000 | Kawai et al. | |
| 6,083,740 A | 7/2000 | Kodo et al. | |
| 6,117,404 A | 9/2000 | Mimura et al. | |
| 6,136,075 A | 10/2000 | Bragg et al. | |
| 6,143,057 A | 11/2000 | Buelow et al. | |
| 6,158,623 A | 12/2000 | Benavides et al. | |
| 6,180,012 B1 | 1/2001 | Rongved | |
| 6,200,543 B1 | 3/2001 | Allebach et al. | |
| 6,209,256 B1 | 4/2001 | Brittin et al. | |
| 6,214,303 B1 | 4/2001 | Hoke et al. | |
| 6,221,225 B1 | 4/2001 | Mani | |
| 6,228,145 B1 | 5/2001 | Falk-Pedersen et al. | |
| 6,237,284 B1 | 5/2001 | Erickson | |
| 6,279,576 B1 | 8/2001 | Lambert | |
| 6,284,021 B1 | 9/2001 | Lu et al. | |
| 6,306,803 B1 | 10/2001 | Tazaki | |
| 6,316,668 B1 | 11/2001 | King et al. | |
| 6,322,612 B1 | 11/2001 | Sircar et al. | |
| 6,334,886 B1 | 1/2002 | Barnes, Jr. et al. | |
| 6,346,938 B1 | 2/2002 | Chan et al. | |
| 6,364,938 B1 | 4/2002 | Birbara et al. | |
| 6,402,819 B1 | 6/2002 | De et al. | |
| 6,500,236 B2 | 12/2002 | Suzuki et al. | |
| 6,503,957 B1 | 1/2003 | Bernatowicz et al. | |
| 6,526,699 B1 | 3/2003 | Foglio, Sr. | |
| 6,547,854 B1 | 4/2003 | Gray et al. | |
| 6,565,627 B1 | 5/2003 | Golden et al. | |
| 6,582,498 B1 | 6/2003 | Sass et al. | |
| 6,617,014 B1 | 9/2003 | Thomson | |
| 6,632,848 B2 | 10/2003 | Sugaya | |
| 6,645,272 B2 | 11/2003 | Lemaire et al. | |
| 6,716,888 B2 | 4/2004 | Bernatowicz et al. | |
| 6,755,892 B2 | 6/2004 | Nalette et al. | |
| 6,814,021 B1 | 11/2004 | Turkewitz et al. | |
| 6,830,596 B1 | 12/2004 | Deckman et al. | |
| 6,863,713 B1 | 3/2005 | Ghosal et al. | |
| 6,890,497 B2 | 5/2005 | Rau et al. | |
| 6,908,497 B1 | 6/2005 | Sirwardane | |
| 6,969,466 B1 | 11/2005 | Starner | |
| 7,067,456 B2 | 6/2006 | Fan et al. | |
| 7,132,090 B2 | 11/2006 | Dziedzic et al. | |
| 7,270,796 B2 | 9/2007 | Kemp et al. | |
| 7,311,836 B2 | 12/2007 | Kusunose et al. | |
| 7,343,341 B2 | 3/2008 | Sandor et al. | |
| 7,364,608 B2 | 4/2008 | Tanahashi et al. | |
| 7,384,621 B2 | 6/2008 | Stevens et al. | |
| 7,415,418 B2 | 8/2008 | Zimmerman et al. | |
| 7,420,004 B2 | 9/2008 | Hardy et al. | |
| 7,604,787 B2 | 10/2009 | Maroto-Valer et al. | |
| 7,655,069 B2 | 2/2010 | Wright et al. | |
| 7,699,909 B2 | 4/2010 | Lackner et al. | |
| 7,776,296 B2 | 8/2010 | Sarlis et al. | |
| 7,795,175 B2 | 9/2010 | Olah et al. | |
| 8,133,305 B2 | 3/2012 | Lackner et al. | |
| 8,262,774 B2 | 9/2012 | Liu | |
| 8,702,847 B2 | 4/2014 | Lackner et al. | |
| 8,999,279 B2 | 4/2015 | Wright et al. | |
| 9,527,747 B2 | 12/2016 | Wright et al. | |
| 9,616,375 B2 | 4/2017 | Wright et al. | |
| 9,861,933 B2 | 1/2018 | Wright et al. | |
| 10,010,829 B2 | 7/2018 | Wright et al. | |
| 10,150,112 B2 | 12/2018 | Wright et al. | |
| 2001/0004895 A1 | 6/2001 | Preiss | |
| 2001/0009124 A1 | 7/2001 | Suzuki et al. | |
| 2001/0022952 A1 | 9/2001 | Rau et al. | |
| 2002/0083833 A1 | 7/2002 | Nalette et al. | |
| 2002/0102674 A1 | 8/2002 | Anderson | |
| 2002/0178925 A1 | 12/2002 | Mimura et al. | |
| 2003/0022948 A1 | 1/2003 | Seiki et al. | |
| 2003/0024686 A1 | 2/2003 | Ouellette | |
| 2003/0041733 A1 | 3/2003 | Seguin et al. | |
| 2003/0145726 A1 | 8/2003 | Gueret et al. | |
| 2003/0167692 A1 | 9/2003 | Jewell et al. | |
| 2003/0205692 A1 | 11/2003 | Fleming et al. | |
| 2003/0220188 A1 | 11/2003 | Marand et al. | |
| 2004/0031424 A1 | 2/2004 | Pope | |
| 2004/0069144 A1 | 4/2004 | Wegeng et al. | |
| 2004/0103831 A1 | 6/2004 | Pope | |
| 2004/0103931 A1 | 6/2004 | Tsuchiya et al. | |
| 2004/0134353 A1 | 7/2004 | Gillingham et al. | |
| 2004/0195115 A1 | 10/2004 | Colombo | |
| 2004/0213705 A1 | 10/2004 | Blencoe et al. | |
| 2004/0219090 A1 | 11/2004 | Dziedzic et al. | |
| 2005/0011770 A1 | 1/2005 | Katsuyoshi et al. | |
| 2005/0061737 A1 | 3/2005 | Linden et al. | |
| 2005/0063956 A1 | 3/2005 | Bernklau et al. | |
| 2005/0092176 A1 | 5/2005 | Ding et al. | |
| 2005/0095486 A1 | 5/2005 | Hamamoto et al. | |
| 2005/0203327 A1 | 9/2005 | Jovanovic et al. | |
| 2005/0204915 A1 | 9/2005 | Sammons et al. | |
| 2005/0252215 A1 | 11/2005 | Beaumont et al. | |
| 2005/0269094 A1 | 12/2005 | Harris et al. | |
| 2005/0279095 A1 | 12/2005 | Goldman | |
| 2006/0013963 A1 | 1/2006 | Thomson | |
| 2006/0042209 A1 | 3/2006 | Dallas et al. | |
| 2006/0051274 A1 | 3/2006 | Wright et al. | |
| 2006/0150811 A1 | 7/2006 | Callahan et al. | |
| 2006/0249020 A1 | 11/2006 | Tonkovich et al. | |
| 2007/0004023 A1 | 1/2007 | Trachtenberg | |
| 2007/0089605 A1 | 4/2007 | Lampinen et al. | |
| 2007/0149398 A1 | 6/2007 | Jones et al. | |
| 2007/0187247 A1 | 8/2007 | Lackner et al. | |
| 2007/0199448 A1 | 8/2007 | Yates et al. | |
| 2008/0008793 A1 | 1/2008 | Forsyth et al. | |
| 2008/0025893 A1 | 1/2008 | Asprion et al. | |
| 2008/0031801 A1 | 2/2008 | Lackner et al. | |
| 2008/0087165 A1* | 4/2008 | Wright | B01D 53/04 96/111 |
| 2008/0276804 A1 | 11/2008 | Sayari et al. | |
| 2008/0293976 A1 | 11/2008 | Olah et al. | |
| 2009/0169452 A1 | 7/2009 | Constantz et al. | |
| 2009/0260518 A1* | 10/2009 | Wright | B01D 53/0462 96/111 |
| 2010/0095842 A1 | 4/2010 | Lackner et al. | |
| 2010/0105126 A1 | 4/2010 | Wright et al. | |
| 2010/0319537 A1 | 12/2010 | Eisenberger et al. | |
| 2011/0056382 A1 | 3/2011 | Lackner et al. | |
| 2011/0108421 A1 | 5/2011 | Lackner et al. | |
| 2011/0195473 A1 | 8/2011 | Wilhelm | |
| 2011/0203174 A1 | 8/2011 | Lackner | |
| 2011/0203311 A1 | 8/2011 | Wright et al. | |
| 2011/0206588 A1 | 8/2011 | Lackner | |
| 2011/0209614 A1 | 9/2011 | Wright et al. | |
| 2012/0279397 A1 | 11/2012 | Wright et al. | |
| 2012/0302469 A1 | 11/2012 | Lackner et al. | |
| 2013/0115153 A1 | 5/2013 | Lackner et al. | |
| 2013/0121903 A1 | 5/2013 | Gupta et al. | |
| 2013/0336722 A1 | 12/2013 | Wright et al. | |
| 2014/0202954 A1 | 7/2014 | Lassovsky | |
| 2014/0370576 A1 | 12/2014 | Wright et al. | |
| 2015/0020683 A1 | 1/2015 | Wright et al. | |
| 2015/0165373 A1 | 6/2015 | Lackner | |
| 2015/0274536 A1* | 10/2015 | Wright | A01N 59/04 423/437.1 |

FOREIGN PATENT DOCUMENTS

| | | |
|---|---|---|
| CN | 1107078 A | 8/1995 |
| CN | 1391642 A | 1/2003 |
| DE | 4130837 A1 | 4/1992 |
| DE | 19521678 A1 | 12/1996 |
| DE | 19727295 A1 | 1/1999 |
| DE | 19830470 C1 | 11/1999 |
| DE | 20001385 U1 | 8/2000 |
| EP | 0020055 A1 | 12/1980 |
| EP | 0111911 A1 | 6/1984 |
| EP | 0254137 A1 | 1/1988 |
| EP | 0585898 A1 | 3/1994 |
| EP | 2782657 B1 | 12/2016 |

(56) References Cited

FOREIGN PATENT DOCUMENTS

| | | |
|---|---|---|
| FR | 2029424 A1 | 10/1970 |
| GB | 1004046 A | 9/1965 |
| GB | 1031799 A | 6/1966 |
| GB | 1109439 A | 4/1968 |
| GB | 1204781 A | 9/1970 |
| GB | 1296889 A | 11/1972 |
| GB | 1520110 A | 8/1978 |
| GB | 2288143 A | 10/1995 |
| JP | S58122022 A | 7/1983 |
| JP | S6172035 A | 4/1986 |
| JP | S61227822 A | 10/1986 |
| JP | S61254220 A | 11/1986 |
| JP | S61254221 A | 11/1986 |
| JP | S61280217 A | 12/1986 |
| JP | S6312323 A | 1/1988 |
| JP | S6312324 A | 1/1988 |
| JP | S6316032 A | 1/1988 |
| JP | S6369525 A | 3/1988 |
| JP | S6369527 A | 3/1988 |
| JP | H01208310 A | 8/1989 |
| JP | H01305809 A | 12/1989 |
| JP | H02187153 A | 7/1990 |
| JP | H03245811 A | 11/1991 |
| JP | H04171021 A | 6/1992 |
| JP | H04200720 A | 7/1992 |
| JP | H0557182 A | 3/1993 |
| JP | H0671137 A | 3/1994 |
| JP | H06253682 A | 9/1994 |
| JP | H09276648 A | 10/1997 |
| JP | H1057745 A | 3/1998 |
| JP | H10174838 A | 6/1998 |
| JP | 2000051634 A | 2/2000 |
| JP | 2000107895 A | 4/2000 |
| JP | 2004089770 A | 3/2004 |
| JP | 2004261757 A | 9/2004 |
| JP | 2006102561 A | 4/2006 |
| JP | 2006103974 A | 4/2006 |
| JP | 2006266583 A | 10/2006 |
| JP | 2006340683 A | 12/2006 |
| JP | 2007190529 A | 8/2007 |
| JP | 2008116193 A | 5/2008 |
| JP | 2010505613 A | 2/2010 |
| JP | 2011516107 A | 5/2011 |
| KR | 20030012224 A | 2/2003 |
| RU | 2097115-01 | 11/1997 |
| SU | 511963 A1 | 4/1976 |
| SU | 715120 A1 | 2/1980 |
| SU | 1828406 A3 | 7/1993 |
| WO | WO-9413386 A1 | 6/1994 |
| WO | WO-9816296 A1 | 4/1998 |
| WO | WO-9817388 A1 | 4/1998 |
| WO | WO-9822173 A1 | 5/1998 |
| WO | WO-0050154 A1 | 8/2000 |
| WO | WO-0076633 A1 | 12/2000 |
| WO | WO-0121269 A2 | 3/2001 |
| WO | WO-0151550 A1 | 7/2001 |
| WO | WO-0121269 A3 | 8/2001 |
| WO | WO-2005108297 A2 | 11/2005 |
| WO | WO-2005108297 A3 | 1/2006 |
| WO | WO-2006009600 A2 | 1/2006 |
| WO | WO-2006009600 A3 | 4/2006 |
| WO | WO-2006036396 A2 | 4/2006 |
| WO | WO-2006036396 A3 | 8/2006 |
| WO | WO-2006084008 A1 | 8/2006 |
| WO | WO-2007016271 A2 | 2/2007 |
| WO | WO-2007016274 A2 | 2/2007 |
| WO | WO-2007016271 A3 | 3/2007 |
| WO | WO-2007016274 A3 | 3/2007 |
| WO | WO-2007114991 A2 | 10/2007 |
| WO | WO-2007114991 A3 | 4/2008 |
| WO | WO-2008042919 A2 | 4/2008 |
| WO | WO-2008061210 A2 | 5/2008 |
| WO | WO-2008061210 A3 | 7/2008 |
| WO | WO-2008131132 A1 | 10/2008 |
| WO | WO-2009105566 A2 | 8/2009 |
| WO | WO-2009149292 A1 | 12/2009 |
| WO | WO-2010019600 A2 | 2/2010 |
| WO | WO-2010022399 A1 | 2/2010 |
| WO | WO-2008042919 A3 | 7/2010 |
| WO | WO-2011011740 A1 | 1/2011 |
| WO | WO-2019161114 A1 | 8/2019 |

OTHER PUBLICATIONS

Abstracts of Eos. Trans. AGU, 82 (47), Fall Meeting 2001; pp. 3.
Abstracts of Eos. Trans. AGU, 83 (19), Spring Meeting 2002; pp. 3.
Abstracts of Eos. Trans. AGU, 83 (47), Fall Meeting 2002; pp. 3.
Arena et al. Carbon Dioxide Adsorption in a Sound-Assisted Fluidized Bed of Fine Powders. XXXIV Meeting of the Italian Section of the Combustion Institute (2011). Retrieved Feb. 17, 2021 at URL: http://www.combustion-institute.it/proceedings/XXXIV-ASICI/papers/34proci2011.III9.pdf. 6 pages.
Astarita. Mass Transfer with Chemical Reaction. Amsterdam: Elsevier Publishing Company. 1967; 144-152.
Avgul, et al. Adsorption of acid gases by macroporous, weekly basic anion exchange resins with different functional groups. Colloid Journal of the USSR. A translation of Kolloidnyi Zhurnal. 1982; 4(6):837-842.
Balster et al. Multi-Layer Spacer Geometries With Improved Mass Transport. Journal of membrane Science. 2006; 282:351-361.
Belyakova, et al. (1984). Porous organic polymers: Structure, surface chemistry and adsorption of certain gases. Advances in Colloid and Interface Science—Advan Colloid Interface Sci. 21. 55-118. 10.1016/0001-8686(84)87002-5. .
Belyakova, et al. Adsorption of carbon dioxide and water by macroporous anion-exchange resins. Colloid Journal of the USSR. A translation of Kolloidnyi Zhurnal. 1975; 37(3):484-487.
Besra, et al. Particle Characteristics and Their Influence on Dewatering of Kaolin, Calcite and Quartz Suspensions. Int. J. Miner. Process. 2000; 59:89-112.
Bituin. New Findings May Redefine Renewable Energy Debate. May 1, 2002. Access Jun. 29, 2009. found at http://www.dailycal.org/article.php?id=8559.
Blok, et al. Hydrogen Production From Natural Gas, Sequestration of Recovered $CO_2$ in Depleted Gas Wells and Enhanced Natural Gas Recovery. Energy. 1997; 22(2-3):161-168.
Boynton. Chemistry and Technology of Lime and Limestone. New York: Interscience Publishers. 1966; 204-206.
Carbon Sequestration Could Be Employed Today To Help Alleviate Greenhouse Emissions. Accessed Jun. 29, 2009. found at http://www.earthinstitute.columbia.edu/news/2003/story06-25-03b.html.
Choi, et al. A new preparation for cation-exchange membrane using monomer sorption into reinforcing materials. Desalination. Mar. 22, 2002; 146:287-291.
Choi et al. Application of Amine-Tethered Solid Sorbents for Direct $CO_2$ Capture from the Ambient Air. Environ. Sci. Technol. 2011, 45, 6, 2420-2427.
Choi, et al. Characterization of LDPE/polystyrene cation exchange membranes prepared by monomer sorption and UV radiation polymerization. Journal of Membrane Science. 2003; 223:201-215.
Choi, et al. Preparation and characterization of LDPE/polyvinvylbenzyl trimethyl ammonium salts anion-exchange membrane. Journal of Membrane Science. 2003; 2001:219-231.
Cuiming, et al. Fundamental Studies of a New Hybrid (Inorganic-Organic) Positively Charged Membrane: Membrane Preparation and Characterizations. Journal of Membrane Science. 2003; 216:269-278.
Desideri, et al. Performance Modelling of a Carbon Dioxide Removal System for Power Plants. Energy Conversion and Management. 1999; 40:1899-1915.
Dillon, et al. Oxy-Combustion Processes for $CO_2$ Capture From Advanced Supercritical PF and NGCC Power Plant. Greenhouse Gas Control Technologies 7, Proceedings of the 7th International Conference on Greenhouse Gas Control Technologies 5—Sep. 2004, Vancouver, Canada. 211-220.
Dow Chemical Company, Dowex Type 1 Strong Base Anion Resin, 1998, http://www.inaqua.de/Prod/ion/pdf en/313 UPCORE Mono A625.pdf, p. 1.

(56) References Cited

OTHER PUBLICATIONS

Dubey et al. Chemical Extraction of Carbon Dioxide from Air to Sustain Fossil Energy by Avoiding Climate Change. 2nd Annual Conference on Carbon Sequestration, 2003.

Dubey et al., "Extraction of Carbon Dioxide from the Atmosphere Through Engineered Chemical Sinkage", Fuel Chemistry Division Preprints, 2002; pp. 1-4.

Dubey. Science for Sustainability: From Capturing Carbon Dioxide From Air to Environmental Impact of a Hydrogen Economy. Accessed Jun. 14, 2010. found at http://www.mbari.org/seminars/2003/spring2003/apr2_dubey.html.

Elliott, et al. Compensation of Atmospheric CO2 Buildup Through Engineered Chemical Sinkage. 2001; pp. 1-8.

Fuertes, et al. Carbon Composite Membranes from Matrimid and Kapton Polymides for Gas Separation. Microporous and Mesoporous Materials. 1999; 33:115-125.

Gebald et al. Amine-Based Nanofibrillated Cellulose As Adsorbent for CO2 Capture from Air. Environ. Sci. Technol. 45:9101-9108 (Sep. 14, 2011).

Hanson, et al. Steam Drying and Fluidized-Bed Calcination of Lime Mud. Tappi Journal. 1993; 76(11):181-188.

Hashimto et al. Global CO2 recycling. Zairyo to Kankyo/ Corrosion Engineering, vol. 45, Issue 10, pp. 614-620 (1996). Abstract only. Retrieved Apr. 16, 2021 at URL: https://tohoku.pure.elsevier.com/en/publications/global-cosub2sub-recycling. 3 pages.

Herzog, et al. Carbon Dioxide Recovery and Disposal From Large Energy Systems. Annu. Rev. Energy Environ. 1996; 21:145-166.

Huang et al. Method to Regenerate Ammonia for the Capture of Carbon Dioxide. Energy Fuels 16, 4, 904-910 (2002). Retrieved Apr. 16, 2021 at URL: https://www.osti.gov/servlets/purl/799562.

Information About: David Keith. Access Jun. 14, 2010. found at http://ideas.respec.org/e/pke74.html.

Information on David Keith. Access Jun. 14, 2010. found at http://www.ucalgary.ca/-keith/.

Keith et al. Climate Strategy with CO2 Capture from the Air. Climatic Change (2005). Retrieved Apr. 16, 2021 from URL: https://keith.seas.harvard.edu/files/tkg/files/51.keith_.2005.climatestratwithaircapture.e.pdf. 29 pages.

Keith, et al. Co2 Capture From the Air: Technology Assessment and Implications for Climate Policy. Greenhouse Gas Control Technologies 6. Proceedings of the 6th International Conference on Greenhouse Gas Control Technologies Oct. 1-4, 2002, Kyoto, Japan; 187-192.

Keith et al. CO2 Capture from the Air: Technology Assessment and Implications for Climate Policy (Oct. 1-4, 2002). Retrieved Apr. 16, 2021 from URL: http://citeseerx.ist.psu.edu/viewdoc/download;jsessionid=D25A42A197533D17A09DBA2BC6E3CCF6?doi=10.1.1.177.6479&rep=rep1&type=pdf. 6 pages.

Keith. The Carrot or the Stick: How to Build a Technology-Friendly Climate Policy in Canada. Climate Change Central Apr. 15, 2005, pp. 1-32.

Konno, et al. Crystallization of Aragonite in the Causticizing Reaction. Powder Technology. 2002; 123:33-39.

Lacker et al. Free-Market Approaches to Controlling Carbon Dioxide Emissions to the Atmosphere: A discussion of the scientific basis. Published in the Proceedings to the Global Warming and Energy Policy Conference, Fort Lauderdale, Kursunoglu et al., eds (2000). Retrieved Apr. 16, 2021 at URL: http://wilsonweb.physics.harvard.edu/publications/pp809.pdf. 16 pages.

Lackner. Can Fossil Carbon Fuel the 21st Century? International Geology Review. 2002; 44:1122-1133.

Lackner, et al., "Capturing Carbon Dioxide From Air". First National Conference on Carbon Sequestrian. 2001; pp. 1-15.

Lackner, et al. Carbon Dioxide Extraction from Air? Arguments 2001.pp. 1-5.

Lackner, et al. Carbon Dioxide Extraction from Air: Is It An Option?. Proceedings of the 24th Annual Technical Conference on Coal Utilization and Fuel Systems, 1999; pp. 885-896.

Lackner et al., "CO2 Extraction from Air" A White Paper from Los Alamos National Labs, The Reddy Corporation International, Sourcebook, Sep. 1999.

Lackner, et al. The Case for Carbon Dioxide Extraction From Air. Sourcebook, Sep. 1999; vol. 57, No. 9, pp. 6-10.

Lackner. "Extracting CO2 from the Air", Lackner presentation, 12 pages.

Lackner, Klaus S. A Guide to CO2 Sequestration. Science, Jun. 13, 2003: vol. 300, Issue 5626, pp. 1677-1678. Correction published in vol. 301, No. 5636, Aug. 29, 2003.

Liang, "Carbon Dioxide Capture From Flue Gas Using Regenerable Sodium-Based Sorbents", dated Aug. 1, 2003, Department of Chemical Engineering Thesis, (137 pgs).

Liu, et al. Composite Membranes from Photochemical Synthesis of Ultrathin Polymer Films. Nature vol. 352 Jul. 4, 1991.

Meier, et al. Design and Experimental Investigation of a Horizontal Rotary Reactor for the Solar Thermal Production of Lime. Energy. 2004; 29:811-821.

Mizutani. Structure of Ion Exchange Membranes. Journal of Membrane Science. 1990; 49:121-144.

Murdoch, et al. Sabatier Methanation Reactor for Space Exploration. Conference Paper, Space Exploration Conference, Orlando, FL (Jan. 1, 2005). Abstract only. Retrieved Apr. 16, 2021 from URL: https://ntrs.nasa.gov/citations/20050110128. One page.

Olsson, et al. Thermophysical Properties of Aqueous NaOH—H20 Solutions at High Concentrations. International Journal of Thermophysics. 1997; 18(3):779-793.

Otsuji, et al. A regenerable carbon dioxide removal and oxygen recovery system for the Japanese Experiment Module. Acta Astronaut. Jan. 1987;15(1):45-54.

PCT/US2019/018086 International Search Report and Written Opinion dated Jun. 12, 2019.

Psarras et al. Slicing the pie: how big could carbon dioxide removal be? WIREs Energy Environ 2017, 6:e253. doi: 10.1002/wene.253. 21 pages.

Researchers Explore Extracting CO2 Directly From Air. Apr. 15, 2002. found at http://www.earthvision.net/ColdFusion/News Page1.cfm?NewsID=20309.

Resume of David Keith, Academic CV, Spring 2005, 8 pgs.

Rickman. Imagine No Restrictions on Fossil-Fuel Usage and No Global Warming! Los Alamos National Laboratory (Apr. 9, 2002). Accessed Jun. 29, 2009. found at http://www.lanl.govinews/releases/archive/02-028.shtml.

Sanz-Pérez et al. Direct Capture of CO2 from Ambient Air.Chem. Rev. 2016, 116, 19, 11840-11876.

Sata, et al. Modification of Properties of Ion Exchange Membranes. VI. Electrodialytic Transport Properties of Cation Exchange Membranes with a Electrodeposition Layer of Cationic Polyelectrolytes. 1979, pp. 1199-1213.

Sata, et al. Modification of Properties of Ion Exchange Membranes. VII. Relative Transport Number between Various Cations of Cation Exchange Membrane Having Cationic Polyelectrolyte Layer and Mechanism of Selective Permeation of Particular Cations. 1979, pp. 2071-2085.

Sata. Modification of Properties of Ion Exchange Membranes. IV. Change of Transport Properties of Cation-Exchange Membranes by Various Polyelectrolytes. 1978, pp. 1063-1080.

Sata. Monovalent Cation Permselective Exchange Membrane. Apr. 15, 1972, pp. 980-982.

Schöny et al. A multi-stage fluidized bed system for continuous CO2 capture by means of temperature swing adsorption—First results from benchscale experiments. Powder Technology 316:519-527 (2017). Available online Dec. 12, 2016.

Singer. Americans Believe in Global Warming . . . and Psychic Powers, Astrology, and UFO's. Accessed Jun. 29, 2009. Environment & Climate News, 2002; vol. 5, No. 7. found at http://heartland.org/.

Singh. Technical Note Ultrasonically Assisted Rapid Solid-Liquid Separation of Fine Clean Coal Particles. Minerals Engineering. 1999; 12(4):437-443.

Steinberg, et al. Synthetic carbonaceous fuel and feedstock using nuclear power, air and water. International Journal of Hydrogen Energy. 1977; 2:189-207.

(56) References Cited

OTHER PUBLICATIONS

Strieber. New Solutions to Oil Problems, Whitley Strieber's Unknown Country, 2002, found at http://www.unknowncountry.com/news/print.phtml?id=1467.
Sun et al., "CO2 sorption in activated carbon in the presence of water", dated Feb. 9, 2007, Science Direct, Chemical Physics Letters 437 (2000) (abstract enclosed).
Third party observation dated Mar. 2, 2015 for EP Application No. 13175213.1.
Third party observation dated Apr. 28, 2015 for EP Application No. 07758183.3.
Third party observation dated Jul. 22, 2014 for EP Application No. 07758183.3.
Third party observation dated Oct. 23, 2014 for EP Application No. 07853742.0.
Third party observation dated Oct. 29, 2020 for EP Application No. 13175213.1.
Third party observation dated Oct. 30, 2014 for EP Application No. 13175213.1.
Veneman et al. Continuous CO2 capture in a circulating fluidized bed using supported amine sorbents. Chemical Engineering Journal, vols. 207-208, pp. 18-26 (2012). Available online Jun. 30, 2012.
Wang et al. Moisture Swing Sorbent for Carbon Dioxide Capture from Ambient Air. Environ. Sci. Technol. 2011, 45, 15, 6670-6675.
Wang et al. Moisture-swing sorption for carbon dioxide capture from ambient air: a thermodynamic analysis. Phys Chem Chem Phys 15: 504-514 (2013).
Weber, et al. The absorption of carbon dioxide by weak base ion exchange resins. AIChE Journal. Jul. 1970; 609-614. http://onlinelibrary.wiley.com/doi/10.1002/aic.690160417/pdf.
Weimer, et al. CO2 removal and fixation solar high temperature syngas generation for fuel synthesis. Energy Convers. Mgmt. 1997; 38:S379-S384.
White, et al. Separation and capture of CO2 from large stationary sources and sequestration in geological formations—coalbeds and deep saline aquifers. J Air Waste Manag Assoc. Jun. 2003;53(6):645-715.
Written Public Comments on the Strategic Plan for the U.S. Climate Change Science Program, General Comments. 2003, 191 pages.
Yin, et al., "Absorption and steam desorption performance of weak base anion exchange resin" (1995) Hangtian Yixue Yu Yixue Gongcheng/Space Medicine and Medical Engineering, 8 (1), pp. 27-31. (Abstract only).
Zeman, et al. Capturing carbon dioxide directly from the atmosphere. World resource review. 2004; 16(2):157-172.
Zhang et al. Capturing CO2 from ambient air using a polyethyleneimine—silica adsorbent in fluidized beds. Chemical Engineering Science, vol. 116, pp. 306-316 (2014). Available online May 16, 2014.
Zsako, et al. Use of Thermal Analysis in the Study of Sodium Carbonate Causticization by Means of Dolomitic Lime. Journal of Thermal Analysis. 1998; 53:323-331.

* cited by examiner

FLUIDIZED BED EXTRACTORS FOR CAPTURE OF CO2 FROM AMBIENT AIR

CROSS-REFERENCE

This application is a Continuation of International Application No. PCT/US2019/018086, filed Feb. 14, 2019, which claims the benefit of U.S. Provisional Application No. 62/710,445, filed on Feb. 16, 2018, and of U.S. Provisional Application No. 62/740,261, filed on Oct. 2, 2018, each of which applications is incorporated herein by reference.

BACKGROUND

The disclosed methods and apparatus relate to the field of carbon capture technology, and in particular, to the field of carbon dioxide ($CO_2$) capture from ambient air ("direct air capture") using packed bed and/or fluidized bed extractors comprising an anion exchange material.

A variety of direct air capture technologies for reducing the global atmospheric $CO_2$ concentration and its impact on global climate change have been described in the technical and patent literature (see Sanz-Pérez, et al. (2016), "Direct capture of $CO_2$ from ambient air", Chem. Rev. 116:11840-11876, and Psarras, et al. (2017), "Slicing the pie: how big could carbon dioxide removal be?", WIREs Energy Environ, e253 for recent reviews). Some of these technologies have been derived from conventional approaches to post-combustion $CO_2$ capture from flue gas generated by large, stationary sources such as fossil fuel-based power plants, oil refineries, etc. For example, packed bed and fluidized bed extractors comprising activated carbon, zeolites, solid NaOH, $Ca(OH)_2$, or CaO, and supported amine type sorbents for capturing carbon dioxide from flue gases (and in some cases, from ambient air) have been described in the literature (see, for example, Arena, et al. (2012), "Carbon Dioxide Adsorption in a Sound-Assisted Fluidized Bed of Fine Powders", XXXIV Meeting of the Italian Section of the Combustion Institute; Choi, et al. (2011), "Application of Amine-Tethered Solid Sorbents for Direct $CO_2$ Capture from the Ambient Air", Environ. Sci. Technol. 45:2420-2427; Schöny, et al. (2016), "A Multi-Stage Fluidized Bed System for Continuous $CO_2$ Capture by Means of Temperature Swing Adsorption—First Results From Bench Scale Experiments", in "*Fluidization XV*", J. Chaouki, F. Berruti, X. Bi, R. Cocco, Editors, ECI Symposium Series; and Veneman, et al. (2012), "Continuous $CO_2$ Capture in a Circulating Fluidized Bed Using Supported Amine Sorbents", Chem. Eng. Journal 207-208:18-26). To date, these technologies have met with limited success in terms of practical application for the capture of $CO_2$ from ambient air. Common drawbacks for application of these technologies to direct air capture have included: (1) the low binding affinities and poor carbon dioxide capture efficiencies of many sorbents at the low $CO_2$ concentrations present in ambient air (approximately 400 ppm, or approximately 350 times lower than that found in a typical coal-based flue gas (Sanz-Pérez, et al. (2016))), thereby requiring the processing of large volumes of air; (2) the need to perform carbon capture reactions (e.g., carbonation reactions) and carbon release reactions (e.g., calcination reactions) at high temperatures for some approaches; and (3) the large energy penalties associated with: (i) forcing large volumes of air through a sorbent structure having a high resistance to flow, (ii) drying precipitates in approaches that utilize, e.g., aqueous NaOH or $Ca(OH)_2$ solutions to absorb $CO_2$ and form carbonates, (iii) performing carbonation reactions using, e.g., solid $Ca(OH)_2$ or CaO at high temperatures, (iv) performing calcination of carbonates at high temperature, and (v) using a temperature jump to release bound $CO_2$ from, e.g., some amine-based sorbents, etc., thus making it difficult to implement these technologies in a cost-effective, "carbon-negative" manner (i.e., in a manner that provides an overall net reduction in the amount of $CO_2$-based carbon in the atmosphere after the atmospheric $CO_2$ contributions associated with all required energy sources are accounted for). Furthermore, because of the low capture efficiencies and/or large energy penalties associated with many of these technologies; it is difficult to implement them as a source of commercially useful $CO_2$ at a commercially-feasible cost.

Thus there remains a need for efficient, cost-effect, and carbon-negative methods for the capture of carbon dioxide from the atmosphere (i.e., from ambient air) and its subsequent storage or utilization.

SUMMARY

Disclosed herein are methods for capturing carbon dioxide from a first gas stream and releasing it into a second gas stream, the method comprising: a) contacting a packed bed or fluidized bed with a stream of the first gas, wherein the packed bed or fluidized bed comprises a humidity-sensitive sorbent material that adsorbs carbon dioxide from the first gas stream, and wherein the water vapor pressure in the first gas is less than the equilibrium water vapor pressure for a gas in contact with the sorbent; b) contacting the packed bed or fluidized bed with a stream of the second gas, wherein the water vapor pressure in the second gas is greater than that of the first gas, thereby releasing the adsorbed carbon dioxide and resulting in a net transfer of carbon dioxide from the first gas stream to the second gas stream; and c) optionally, repeating steps (a) and (b). In some embodiments, the methods further comprise separating and concentrating the released carbon dioxide from water vapor, and delivering it to an enclosed environment, to a storage container, or for use in a secondary process. In some embodiments, the adsorption step in (a) is performed at ambient temperature. In some embodiments, there is no heating required for the releasing step in step (b). In some embodiments, the first gas stream comprises ambient air, and the second gas stream comprises air drawn from within an enclosed environment. In some embodiments, the enclosed environment comprises a greenhouse or bioreactor. In some embodiments, the first gas stream comprises air drawn from within an enclosed environment, and the second gas stream comprises ambient air. In some embodiments, the enclosed environment comprises an apartment, house, residential building, school building, office building, commercial building, or any combination thereof. In some embodiments, the first gas stream comprises air drawn from within a first enclosed environment, and the second gas stream comprises air drawn from within a second enclosed environment. In some embodiments, the methods further comprise conditioning the first gas stream or the second gas stream by heating, humidification, de-humidification, or any combination thereof. In some embodiments, the humidity-sensitive sorbent is a strong base, type II anion exchange material. In some embodiments, steps (a) and (b) are repeated at least twelve times per day.

Also disclosed herein are methods for capturing carbon dioxide from ambient air and delivering said carbon dioxide to an enclosed environment, the methods comprising: a) contacting a packed bed or fluidized bed extractor with a stream of ambient air, wherein the packed bed or fluidized bed extractor comprises a humidity-sensitive sorbent material that adsorbs carbon dioxide from the ambient air; b) contacting the packed bed or fluidized bed extractor with a stream of humid air, wherein the humid air has a relative humidity that is higher than that of the ambient air of step (a), and wherein the sorbent material in the packed bed or fluidized bed extractor releases the adsorbed carbon dioxide upon contact with the humid air; c) delivering the released carbon dioxide to an enclosed environment; and d) optionally, repeating steps (a) through (c). In some embodiments, the sorbent comprises an amine functional group. In some embodiments, the sorbent comprises a strong base, type 2 anion exchange resin. In some embodiments, the contacting in step (a) is performed at ambient temperature. In some embodiments, there is no heating required for the releasing step in step (b). In some embodiments, the methods further comprise a sorbent drying or regeneration step following the contacting in step (b). In some embodiments, steps (a) through (c) are repeated at least 10 times per day. In some embodiments, the only external energy input required is the energy used to contact the sorbent material with ambient air or humid air in steps (a) and (b). In some embodiments, the energy required for adsorption and release of the adsorbed carbon dioxide is derived from the latent heats of evaporation and condensation of water. In some embodiments, the released carbon dioxide is delivered to the enclosed environment at a rate of at least 10 kg $CO_2$ per day. In some embodiments, the ambient air has a carbon dioxide concentrate of less than 500 ppm. In some embodiments, the enclosed environment has a carbon dioxide concentration of greater than 500 ppm. In some embodiments, the released carbon dioxide is delivered to the enclosed environment at a net cost of less than $200 per ton.

Disclosed herein are apparatus for capturing carbon dioxide from ambient air and delivering said carbon dioxide to an enclosed environment, the apparatus comprising: a) a first packed bed or fluidized bed extractor, wherein the packed bed or fluidized bed extractor comprises a humidity-sensitive sorbent that is capable of adsorbing carbon dioxide from a stream of ambient air; b) a first air flow mechanism configured to contact the first packed bed or fluidized bed extractor with a stream of ambient air; c) a second air flow mechanism configured to contact the first packed bed or fluidized bed extractor with a stream of humid air; and d) a controller configured to turn the first air flow mechanism and the second air flow mechanism on and off in an alternating fashion; wherein, after contacting the first packed bed or fluidized bed extractor in step (c), the stream of humid air delivers carbon dioxide released from the sorbent to the enclosed environment. In some embodiments, the apparatus further comprises at least a second packed bed or fluidized bed extractor connected in series to the first packed bed or fluidized bed extractor. In some embodiments, the apparatus further comprises at least a second packed bed or fluidized bed extractor connected in parallel to the first packed bed or fluidized bed extractor. In some embodiments, the sorbent comprises an amine functional group. In some embodiments, the sorbent comprises a strong base, type 2 anion exchange resin. In some embodiments, the contacting in step (b) is performed at ambient temperature. In some embodiments, there is no heating required for the carbon dioxide release step. In some embodiments, the apparatus further comprises a sorbent drying or regeneration step following the contacting in step (c). In some embodiments, the controller is configured to turn the first air flow mechanism and the second air flow mechanism on and off in an alternating fashion at least 10 times per day. In some embodiments, the enclosed environment is a greenhouse or a bioreactor. In some embodiments, the only external energy input required is the energy used by the controller and the first and second air flow mechanisms to contact the sorbent material with ambient air or humid air in steps (b) and (c). In some embodiments, the energy required for adsorption and release of the adsorbed carbon is derived from the latent heats of evaporation and condensation of water. In some embodiments, the released carbon dioxide is delivered to the enclosed environment at a rate of at least 10 kg $CO_2$ per day. In some embodiments, the released carbon dioxide is delivered to the enclosed environment at a net cost of less than $200 per ton.

Disclosed herein are methods for capturing carbon dioxide from indoor air, the method comprising: a) contacting a packed bed or fluidized bed extractor with a stream of indoor air drawn from within a first enclosed environment, wherein the packed bed or fluidized bed extractor comprises a humidity-sensitive sorbent material that adsorbs carbon dioxide from the indoor air, and wherein the water vapor pressure in the indoor air is less than the equilibrium water vapor pressure for air in contact with the sorbent; b) contacting the packed bed or fluidized bed extractor with a stream of ambient air or conditioned air, wherein the ambient air or conditioned air has a relative humidity that is higher than that of the indoor air of step (a), and wherein the sorbent material in the packed bed or fluidized bed extractor releases the adsorbed carbon dioxide upon contact with the ambient air or conditioned air; c) optionally, separating and concentrating the released carbon dioxide from water vapor, and delivering the released carbon dioxide to a second enclosed environment, to a storage container, or for use in a secondary process; and d) optionally, repeating steps (a) through (c). In some embodiments, the first enclosed environment and the second enclosed environment are the same. In some embodiments, the adsorption step in (a) is performed at ambient room temperature. In some embodiments, there is no heating required for the releasing step in step (b). In some embodiments, the methods further comprise release of carbon dioxide from the storage container to a third enclosed environment. In some embodiments, the third enclosed environment and the first enclosed environment are the same. In some embodiments, the third enclosed environment comprises a greenhouse or bioreactor. In some embodiments, the first enclosed environment comprises an apartment, house, residential building, school building, office building, commercial building, or any combination thereof. In some embodiments, the second enclosed environment comprises an apartment, house, residential building, school building, office building, commercial building, greenhouse, or bioreactor, or any combination thereof. In some embodiments, the methods further comprise conditioning the stream of indoor air in step (a) or the stream of ambient air or conditioned air of step (b) by heating, humidification, de-humidification, or any combination thereof. In some embodiments, the humidity-sensitive sorbent is a strong base, type II anion exchange material. In some embodiments, steps (a) through (c) are repeated at least twelve times per day. In some embodiments, the secondary process comprises use of the released carbon dioxide to promote plant or algae growth in a greenhouse or a bioreactor.

Also disclosed herein are apparatus for capturing carbon dioxide from indoor air, the apparatus comprising: a) an extractor comprising a first packed bed or fluidized bed, wherein the packed bed or fluidized bed comprises a humidity-sensitive sorbent that is capable of adsorbing carbon dioxide from a stream of indoor air, and wherein the water vapor pressure in the indoor air is less than the equilibrium water vapor pressure for air in contact with the sorbent; b) a first air flow mechanism configured to contact the first packed bed or fluidized bed with the stream of indoor air; c) a second air flow mechanism configured to contact the first packed bed or fluidized bed with a stream of conditioned air, wherein the conditioned air has a relative humidity that is higher than that of the indoor air of step (a), and wherein the sorbent material in the packed bed or fluidized bed extractor releases the adsorbed carbon dioxide upon contact with the conditioned air; d) optionally, a separation station configured to separate and concentrate the released carbon dioxide from water vapor and deliver it to a storage container; e) a controller configured to turn the first air flow mechanism and the second air flow mechanism on and off in an alternating fashion. In some embodiments, the first air flow mechanism and the second air flow mechanism are the same. In some embodiments, the storage container is configured to release carbon dioxide back into the stream of indoor air on an as-needed basis. In some embodiments, the storage container is configured to release carbon dioxide for use in a secondary process. In some embodiments, the secondary process comprises use of the released carbon dioxide to promote plant or algae growth in a greenhouse or a bioreactor. In some embodiments, the humidity-sensitive sorbent is capable of adsorbing carbon dioxide at ambient room temperature. In some embodiments, there is no heating required for the release of carbon dioxide in step (c). In some embodiments, the stream of indoor air comprises air from an apartment, house, residential building, school building, office building, commercial building, or any combination thereof. In some embodiments, the apparatus further comprises a conditioning unit for conditioning the stream of indoor air in step (b) or the stream of conditioned air of step (c) by heating, humidification, de-humidification, or any combination thereof. In some embodiments, the humidity-sensitive sorbent is a strong base, type II anion exchange material. In some embodiments, the controller is configured to turn the first air flow mechanism and the second air flow mechanism on and off at least twelve times per day.

Disclosed herein are systems for capturing carbon dioxide from a gas or air, the system comprising: a) a first fluidized bed, wherein the circulating fluidized bed comprises a humidity-sensitive sorbent that is contacted with an stream of dry gas or air, and wherein the sorbent is capable of adsorbing carbon dioxide from the stream of dry gas or air; b) a second fluidized bed in fluid communication with the first fluidized bed, wherein the humidity-sensitive sorbent is contacted with a stream of humid gas or air such that adsorbed carbon dioxide is released from the sorbent; wherein the humidity-sensitive sorbent is returned from the second fluidized bed to the first fluidized bed via a loop seal, and wherein the released carbon dioxide is delivered to a concentrator, a storage tank, or a greenhouse. In some embodiments, the systems further comprise a condenser for condensing moisture in the humid gas or air used to release the carbon dioxide from the sorbent. In some embodiments, the humidity sensitive sorbent is a strong base, type II anion exchange resin. In some embodiments, the stream of humid gas or air is delivered to the system from a greenhouse, and wherein the released carbon dioxide is delivered to the greenhouse. In some embodiments, released carbon dioxide is delivered to a *Lemna* growing system. In some embodiments, the *Lemna* growing system comprises a greenhouse that further comprises one or more vertical racks, each of which further comprises one or more growth chambers. In some embodiments, the vertical racks comprise plumbing for delivering carbon dioxide laden air or nutrients to each of the one or more growth chambers. In some embodiments, the *Lemna* growing system further comprises an integrated aquaponics system for raising fish.

Disclosed herein are methods for removing carbon dioxide from a gas and utilizing said carbon dioxide in a secondary process, the method comprising: a) contacting a sorbent material with the gas to capture carbon dioxide; b) releasing carbon dioxide from the sorbent material in a concentrated form; and c) utilizing the concentrated carbon dioxide in a secondary process. In some embodiments, the sorbent material is a solid sorbent comprising an amine. In some embodiments, the sorbent material is a strong base, type II anion exchange material. In some embodiments, the gas is contacted with the sorbent material in a fluidized bed reactor. In some embodiments, the carbon dioxide is released from the sorbent material by subjecting the sorbent material to a change in temperature, pressure, humidity, or any combination thereof. In some embodiments, the secondary process comprises using the concentrated carbon dioxide to cure cement or concrete. In some embodiments, the secondary process comprises using the concentrated carbon dioxide to form calcium carbonate, magnesium carbonate, or sodium bicarbonate. In some embodiments, the calcium carbonate or magnesium carbonate is further processed to form an aggregate product for the construction industry. In some embodiments, the secondary process comprises using the concentrated carbon dioxide to enhance plant growth within a greenhouse environment. In some embodiments, the secondary process comprises using the concentrated carbon dioxide to enhance the growth of aquatic plants or algae. In some embodiments, the aquatic plants comprise plants of the *Lemna, Azolla,* or *Oryza* genera. In some embodiments, the aquatic plants or algae are further utilized as feedstock for production of protein, starch or starch derivatives, animal feed, biofuel, bioplastic, biochar, syngas, graphene, energy, heat, or any combination thereof. In some embodiments, the secondary process comprises using the concentrated carbon dioxide to produce methanol, formic acid, or syngas. In some embodiments, the secondary process comprises using the concentrated carbon dioxide to produce carbon fiber, carbon nanotubes, fullerene, graphene, a polymer, or any combination thereof. In some embodiments, the secondary process comprises using the concentrated carbon dioxide to produce a polymer, and the polymer comprises a polyurethane foam, a polycarbonate, or an acrylonitrile butadiene styrene. In some embodiments, the secondary process comprises using the concentrated carbon dioxide for enhanced oil recovery or enhanced coal bed methane recovery. In some embodiments, the gas is ambient air, outdoor air, indoor air, an exhaust gas, or a flue gas.

Disclosed herein are apparatus for removing carbon dioxide from a gas and utilizing said carbon dioxide in a secondary process, the apparatus comprising: a) an extractor comprising a sorbent material capable of capturing carbon dioxide from the gas; b) a gas flow mechanism configured to contact the sorbent material within the extractor with a stream of the gas; c) a carbon dioxide release mechanism configured to release and concentrate carbon dioxide captured by the sorbent; and d) a carbon dioxide delivery mechanism to deliver concentrated carbon dioxide to a secondary process. In some embodiments, the sorbent material is a solid sorbent comprising an amine. In some embodiments, the sorbent material is a strong base, type II anion exchange material. In some embodiments, the extractor comprises a fluidized bed reactor. In some embodiments, the carbon dioxide release mechanism comprises a mechanism for subjecting the sorbent material to a change in temperature, pressure, humidity, or any combination thereof. In some embodiments, the carbon dioxide delivery mechanism comprises a pipe in fluid communication with the extractor or an intermediate storage tank. In some embodiments, the carbon dioxide delivery mechanism comprises an intermediate storage tank. In some embodiments, the secondary process comprises using the concentrated carbon dioxide to cure cement or concrete. In some embodiments, the secondary process comprises using the concentrated carbon dioxide to form calcium carbonate, magnesium carbonate, or sodium bicarbonate. In some embodiments, the secondary process comprises using the concentrated carbon dioxide to enhance plant growth within a greenhouse environment. In some embodiments, the secondary process comprises using the concentrated carbon dioxide to enhance the growth of aquatic plants or algae. In some embodiments, the aquatic plants comprise plants of the *Lemna, Azolla,* or *Oryza* genera. In some embodiments, the aquatic plants or algae are further utilized as feedstock for production of protein, starch or starch derivatives, animal feed, biofuel, bioplastic, biochar, syngas, graphene, energy, heat, or any combination thereof. In some embodiments, the secondary process comprises using the concentrated carbon dioxide to produce methanol, formic acid, or syngas. In some embodiments, the secondary process comprises using the concentrated carbon dioxide to produce carbon fiber, carbon nanotubes, fullerene, graphene, a polymer, or any combination thereof. In some embodiments, the secondary process comprises using the concentrated carbon dioxide to produce a polymer, and the polymer comprises a polyurethane foam, a polycarbonate, or an acrylonitrile butadiene styrene. In some embodiments, the secondary process comprises using the concentrated carbon dioxide for enhanced oil recovery or enhanced coal bed methane recovery. In some embodiments, the gas is ambient air, outdoor air, indoor air, an exhaust gas, or a flue gas.

Disclosed herein are methods for capturing carbon dioxide from a first gas stream and releasing it into a second gas stream, the method comprising: a) contacting a packed bed or fluidized bed with a stream of the first gas, wherein the packed bed or fluidized bed comprises a humidity-sensitive sorbent material that adsorbs carbon dioxide from the first gas stream, and wherein the water vapor pressure in the first gas is less than the equilibrium water vapor pressure for a gas in contact with the sorbent; b) contacting the packed bed or fluidized bed with a stream of the second gas, wherein the water vapor pressure in the second gas is greater than that of the first gas, thereby releasing the adsorbed carbon dioxide and resulting in a net transfer of carbon dioxide from the first gas stream to the second gas stream; and c) optionally, repeating steps (a) and (b). In some embodiments, the methods may further comprise separating and concentrating the released carbon dioxide from water vapor, and delivering it to an enclosed environment, to a storage container, or for use in a secondary process. In some embodiments, the adsorption step in (a) is performed at ambient temperature. In some embodiments, there is no heating required for the releasing step in step (b). In some embodiments, the first gas stream comprises ambient air, and the second gas stream comprises air drawn from within an enclosed environment. In some embodiments, the enclosed environment comprises a greenhouse or bioreactor. In some embodiments, the first gas stream comprises air drawn from within an enclosed environment, and the second gas stream comprises ambient air. In some embodiments, the enclosed environment comprises an apartment, house, residential building, school building, office building, commercial building, or any combination thereof. In some embodiments, the first gas stream comprises air drawn from within a first enclosed environment, and the second gas stream comprises air drawn from within a second enclosed environment. In some embodiments, the first enclosed environment or the second enclosed environment comprises an apartment, house, residential building, school building, office building, commercial building, or any combination thereof. In some embodiments, the methods may further comprise conditioning the first gas stream or the second gas stream by heating, humidification, de-humidification, or any combination thereof. In some embodiments, the humidity-sensitive sorbent is an anion exchange material. In some embodiments, the anion-exchange material is a strong base, type II anion exchange material. In some embodiments, steps (a) and (b) are repeated at least once per day. In some embodiments, steps (a) and (b) are repeated at least twelve times per day. In some embodiments, steps (a) and (b) are repeated at least twenty four times per day.

Also disclosed herein are methods for capturing carbon dioxide from ambient air and delivering said carbon dioxide to an enclosed environment, the method comprising: a) contacting a packed bed or fluidized bed extractor with a stream of ambient air, wherein the packed bed or fluidized bed extractor comprises a humidity-sensitive sorbent material that adsorbs carbon dioxide from the ambient air; b) contacting the packed bed or fluidized bed extractor with a stream of humid air, wherein the humid air has a relative humidity that is higher than that of the ambient air of step (a), and wherein the sorbent material in the packed bed or fluidized bed extractor releases the adsorbed carbon dioxide upon contact with the humid air; c) delivering the released carbon dioxide to an enclosed environment; and d) optionally, repeating steps (a) through (c). In some embodiments, the sorbent comprises an amine functional group. In some embodiments, the sorbent comprises a strong base, type 2 anion exchange resin. In some embodiments, the humid air of step (b) has a relative humidity that is at least that of the ambient air of step (a) plus 10%. In some embodiments, the humid air of step (b) has a relative humidity that is at least that of the ambient air of step (a) plus 25%. In some embodiments, the humid air of step (b) has a relative humidity that is at least that of the ambient air of step (a) plus 50%. In some embodiments, the contacting in step (a) is performed at ambient temperature. In some embodiments, there is no heating required for the releasing step in step (b). In some embodiments, the methods may further comprise a sorbent drying or regeneration step following the contacting in step (b). In some embodiments, steps (a) through (c) are repeated at least once per day. In some embodiments, steps (a) through (c) are repeated at least 10 times per day. In some embodiments, steps (a) through (c) are repeated at least 100 times per day. In some embodiments, the enclosed environment is a greenhouse or a bioreactor. In some embodiments, the only external energy input required is the energy used to contact the sorbent material with ambient air or humid air in steps (a) and (b). In some embodiments, the energy required for adsorption and release of the adsorbed carbon dioxide is derived from the latent heats of evaporation and condensation of water. In some embodiments, the packed bed or fluidized bed extractor has a cross-sectional area of between 0.05 $m^2$ and 25 $m^2$. In some embodiments, the packed bed extractor comprises a sorbent bed having a packed bed height of between 0.05 m and 2.5 m. In some embodiments, the fluidized bed extractor comprises a sorbent bed having a static bed height of between 0.05 m and 0.75 m. In some embodiments, the stream of ambient air used for the contacting in step (a) is passed through the packed bed or fluidized bed extractor at a volumetric flow rate of between 10 $m^3$/hr/kg-resin and 100 $m^3$/hr/kg-resin. In some embodiments, the released carbon dioxide is delivered to the enclosed environment at a rate of at least 1 kg $CO_2$ per day. In some embodiments, the ambient air has a carbon dioxide concentrate of less than 500 ppm. In some embodiments, the enclosed environment has a carbon dioxide concentration of greater than 500 ppm. In some embodiments, the released carbon dioxide is delivered to the enclosed environment at a net cost of less than $500 per ton. In some embodiments, the released carbon dioxide is delivered to the enclosed environment at a net cost of less than $100 per ton.

Disclosed herein are apparatus for capturing carbon dioxide from ambient air and delivering said carbon dioxide to an enclosed environment, the apparatus comprising: a) a first packed bed or fluidized bed extractor, wherein the packed bed or fluidized bed extractor comprises a humidity-sensitive sorbent that is capable of adsorbing carbon dioxide from a stream of ambient air; b) a first air flow mechanism configured to contact the first packed bed or fluidized bed extractor with a stream of ambient air; c) a second air flow mechanism configured to contact the first packed bed or fluidized bed extractor with a stream of humid air; and d) a controller configured to turn the first air flow mechanism and the second air flow mechanism on and off in an alternating fashion; wherein, after contacting the first packed bed or fluidized bed extractor in step (c), the stream of humid air delivers carbon dioxide released from the sorbent to the enclosed environment. In some embodiments, the apparatus may further comprise at least a second packed bed or fluidized bed extractor connected in series to the first packed bed or fluidized bed extractor. In some embodiments, the apparatus may further comprise at least a second packed bed or fluidized bed extractor connected in parallel to the first packed bed or fluidized bed extractor. In some embodiments, the sorbent comprises an amine functional group. In some embodiments, the sorbent comprises a strong base, type 2 anion exchange resin. In some embodiments, the humid air of step (c) has a relative humidity that is at least that of the ambient air of step (b) plus 10%. In some embodiments, the humid air of step (c) has a relative humidity that is at least that of the ambient air of step (b) plus 25%. In some embodiments, the humid air of step (c) has a relative humidity that is at least that of the ambient air of step (b) plus 50%. In some embodiments, the contacting in step (b) is performed at ambient temperature. In some embodiments, there is no heating required for the carbon dioxide release step. In some embodiments, the apparatus may further comprise a sorbent drying or regeneration step following the contacting in step (c). In some embodiments, the controller is configured to turn the first air flow mechanism and the second air flow mechanism on and off in an alternating fashion at least once per day. In some embodiments, the controller is configured to turn the first air flow mechanism and the second air flow mechanism on and off in an alternating fashion at least 10 times per day. In some embodiments, the controller is configured to turn the first air flow mechanism and the second air flow mechanism on and off in an alternating fashion at least 100 times per day. In some embodiments, the enclosed environment is a greenhouse or a bioreactor. In some embodiments, the only external energy input required is the energy used by the controller and the first and second air flow mechanisms to contact the sorbent material with ambient air or humid air in steps (b) and (c). In some embodiments, the energy required for adsorption and release of the adsorbed carbon is derived from the latent heats of evaporation and condensation of water. In some embodiments, the first packed bed or fluidized bed extractor has a cross-sectional area of between 0.05 $m^2$ and 25 $m^2$. In some embodiments, the first packed bed extractor comprises a sorbent bed having a packed bed height of between 0.05 m and 2.5 m. In some embodiments, the first fluidized bed extractor comprises a sorbent bed having a static bed height of between 0.05 m and 0.75 m. In some embodiments, the stream of ambient air used for the contacting in step (b) is passed through the first packed bed or fluidized bed extractor at a volumetric flow rate of between 10 $m^3$/hr/kg-resin and 100 $m^3$/hr/kg-resin. In some embodiments, the released carbon dioxide is delivered to the enclosed environment at a rate of at least 1 kg $CO_2$ per day. In some embodiments, the ambient air has a carbon dioxide concentrate of less than 500 ppm. In some embodiments, the enclosed environment has a carbon dioxide concentration of greater than 500 ppm. In some embodiments, the released carbon dioxide is delivered to the enclosed environment at a net cost of less than $500 per ton. In some embodiments, the released carbon dioxide is delivered to the enclosed environment at a net cost of less than $100 per ton.

Disclosed herein are methods for capturing carbon dioxide from indoor air, the method comprising: a) contacting a packed bed or fluidized bed extractor with a stream of indoor air drawn from within a first enclosed environment, wherein the packed bed or fluidized bed extractor comprises a humidity-sensitive sorbent material that adsorbs carbon dioxide from the indoor air, and wherein the water vapor pressure in the indoor air is less than the equilibrium water vapor pressure for air in contact with the sorbent; b) contacting the packed bed or fluidized bed extractor with a stream of ambient air or conditioned air, wherein the ambient air or conditioned air has a relative humidity that is higher than that of the indoor air of step (a), and wherein the sorbent material in the packed bed or fluidized bed extractor releases the adsorbed carbon dioxide upon contact with the ambient air or conditioned air; c) optionally, separating and concentrating the released carbon dioxide from water vapor, and delivering the released carbon dioxide to a second enclosed environment, to a storage container, or for use in a secondary process; and d) optionally, repeating steps (a) through (c). In some embodiments, the first enclosed environment and the second enclosed environment are the same. In some embodiments, the adsorption step in (a) is performed at ambient room temperature. In some embodiments, there is no heating required for the releasing step in step (b). In some embodiments, the method may further comprise release of carbon dioxide from the storage container to a third enclosed environment. In some embodiments, the third enclosed environment and the first enclosed environment are the same. In some embodiments, the third enclosed environment comprises a greenhouse or bioreactor. In some embodiments, the first enclosed environment comprises an apartment, house, residential building, school building, office building, commercial building, or any combination thereof. In some embodiments, the second enclosed environment comprises an apartment, house, residential building, school building, office building, commercial building, greenhouse, or bioreactor, or any combination thereof. In some embodiments, the method may further comprising conditioning the stream of indoor air in step (a) or the stream of ambient air or conditioned air of step (b) by heating, humidification, de-humidification, or any combination thereof. In some embodiments, the humidity-sensitive sorbent is an anion exchange material. In some embodiments, the anion-exchange material is a strong base, type II anion exchange material. In some embodiments, steps (a) through (c) are repeated at least once per day. In some embodiments, (a) through (c) are repeated at least twelve times per day. In some embodiments, steps (a) through (c) are repeated at least twenty four times per day. In some embodiments, the secondary process comprises use of the released carbon dioxide to promote plant or algae growth in a greenhouse or a bioreactor.

Disclosed herein are apparatus for capturing carbon dioxide from indoor air, the apparatus comprising: a) an extractor comprising a first packed bed or fluidized bed, wherein the packed bed or fluidized bed comprises a humidity-sensitive sorbent that is capable of adsorbing carbon dioxide from a stream of indoor air, and wherein the water vapor pressure in the indoor air is less than the equilibrium water vapor pressure for air in contact with the sorbent; b) a first air flow mechanism configured to contact the first packed bed or fluidized bed with the stream of indoor air; c) a second air flow mechanism configured to contact the first packed bed or fluidized bed with a stream of conditioned air, wherein the conditioned air has a relative humidity that is higher than that of the indoor air of step (a), and wherein the sorbent material in the packed bed or fluidized bed extractor releases the adsorbed carbon dioxide upon contact with the conditioned air; d) optionally, a separation station configured to separate and concentrate the released carbon dioxide from water vapor and deliver it to a storage container; e) a controller configured to turn the first air flow mechanism and the second air flow mechanism on and off in an alternating fashion. In some embodiments, the first air flow mechanism and the second air flow mechanism are the same. In some embodiments, the storage container is configured to release carbon dioxide back into the stream of indoor air on an as-needed basis. In some embodiments, the storage container is configured to release carbon dioxide for use in a secondary process. In some embodiments, the secondary process comprises use of the released carbon dioxide to promote plant or algae growth in a greenhouse or a bioreactor. In some embodiments, the humidity-sensitive sorbent is capable of adsorbing carbon dioxide at ambient room temperature. In some embodiments, there is no heating required for the release of carbon dioxide in step (c). In some embodiments, the stream of indoor air comprises air from an apartment, house, residential building, school building, office building, commercial building, or any combination thereof. In some embodiments, the apparatus may further comprise a conditioning unit for conditioning the stream of indoor air in step (b) or the stream of conditioned air of step (c) by heating, humidification, de-humidification, or any combination thereof. In some embodiments, the humidity-sensitive sorbent is an anion exchange material. In some embodiments, the anion-exchange material is a strong base, type II anion exchange material. In some embodiments, the controller is configured to turn the first air flow mechanism and the second air flow mechanism on and off at least once per day. In some embodiments, the controller is configured to turn the first air flow mechanism and the second air flow mechanism on and off at least twelve times per day. In some embodiments, the controller is configured to turn the first air flow mechanism and the second air flow mechanism on and off at least twenty four times per day.

Disclosed herein are methods for removing carbon dioxide from a gas and utilizing said carbon dioxide in a secondary process, the methods comprising: a) contacting a sorbent material with the gas to capture carbon dioxide; b) releasing carbon dioxide from the sorbent material in a concentrated form; and c) utilizing the concentrated carbon dioxide in a secondary process. In some embodiments, the sorbent material is a solid sorbent comprising an amine. In some embodiments, the sorbent material is an anion exchange material. In some embodiments, the sorbent material is a strong base, Type II anion exchange material. In some embodiments, the gas is contacted with the sorbent material in a fluidized bed reactor. In some embodiments, the carbon dioxide is released from the sorbent material by subjecting the sorbent material to a change in temperature, pressure, humidity, or any combination thereof. In some embodiments, the secondary process comprises using the concentrated carbon dioxide to cure cement or concrete. In some embodiments, the secondary process comprises using the concentrated carbon dioxide to form calcium carbonate, magnesium carbonate, or sodium bicarbonate. In some embodiments, the calcium carbonate or magnesium carbonate is further processed to form an aggregate product for the construction industry. In some embodiments, the secondary process comprises using the concentrated carbon dioxide to enhance plant growth within a greenhouse environment. In some embodiments, the secondary process comprises using the concentrated carbon dioxide to enhance the growth of aquatic plants or algae. In some embodiments, the aquatic plants comprise plants of the *Lemna, Azolla*, or *Oryza* genera. In some embodiments, the aquatic plants or algae are further utilized as feedstock for production of protein, starch or starch derivatives, animal feed, biofuel, bioplastic, biochar, syngas, graphene, energy, heat, or any combination thereof. In some embodiments, the secondary process comprises using the concentrated carbon dioxide to produce methanol, formic acid, or syngas. In some embodiments, the secondary process comprises using the concentrated carbon dioxide to produce carbon fiber, carbon nanotubes, fullerene, graphene, a polymer, or any combination thereof. In some embodiments, the polymer comprises a polyurethane foam, a polycarbonate, or an acrylonitrile butadiene styrene. In some embodiments, the secondary process comprises using the concentrated carbon dioxide for enhanced oil recovery or enhanced coal bed methane recovery. In some embodiments, the gas is ambient air, outdoor air, indoor air, an exhaust gas, or a flue gas.

Also disclosed herein are apparatuses for removing carbon dioxide from a gas and utilizing said carbon dioxide in a secondary process, the apparatuses comprising: a) an extractor comprising a sorbent material capable of capturing carbon dioxide from the gas; b) a gas flow mechanism configured to contact the sorbent material within the extractor with a stream of the gas; c) a carbon dioxide release mechanism configured to release and concentrate carbon dioxide captured by the sorbent; and d) a carbon dioxide delivery mechanism to deliver concentrated carbon dioxide to a secondary process. In some embodiments, the sorbent material is a solid sorbent comprising an amine. In some embodiments, the sorbent material is an anion exchange material. In some embodiments, the sorbent material is a strong base, Type II anion exchange material. In some embodiments, the extractor comprises a fluidized bed reactor. In some embodiments, the gas flow mechanism comprises a fan, an impeller, a rotor, or an exhaust vent. In some embodiments, the carbon dioxide release mechanism comprises a mechanism for subjecting the sorbent material to a change in temperature, pressure, humidity, or any combination thereof. In some embodiments, the carbon dioxide delivery mechanism comprises a pipe in fluid communication with the extractor or an intermediate storage tank. In some embodiments, the carbon dioxide delivery mechanism comprises an intermediate storage tank. In some embodiments, the secondary process comprises using the concentrated carbon dioxide to cure cement or concrete. In some embodiments, the secondary process comprises using the concentrated carbon dioxide to form calcium carbonate, magnesium carbonate, or sodium bicarbonate. In some embodiments, the calcium carbonate or magnesium carbonate is further processed to form an aggregate product for the construction industry. In some embodiments, the secondary process comprises using the concentrated carbon dioxide to enhance plant growth within a greenhouse environment. In some embodiments, the secondary process comprises using the concentrated carbon dioxide to enhance the growth of aquatic plants or algae. In some embodiments, the aquatic plants comprise plants of the *Lemna, Azolla,* or *Oryza* genera. In some embodiments, the aquatic plants or algae are further utilized as feedstock for production of protein, starch or starch derivatives, animal feed, biofuel, bioplastic, biochar, syngas, graphene, energy, heat, or any combination thereof. In some embodiments, the secondary process comprises using the concentrated carbon dioxide to produce methanol, formic acid, or syngas. In some embodiments, the secondary process comprises using the concentrated carbon dioxide to produce carbon fiber, carbon nanotubes, fullerene, graphene, a polymer, or any combination thereof. In some embodiments, the polymer comprises a polyurethane foam, a polycarbonate, or an acrylonitrile butadiene styrene. In some embodiments, the secondary process comprises using the concentrated carbon dioxide for enhanced oil recovery or enhanced coal bed methane recovery. In some embodiments, the gas is ambient air, outdoor air, indoor air, an exhaust gas, or a flue gas.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
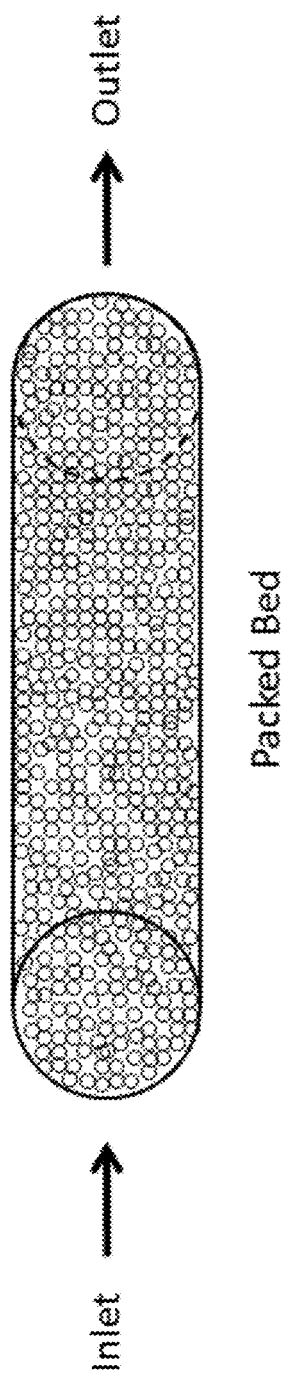
FIG. 1 provides a schematic illustration of a packed bed extractor for removal of carbon dioxide from a gas stream, e.g., ambient air.

The disclosed invention provides novel methods and apparatus for the capture of carbon dioxide from gas streams in general, and from ambient air in particular, using a series of one or more packed bed and/or fluidized bed extractors comprising a sorbent material. In some embodiments, a plurality of packed bed and/or fluidized bed extractors operated in parallel may be used. In some embodiments, the sorbent material may comprise an anion exchange material. In some embodiments, the carbon dioxide thus removed from the gas or ambient air stream may be subsequently released from the sorbent material using, for example, an increase in humidity, a wetting process, a change in pH, and/or an increase in temperature. In some embodiments, the carbon dioxide thus released from the sorbent material may be further concentrated, stored, sequestered, delivered to an enclosed environment, and/or used in a secondary process.

In one preferred embodiment, disclosed herein are methods and apparatus for removing carbon dioxide from ambient air (i.e., from outdoor or atmospheric air) using a series of one or more packed bed and/or fluidized bed reactors comprising an anion exchange material, wherein the captured $CO_2$ is released from the anion exchange material and delivered to the interior of a greenhouse where elevated concentrations of $CO_2$ may be beneficial for stimulating plant growth. In these embodiments, the release of $CO_2$ from the anion exchange material may be implemented by a difference in relative humidity and/or temperature between the exterior environment and the greenhouse interior, i.e., without requiring the input of additional energy. In these embodiments, the apparatus may also be further configured to simultaneously modulate the humidity of the greenhouse interior.

In another preferred embodiment, disclosed herein are methods and apparatus for capturing carbon dioxide from indoor air (e.g., from within a residential, a commercial building, or other enclosed environment) using a series of one or more packed bed and/or fluidized bed reactors comprising an anion exchange material. In some embodiments, the carbon dioxide thus removed from the indoor air stream may be subsequently released from the sorbent material using, for example, an increase in humidity, a wetting process, a change in pH, and/or an increase in temperature. In some embodiments, the captured $CO_2$ may be released into the atmosphere or otherwise disposed of. In some embodiments, the captured $CO_2$ may be concentrated and/or stored for subsequent use, e.g., for release back into the same or a different enclosed environment on an as-needed basis to maintain a specified concentration of $CO_2$ in the enclosed environment. In some embodiments, the captured $CO_2$ may be stored for subsequent use, e.g., for delivery to a greenhouse or bioreactor, or for use in a secondary process.

Various aspects of the invention described herein may be applied to any of the particular applications set forth below, or to any other type of carbon dioxide capture application or carbon dioxide-dependent chemical process. It shall be understood that different aspects of the invention can be appreciated individually, collectively, or in combination with each other.

Unless otherwise defined, all technical terms used herein have the same meaning as commonly understood by one of ordinary skill in the art in the field to which this disclosure belongs. As used in this specification and the appended claims, the singular forms "a", "an", and "the" include plural references unless the context clearly dictates otherwise. Any reference to "or" herein is intended to encompass "and/or" unless otherwise stated.

As used herein, the phrase "ambient air" means outdoor air or atmospheric air, i.e., air from the atmosphere that is external to buildings and other enclosed environments.

Packed and fluidized bed extractors for removal of $CO_2$ from a gas stream: Disclosed herein are novel methods and apparatus for extracting carbon dioxide (or other trace gases) from a gas stream, e.g., a stream of ambient air, by passing the gas or air stream through a series of one or more packed bed and/or fluidized bed extractors (e.g., packed bed and/or fluidized bed chromatography columns) comprising a sorbent material (e.g., an anion exchange resin) that selectively binds $CO_2$ (or other trace gases), and from which the bound $CO_2$ or trace gas may subsequently be released or eluted. In some embodiments, the gas stream from which $CO_2$ or other trace gases are captured may comprise ambient air (i.e., outdoor air or atmospheric air), indoor air (e.g., air from within a residential building, office building, commercial building, or other enclosed structure that has optionally been processed or conditioned (e.g., heated, cooled, humidified, or de-humidified)), a process gas mixture, an exhaust gas mixture (e.g. a flue gas), or any combination thereof. As noted above, the carbon dioxide or other trace gas released from the sorbent may be further concentrated, stored, sequestered, delivered to an enclosed environment, and/or used in a secondary chemical process. In some embodiments, the disclosed methods and apparatus or extracting carbon dioxide (or other trace gases) from a gas stream may be used to remove carbon dioxide from the air within a residential building, office building, commercial building, or other enclosed structure, and the carbon dioxide or other trace gas released from the sorbent may then be subsequently concentrated, stored, sequestered, delivered to the external environment (e.g., the atmosphere), and/or used in a secondary chemical process.

In some embodiments, the disclosed methods and apparatus may comprise the use of a packed bed extractor design. For packed bed extractors (also known as "fixed bed" extractors), the sorbent material is confined within a housing through which the gas or air stream is passed (see FIG. 1) so that the gas or air stream flows through and makes contact with the bed of sorbent material. The sorbent is typically a particulate material, and is confined within the housing by packing it between support screens or other porous barriers (e.g., glass frits) at the inlet and outlet ends of the housing. In operation, the gas or air stream from which carbon dioxide is to be extracted is passed through the packed bed of sorbent material for a specified period of time to capture $CO_2$ (typically for times shorter than that required to reach saturation of the available $CO_2$ binding sites), followed by subsequent release of the captured $CO_2$ upon switching the inlet to, for example, a humid air stream (in the case that the sorbent comprises a strong base, Type I anion exchange resin). In some configurations, a series of two or more packed bed extraction devices may be operated in parallel so that the inlet gas or air stream is switched back and forth between individual packed beds in an alternating fashion with, for example, a humid air stream so that some subset of the packed bed extraction devices are engaged in the $CO_2$ capture step, while a different subset are engaged in the $CO_2$ release step, and continuous or partially-continuous operation is achieved. In some configurations, sub-sections of a single packed bed extractor of suitable aspect ratio may be exposed to the inlet gas or air stream, while other sub-sections of the packed bed are exposed to, for example, a humid air stream so that, again, the $CO_2$ capture and release steps are performed in parallel and in a continuous or partially-continuous manner. The latter may be accomplished, for example, by rotating the packed bed around an axis along which gas or air flow is directed, and/or by switching between inlet gas or air streams and inlet humid air streams using valves and/or duct work. The maximal $CO_2$ binding capacity of the packed bed will vary depending on several design parameters, e.g., the number of $CO_2$ binding sites per unit volume of the sorbent material, the porosity of the sorbent material (which may impact the accessibility of $CO_2$ binding sites within the sorbent material to the gas or air stream), the porosity or packing density of the sorbent particles within the bed itself (which may also impact the accessibility of the $CO_2$ binding sites to the gas or air stream), and the dimensions of the housing containing the packed bed, which determines the amount of sorbent contained within the extractor. The experimentally observed $CO_2$ binding capacity of the packed bed extractor, and the overall efficiency of the $CO_2$ capture process, may further depend on a number of operational parameters, as will be described in more detail below.

Figure 2:
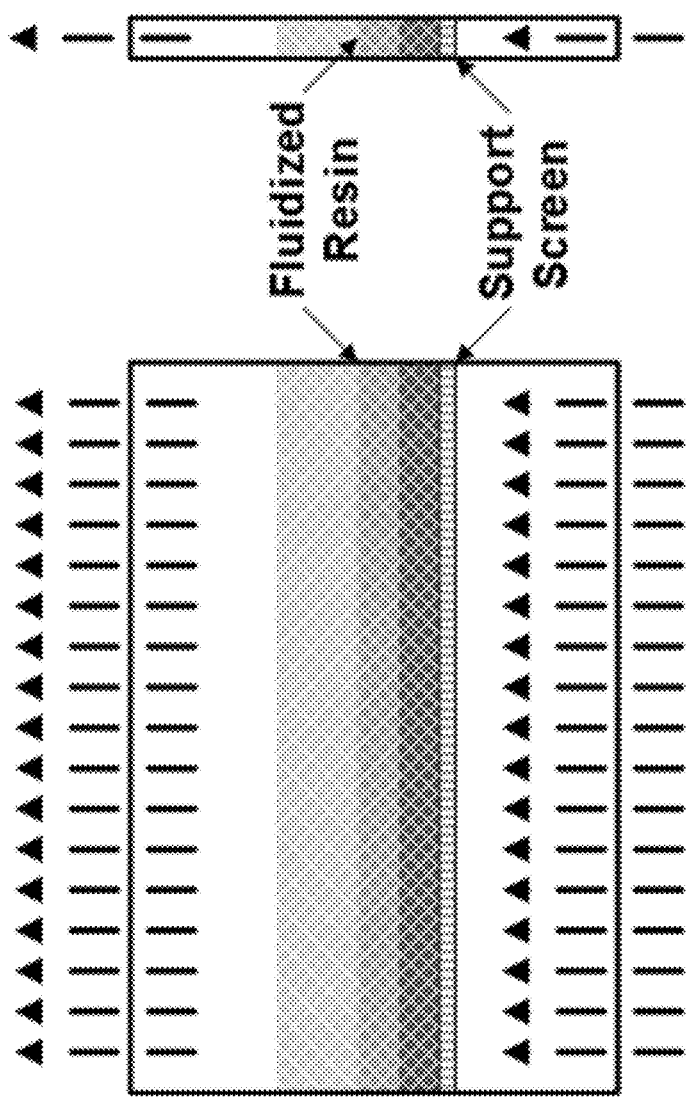
FIG. 2 provides a schematic illustration of a fluidized bed extractor for removal of carbon dioxide from a gas stream, e.g., ambient air. For a given pressure drop, the bed depth remains constant with scale-up of the extractor design. The carbon dioxide capture capacity of the bed and the volumetric air flow rate increase proportionally with the cross-sectional area of the bed.

In some embodiments, the disclosed methods and apparatus may comprise the use of a fluidized bed extractor design. For fluidized bed extractors, the sorbent material is partially confined within a housing through which the inlet gas or air stream is passed (see FIG. 2). The bed of sorbent material rests on a support screen, or other porous barrier at the inlet end of the housing, and the flow rate of the gas or air stream passing upwards through the bed is adjusted so that the static, solid-like state of the particulate sorbent material is converted to a dynamic fluid-like state. In some embodiments, the fluidized bed extractor may further comprise a support screen, or other porous barrier, at the outlet end of the housing to prevent loss of sorbent particles as the gas or air stream passes through the bed chamber. One potential advantage of the fluidized bed design is the decrease in flow resistance and consequent pressure drop across the sorbent bed as compared to that of a packed bed design, and hence a corresponding reduction in the force needed (and energy required) to push the inlet gas or air stream through the sorbent bed. Another potential advantage of the fluidized bed design is improved efficiency of $CO_2$ capture through more efficient contact between the inlet gas or air stream and the fluidized sorbent particles. As with the packed bed approach, a variety of single and multiple fluidized bed device configurations are possible, and again, the maximal $CO_2$ binding capacity, the experimentally observed $CO_2$ binding capacity, and the overall efficiency of the $CO_2$ capture process will vary depending on a number of design parameters (e.g., the number of $CO_2$ binding sites per unit volume of the sorbent material, the porosity of the sorbent material, and the static dimensions of the fluidized bed) and operational parameters (e.g., the flow rate of the inlet gas or air stream, which may impact the flow characteristics of the fluidized sorbent particles), as will be described in more detail below.

In some embodiments, the disclosed methods and apparatus may comprise the use of a circulating fluidized bed extractor design. In a circulating fluidized bed extractor design, the sorbent particles circulate (at gas velocities somewhat higher than those typically used for standard fluidized beds) between an adsorber column and a desorber column for implementing a continuous-flow or partially-continuous flow extraction operation. Both the adsorber and desorber columns are "fluidized beds", wherein the sorbent particles in the fluidized bed comprising the inlet gas or air stream are transferred by means of the gas flow from the adsorber column through a riser pipe to, for example, a cyclone. The $CO_2$-depleted inlet gas or air stream exits the cyclone, while the sorbent particles are separated from the gas or air stream and fall into the desorber column via a connecting stand pipe. A desorber gas (e.g., a stream of humid air or humidified $CO_2$ in the case that a humidity increase is used to strip the bound $CO_2$ from the sorbent) is flowed through the desorber column and exits the desorber column as a product gas stream. Finally, the $CO_2$-depleted sorbent particles travel back to the adsorber column by means of a connecting loop seal, e.g., a two-chambered housing comprising another fluidized bed, wherein the same gas or a different gas as that used for the desorber gas is flowed through the housing to fluidize the bed, and wherein one chamber is connected to the desorber column and the other is connected to the adsorber column via, for example, a weir structure and discharge pipe. The loop seal prevents mixing of the inlet gas or air stream with the desorber gas.

In some embodiments, other types of fluidized bed extractor designs known to those of skill in the art may be used in the disclosed methods and apparatus. Examples include, but are not limited to, bubbling fluidized beds (where the air or gas to be passed through the sorbent bed is introduced from the bottom), vibratory fluidized beds (similar to standard fluidized beds, but with the addition of mechanical vibration to further agitate the particles), sound-assisted fluidized beds (similar to standard fluidized beds, but with the addition of sonication to further agitate the particles), transport or flash reactor beds (using gas velocities higher than those used in circulating fluidized beds; the particles approach the velocity of the gas), annular fluidized beds (a large nozzle at the center of fluidized bed introduces gas at a high velocity thereby achieving rapid mixing in a zone above the surrounding bed), or a mechanically-fluidized reactor (a mechanical stirrer is used to mobilize particles and achieve properties similar to that of a well-mixed fluidized bed without the need for a fluidization gas).

The housing geometry, dimensions, and materials used for the packed or fluidized beds of the disclosed methods and apparatus may be varied (independently and/or in combination with other design parameters such as choice of sorbent) to optimize a variety of performance parameters, e.g., total volume of air processed per unit time, overall capacity for $CO_2$ capture, rates of $CO_2$ capture and release (or net transfer rate), the concentration of $CO_2$ in the product stream, etc. In some embodiments, the housing geometry may comprise a cylindrical (i.e., tubular or columnar) geometry, a triangular prism geometry, a cubic or rectangular prism (e.g., slab-like) geometry, a hexagonal prism geometry, a conical geometry, a polyhedral geometry, or any combination thereof.

In some embodiments, e.g., for cylindrical geometries, the diameter of the housing (i.e., the inner diameter or the diameter of the sorbent bed contained therein) may range from about 0.25 m to about 10 m. In some embodiments, the diameter of the housing may be at least 0.25 m, at least 0.5 m, at least 1 m, at least 2 m, at least 3 m, at least 4 m, at least 5 m, or at least 10 m. In some embodiments, the diameter of the housing may be at most 10 m, at most 5 m, at most 4 m, at most 3 m, at most 2 m, at most 1 m, at most 0.5 m, or at most 0.25 m. In preferred embodiments, the diameter of the housing may range from about 0.5 m to about 3 m. Any of the lower and upper values described in this paragraph may be combined to form a range included within the present disclosure, for example, the diameter of the housing may range from about 0.5 m to about 2 m. Those of skill in the art will recognize that the diameter of the housing may have any value within this range, e.g., about 1.25 m. These dimensions should not be taken as limiting, as the disclosed system designs may be scaled as necessary to achieve a desired carbon dioxide capture capacity.

In some embodiments, e.g., for cylindrical geometries, the height of the housing (i.e., the interior height, or the bed height for packed sorbent beds) may range from about 0.15 m to about 40 m. In some embodiments, the height of the housing (or sorbent bed height) may be at least 0.15 m, at least 0.2 m, at least 0.3 m, at least 0.4 m, at least 0.5 m, at least 1 m, at least 2 m, at least 3 m, at least 4 m, at least 5 m, at least 10 m, at least 20 m, at least 30 m, or at least 40. In some embodiments, the height of the housing (or sorbent bed height) may be at most 40 m, at most 30 m, at most 20 m, at most 10 m, at most 5 m, at most 4 m, at most 3 m, at most 2 m, at most 1 m, at most 0.5 m, at most 0.4 m, at most 0.3 m, at most 0.2 m, or at most 0.15 m. In preferred embodiments, the height of the housing (or sorbent bed height) may range from about 0.45 m to about 3.0 m. Any of the lower and upper values described in this paragraph may be combined to form a range included within the present disclosure, for example, the height of the housing (or sorbent bed height) may range from about 0.3 m to about 3 m. Those of skill in the art will recognize that the height of the housing (or sorbent bed height) may have any value within this range, e.g., about 2.25 m. These dimensions should not be taken as limiting, as the disclosed system designs may be scaled as necessary to achieve a desired carbon dioxide capture capacity.

Similarly, in some embodiments, e.g., for cubic or rectangular prism geometries, the width, length, and height of the housing (i.e., the interior dimensions) may each independently range from about 0.25 m to about 40 m. Smaller housings may have a square cross-sectional footprint, while for housings larger than a certain size, the width may be held constant and the length increased to increase the cross-sectional area of the bed while providing proper mechanical support for the screen or component that supports the sorbent material that constitutes the bed. In some embodiments, the width of the housing may range from about 0.25 m to about 40.0 m. In some embodiments, the width of the housing may be at least 0.25 m, at least 0.5 m, at least 1.0 m, at least 2.0 m, at least 3.0 m, at least 4.0 m, at least 5.0 m, at least 10.0 m, at least 20.0 m, at least 30.0 m, or at least 40.0 m. In some embodiments, the width of the housing may be at most 40.0 m, at most 30.0 m, at most 20.0 m, at most 10.0 m, at most 5.0 m, at most 4.0 m, at most 3.0 m, at most 2.0 m, at most 1.0 m, at most 0.5 m, or at most 0.25 m. In preferred embodiments, the width of the housing may range from about 0.5 m to about 2.0 m. In some embodiments, the length of the housing may range from about 0.25 m to about 40.0 m. In some embodiments, the length of the housing may be at least 0.25 m, at least 0.5 m, at least 1.0 m, at least 2.0 m, at least 3.0 m, at least 4.0 m, at least 5.0 m, at least 6.0 m, at least 7.0 m, at least 8.0 m, at least 9.0 m, at least 10.0 m, at least 20.0 m, at least 30.0 m, or at least 40.0 m. In some embodiments, the length of the housing may be at most 40.0 m, at most 30.0 m, at most 20.0 m, at most 10.0 m, at most 9.0 m, at most 8.0 m, at most 7.0 m, at most 6.0 m, at most 5.0 m, at most 4.0 m, at most 3.0 m, at most 2.0 m, at most 1.0 m, at most 0.5 m, or at most 0.25 m. In preferred embodiments, the length of the housing may range from about 1.0 m to about 3.0 m. In some embodiments, the height of the housing may range from about 0.15 m to about 40 m. In some embodiments, the height of the housing may be at least 0.15 m, at least 0.25 m, at least 0.5 m, at least 1.0 m, at least 2.0 m, at least 3.0 m, at least 4.0 m, at least 5 m, at least 10 m, at least 20 m, at least 30 m, or at least 40 m. In some embodiments, the height of the housing may be at most 40 m, at most 30 m, at most 20 m, at most 10 m, at most 5 m, at most 4.0 m, at most 3.0 m, at most 2.0 m, at most 1.0 m, at most 0.5 m, at most 0.25 m, or at most 0.15 m. In preferred embodiments, the height of the housing may range from about 0.45 m to about 3.0 m. Any of the lower and upper values described in this paragraph may be combined to form a range included within the present disclosure, for example, the width, length, or height of the housing may each individually range from about 0.5 m to about 2.5 m. Those of skill in the art will recognize that the width, length, or height of the housing may each independently have any value within this range, e.g., about 0.75 m. These dimensions should not be taken as limiting, as the disclosed system designs may be scaled as necessary to achieve a desired carbon dioxide capture capacity.

For other housing geometries, the dimensions of the housing (e.g., average cross-sectional diameter, average width, average depth, or average height) may be similar to those described above, and may each independently range from about 0.05 m to about 40 m.

In general, the cross-sectional area of an individual packed or fluidized sorbent bed, as defined by the housing geometry, may range from about 0.05 m$^2$ to about 50 m$^2$, or larger. In some embodiments, the cross-sectional area of an individual packed or fluidized sorbent bed may be at least 0.05 m$^2$, at least 0.1 m$^2$, at least 0.25 m$^2$, at least 0.5 m$^2$, at least 0.75 m$^2$, at least 1 m$^2$, at least 2.5 m$^2$, at least 5 m$^2$, at least 7.5 m$^2$, at least 10 m$^2$, at least 15 m$^2$, at least 20 m$^2$, at least 25 m$^2$, at least 30 m$^2$, at least 40 m$^2$, or at least 50 m$^2$. In some embodiments, the cross-sectional area of an individual packed or fluidized sorbent bed may be at most 50 m$^2$, at most 40 m$^2$, at most 30 m$^2$, at most 25 m$^2$, at most 20 m$^2$, at most 15 m$^2$, at most 10 m$^2$, at most 7.5 m$^2$, at most 5 m$^2$, at most 2.5 m$^2$, at most 1 m$^2$, at most 0.75 m$^2$, at most 0.5 m$^2$, at most 0.25 m$^2$, at most 0.1 m$^2$, or at most 0.05 m$^2$. Any of the lower and upper values described in this paragraph may be combined to form a range included within the present disclosure, for example, the cross-sectional area of an individual packed or fluidized sorbent bed may range from about 0.5 m$^2$ to about 15 m$^2$. Those of skill in the art will recognize that the cross-sectional area of an individual packed or fluidized sorbent bed may have any value within this range, e.g., about 0.85 m$^2$. These dimensions should not be taken as limiting, as the disclosed system designs may be scaled as necessary to achieve a desired carbon dioxide capture capacity.

The internal dimensions of the housing define the maximal volume of sorbent enclosed therein. In some embodiments, e.g., for packed bed extractors, the inner cross-sectional area of the housing defines the cross-sectional area of the sorbent bed contained therein, and the internal height defines the height (or thickness) of the sorbent bed, i.e., the sorbent bed occupies 100% of the internal volume of the housing. In some embodiments, e.g., for fluidized bed reactors, the inner cross-sectional area of the housing again defines the cross-sectional area of the sorbent bed contained therein, but the height of the sorbent bed will generally be less than the internal height of the housing.

In some embodiments, the height of the sorbent bed in a fluidized bed extractor design (i.e., the "settled" or "static" thickness of the sorbent bed when gas or air flow is turned off) may range from about 10% to about 40% of the internal height of the housing. In some embodiments, the "settled" thickness of the sorbent bed may be at least 10%, at least 20%, at least 30%, or at least 40% of the internal height of the housing. In some embodiments, the "settled" thickness of the sorbent bed may be at most 40%, at most 30%, at most 20%, or at most 10% of the internal height of the housing. In preferred embodiments, the "settled" thickness of the sorbent bed may range from about 15% to about 30% of the internal height of the housing. Any of the lower and upper values described in this paragraph may be combined to form a range included within the present disclosure, for example, the "settled" thickness of the sorbent bed may range from about 20% to about 40% of the internal height of the housing. Those of skill in the art will recognize that the "settled" thickness of the sorbent bed may have any value within this range, e.g., about 28% of the internal height of the housing.

In some embodiments, the height of the sorbent bed in a fluidized bed extractor design (i.e., the "settled" or "static" thickness of the sorbent bed when gas or air flow is turned off) may range from about 0.05 m to about 20 m. In some embodiments, the "settled" thickness of the sorbent bed may be at least 0.05 m, at least 0.1 m, at least 0.2 m, at least 0.3 m, at least 0.4 m, at least 0.5 m, at least 0.6 m, at least 0.7 m, at least 0.8 m, at least 0.9 m, at least 1.0 m, at least 5 m, at least 10 m, at least 15 m, or at least 20 m. In some embodiments, the "settled" thickness of the sorbent bed may be at most 20 m, at most 15 m, at most 10 m, at most 5 m, at most 1 m, at most 0.9 m, at most 0.8 m, at most 0.7 m, at most 0.6 m, at most 0.5 m, at most 0.4 m, at most 0.3 m, at most 0.2 m, at most 0.1 m, or at most 0.05 m. In preferred embodiments, the "settled" thickness of the sorbent bed may range from about 0.15 m to about 0.5 m, or thicker. Any of the lower and upper values described in this paragraph may be combined to form a range included within the present disclosure, for example, the "settled" thickness of the sorbent bed may range from about 0.1 m to about 0.5 m. Those of skill in the art will recognize that the "settled" thickness of the sorbent bed may have any value within this range, e.g., about 0.12 m. These dimensions should not be taken as limiting, as the disclosed system designs may be scaled as necessary to achieve a desired carbon dioxide capture capacity.

The housings employed to create packed bed or fluidized bed extractors of the present disclosure may be fabricated from any of a variety of materials known to those of skill in the art. Examples include, but are not limited to, glass, ceramic, polymer, aluminum, steel, stainless steel, or any combination thereof. In general, the primary drivers for choice of material(s) are manufacturability and cost. Corrosion resistance may be an additional consideration in the case that caustic solutions are required for desorption, regeneration, and/or in situ cleaning steps. In some embodiments, the housing may include either single-walled, double-walled, or multi-walled designs, and may incorporate, for example, liquid or thermoelectric heating and cooling mechanisms, as well as fittings for making connections to tubing, piping, duct work, or attaching sensors (e.g., flow rate sensors, temperature sensors, pressure sensors, optical sensors, and/or infrared gas analyzers for monitoring the concentration of $CO_2$ or other gases).

Sorbents for direct air capture: As indicated above, the choice of sorbent used in the disclosed methods and apparatus for capture of carbon dioxide (or other trace gases) from gas mixtures or ambient air streams is a key component in the successful implementation of the technology from both a performance and commercial viability perspective. The choice of particulate sorbent material used may determine the maximal $CO_2$ binding capacity of the sorbent bed under a given set of operating conditions, and hence may impact the design of the packed bed and/or fluidized bed extractor in terms of the volumes of gas or air that must be processed, and the size of the housing and volume of sorbent required, in order to achieve the target $CO_2$ capture rates. In addition, the choice of sorbent may also impact the choice of release mechanism used to subsequently strip bound $CO_2$ from the sorbent and regenerate the starting sorbent material, and thus may further impact the design of the process cycle and the extractor apparatus used to implement it.

Examples of sorbents that may be used in the disclosed methods and apparatus include, but are not limited to, sorbents comprising amines physically adsorbed on porous oxide or polymer particles, sorbents comprising amines covalently bonded to porous oxide or polymer particles, sorbents comprising amine-containing porous particles created by in situ polymerization of amine monomers within porous oxide or polymer particles, sorbents comprising porous amine-containing polymer particles created by direct polymerization of amine monomers, or any combination thereof. The use of solid-supported amine materials as candidate sorbents for direct air capture of carbon dioxide derives from the long-standing industrial practice of using aqueous amine solutions for separation of $CO_2$ from gas streams. The chemical reaction that takes place between $CO_2$ and the amine groups of the sorbent material create strong bonds that enable significant uptake even at relatively low $CO_2$ partial pressures (Sanz-Pérez, et al. (2016)). The mechanism of $CO_2$-amine reaction under anhydrous conditions is thought to require one molecule of $CO_2$ and two primary or secondary amine moieties (reactions 1 and 2, respectively):

$$CO_2 + 2R-NH_2 \leftrightarrow R-NH_3^+ + R-NHCO^- \quad (1)$$

$$CO_2 + 2R_1R_2NH \leftrightarrow R_1R_2NH_2^+ + R_1R_2NHCOO^- \quad (2)$$

In the presence of moisture, a reaction of $CO_2$ with secondary (reaction 3) or tertiary amines (reaction 4) to yield ammonium carbonate or bicarbonate (depending on pH) has been reported (Sanz-Pérez, et al. (2016)):

$$CO_2 + R_1R_2NH + H_2O \leftrightarrow R_1R_2NH_2^+ + HCO_3^- \text{(bicarbonate)} \leftrightarrow R_1R_2NH_2^+ + CO_3^{2-} \text{(carbonate)} \quad (3)$$

$$CO_2 + R_1R_2R_3N + H_2O \leftrightarrow R_1R_2R_3NH^+ + HCO_3^- \text{(bicarbonate)} \leftrightarrow R_1R_2R_3NH^+ + CO_3^{2-} \text{(carbonate)} \quad (4)$$

Quaternary ammonium hydroxide or carbonate groups are the preferred $CO_2$ adsorption groups for sorbents used in the humidity swing adsorption cycle developed by Lackner and co-workers (Wang, et al. (2011), "Moisture-swing sorption for carbon dioxide capture from ambient air: a thermodynamic analysis", Environ. Sci. Technol. 45:6670-6675). The use of these types of sorbents will be described in more detail below.

In some embodiments, the packed bed and/or fluidized bed extraction methods and apparatus of the present disclosure may utilize a sorbent comprising amine-containing compounds physically adsorbed on oxide or polymer particles. Examples include, but are not limited to, silica, mesoporous alumina (aluminum oxide), or polymer particles (e.g., poly-methyl-methacrylate (PMMA), polycarbonate (PC), or polystyrene (PS) particles, etc.) impregnated with different amounts of, for example, low molecular weight, branched poly(ethylenimine) (PEI), tetraethylenepentamine (TEPA), pentaethylenehexamine (PEHA), poly(allylamine) (PAA), poly(vinylamine), or other amine-containing compounds of relatively low volatility. In some embodiments, the $CO_2$ binding capacity of the resulting sorbent may be tuned by adjusting the amine loading level and/or pore size of the impregnated sorbent particles. In some embodiments, the use of secondary amine-containing compounds may be advantageous over primary amine-containing compounds, as it has been reported that they may provide the best compromise between reactivity with $CO_2$ and the energy requirements for regeneration of the sorbent (see Sanz-Pérez, et al. (2016), and references cited therein).

In some embodiments, the packed bed and/or fluidized bed extraction methods and apparatus of the present disclosure may utilize a sorbent comprising amines covalently bonded to porous oxide or polymer particles. Examples include, but are not limited to, the use of aminopropyl (APS) and diethylenetriamine (DT) silanes for covalent modification of porous silicon dioxide or other porous oxide particles. Studies of $CO_2$ binding to organosilane-modified porous oxide supports, where the organosilanes chosen had the same number of amines per molecule but differed with respect to primary or secondary amine structure, have suggested that primary amines may be more effective for promoting $CO_2$ adsorption than secondary amines in the presence of moisture, possibly due to differences in the hydrophilicity/hydrophobicity of the sorbent particles obtained (see Sanz-Pérez, et al. (2016), and references cited therein). However, $CO_2$ partial pressure also appears to play a key role in determining the $CO_2$ binding efficiencies for different types of amines.

In some embodiments, the packed bed and/or fluidized bed extraction methods and apparatus of the present disclosure may utilize a sorbent comprising amine-containing porous particles created by in situ polymerization of amine monomers within porous oxide or polymer particles. Examples include, but are not limited to, hyper-branched aminosilica materials produced by in situ polymerization of aziridine monomers in porous oxide particles, the polymerization of Z-(L-lysine) in the presence of aminopropyl-grafted porous silica, or grafting of a mesoporous silica foam support with an alkyliodine, followed by a cationic polymerization of 2-methyl-2-oxazoline and subsequent acid hydrolysis to produce a grafted linear PEI-like polymer composed of secondary amines with terminal primary amines (Sanz-Pérez, et al. (2016)).

In some embodiments, the packed bed and/or fluidized bed extraction methods and apparatus of the present disclosure may utilize a sorbent comprising a polymer backbone that has been functionalized with amine groups through covalent modification. In some embodiments, the disclosed methods and apparatus may utilize a sorbent comprising an amine-containing polymer obtained by direct polymerization of one or more types of amine-containing monomer, or combinations of one or more types of amine-containing monomers and one or more types of non-amine-containing monomers.

In some embodiments, the packed bed and/or fluidized bed extraction methods and apparatus of the present disclosure may utilize a sorbent comprising an anion exchange material, e.g., a strong base, type 1 or type 2 anion exchange resin. Strong base, type 1 anion exchange resins contain a quaternary amine functional group that is strongly basic. Strong base, type 2 anion exchange resins, obtained by the reaction of a styrene-DVB copolymer with dimethylethanolamine, contain a quaternary amine having lower basicity than that of type 1 resins, but that exhibit much greater regeneration efficiencies than do type 1 resins.

In a preferred embodiment, the sorbent may comprise a strong base, type 2 anion exchange resin. In some embodiments, the sorbent may further comprise a strong base, type 2 anion exchange resin that has been powdered and coated onto, or embedded within, mesoporous or macroporous particles of another material. The quaternary ammonium groups of strong base, type 2 anion exchange resins enable the use of a "humidity swing" release mechanism whereby $CO_2$ captured from a gas or air stream by the "dry" resin is released through an increase in humidity or by wetting of the sorbent (Wang, et al. (2011)), as will be described in more detail below. In some cases, the strong base, type 2 anion exchange material may be provided in a form comprising chloride ions as the exchangeable anions. In these cases, the chloride ions must be replaced by hydroxide or carbonate ions to provide $CO_2$ uptake capability. Type 2 resins in either the hydroxide or carbonate form can both absorb $CO_2$ from ambient air. Since the type 2 resins in the carbonate form already contains one $CO_2$ per two positive charges, the initial $CO_2$ binding capacity of the carbonate form is half of that for the hydroxide form, however, measurement of adsorption isotherms as a function of $CO_2$ concentration indicate that the two materials reach nearly identical saturation states (Wang, et al. (2011)). At the ambient $CO_2$ concentration level of 400 ppm and water vapor concentration of 0.5% (5 parts per thousand), the hydroxide and carbonate type 2 sorbents have both been reported to exhibit a very high $CO_2$ saturation level of over 99%. Even at very low $CO_2$ concentrations, such as 100 ppm, the sorbents are reported to exhibit a $CO_2$ saturation level of more than 95%.

The particulate sorbents used in the disclosed methods and apparatus may have any of a variety of sizes, shapes, and porosities. For example, in some embodiments, the shape of the sorbent particle may be nearly spherical, cylindrical, discoidal, ellipsoidal, tabular, equant, irregular, or any combination thereof (i.e., within the distribution of particles used). The shape of the particle may impact its surface area-to volume ratio, packing density, flow properties and/or the operating parameters, e.g., gas or air stream flow rates, required to fluidize the bed in fluidized bed extractor designs, etc. In some embodiments, the sorbent may comprise amine-containing compounds deposited on or incorporated into fibers.

The particulate sorbents used in the disclosed methods and apparatus may be monodisperse or polydisperse in size, and may comprise nanoparticles (i.e., having average diameters ranging from about 1 to about 100 nm), fine particles (i.e., having average diameters ranging from about 100 nm to about 2.5 micrometers), coarse particles (i.e., having average diameters ranging from about 2.5 micrometers to about 100 micrometers), or any combination thereof. As with particle shape, the size of the sorbent particle may impact its surface area-to volume ratio (i.e., for porous particles), packing density, flow properties and/or the operating parameters, e.g., gas or air stream flow rates, required to fluidize the bed in fluidized bed extractor designs, etc. In some embodiments, the average diameter of the sorbent particles may be at least 10 nm, at least 100 nm, at least 1 at least 5 μm, at least 10 μm, at least 20 μm, at least 30 μm, at least 40 μm, at least 50 μm, at least 60 μm, at least 70 μm, at least 80 μm, at least 90 μm, at least 100 μm, at least 200 μm, at least 300 μm, at least 400 μm, at least 500 μm, at least 1 mm, or at least 2 mm. In some embodiments, the average diameter of the sorbent particles may be at most 2 mm, at most 1 mm, at most 750 μm, at most 500 μm, at most 400 μm, at most 300 μm, at most 200 μm, at most 100 μm, at most 90 μm, at most 80 μm, at most 70 μm, at most 60 μm, at most 50 μm, at most 40 μm, at most 30 μm, at most 20 μm, at most 10 μm, at most 1 μm, at most 100 nm, or at most 10 nm. In some embodiments, the average diameter of the sorbent particles may range from about 700 μm to about 1,200 μm. Any of the lower and upper values described in this paragraph may be combined to form a range included within the present disclosure, for example, the average diameter of the sorbent particles may range from about 100 μm to about 1,000 μm. Those of skill in the art will recognize that the average diameter of the sorbent particles may have any value within this range, e.g., about 728 μm.

The particulate sorbents used in the disclosed methods and apparatus may comprise microporous particles (i.e., having pore diameters of less than 2 nm), mesoporous particles (i.e., having pore diameters between 2 and 50 nm), macroporous particles (i.e., having pore diameters of more than 50 nm), or any combination thereof (i.e., within the distribution of particles used). The pore size, in combination with the size and shape of the sorbent particles, may impact the maximal $CO_2$ binding capacity of the sorbent as well as the efficiency of $CO_2$ uptake and release. In some embodiments, the sorbent particles may have pore diameters of at least 1 nm, at least 2 nm, at least 5 nm, at least 10 nm, at least 25 nm, at least 50 nm, at least 75 nm, at least 100 nm, at least 500 nm, at least 1 μm, at least 100 μm, or at least 500 μm. In some embodiments, the sorbent particles may have pore diameters of at most 500 μm, at most 100 μm, at most 1 μm, at most 500 nm, at most 100 nm, at most 75 nm, at most 50 nm, at most 25 nm, at most 10 nm, at most 5 nm, at most 2 nm, or at most 1 nm. Any of the lower and upper values described in this paragraph may be combined to form a range included within the present disclosure, for example, the sorbent particles may have pore diameters that range from about 100 nm to about 100 μm. Those of skill in the art will recognize that the sorbent particles may have pore diameters of any value within this range, e.g., about 950 nm.

$CO_2$ uptake as a function of sorbent characteristics & environmental conditions: In general, $CO_2$ uptake properties, e.g., maximal $CO_2$ binding capacity and/or $CO_2$ adsorption rate, will vary depending on the choice of sorbent used and/or the environmental conditions under which the disclosed methods and apparatus are operated. For example, as noted above, the $CO_2$ binding capacity of sorbents comprising amine-containing compounds physically adsorbed on oxide or polymer particles may be tuned by adjusting the amine loading level and/or pore size of the impregnated sorbent particles. Furthermore, the nature of the amine groups on the sorbent (and of the support material thereof) may also impact the $CO_2$ binding capacity, both in terms of binding affinity (and thus $CO_2$ uptake as a function of the $CO_2$ concentration in a gas or air stream), and in terms of adsorption rates and sensitivity to temperature, pressure, and/or humidity.

In some embodiments, the ambient temperature during the adsorption step may be a key parameter in determining uptake of $CO_2$, with many sorbents exhibiting lower $CO_2$ binding at elevated temperatures. This observation forms the basis for the "temperature swing" release mechanism, which may be used for release of bound $CO_2$ from the sorbent in some embodiments as will be discussed in more detail below.

In some embodiments, the dependence of $CO_2$ binding on relative humidity or moisture may also be quite dependent on the choice of sorbent particles. For example, fumed silica particles impregnated with 33% polyethyleneimine (PEI) have been reported to exhibit an increase in the amount of $CO_2$ bound in humid air relative to that bound in dry air, while fumed silica particles impregnated with 50% PEI have been reported to exhibit a decrease in the amount of $CO_2$ bound in humid air relative to that in dry air (Sanz-Pérez, et al. (2016)). In preferred embodiments, the use of an anion exchange material may enable the use of a "humidity swing" release mechanism wherein the amount of $CO_2$ bound in humid air is substantially less than that bound in dry air, as will be discussed in more detail below.

In some embodiments, the $CO_2$ binding capacity of the sorbent may range from about 0.1 mmol $CO_2$ per gram of sorbent to about 3.0 mmol $CO_2$ per gram of sorbent, depending on the specific sorbent type and experimental conditions (e.g., $CO_2$ concentration in the source gas, temperature, pressure, humidity, etc.) under which the measurements were made (Sanz-Pérez, et al. (2016)). In some embodiments of the present disclosure, the maximal $CO_2$ binding capacity of the sorbent used in the disclosed methods and apparatus under optimal adsorption conditions may be at least 0.01, at least 0.05, at least 0.1, at least 0.2, at least 0.3, at least 0.4, at least 0.5, at least 0.6, at least 0.7, at least 0.8, at least 0.9, at least 1.0, at least 1.2, at least 1.4, at least 1.6, at least 1.8, at least 2.0, at least 2.2, at least 2.4, at least 2.6, at least 2.8, or at least 3.0 mmol $CO_2$ per gram of sorbent. In some embodiments, the maximal $CO_2$ binding capacity under optimal adsorption conditions may be at most 3.0, at most 2.8, at most 2.6, at most 2.4, at most 2.2, at most 2.0, at most 1.8, at most 1.6, at most 1.4, at most 1.2, at most 1.0, at most 0.9, at most 0.8, at most 0.7, at most 0.6, at most 0.5, at most 0.4, at most 0.3, at most 0.2, at most 0.1 mmol, at most 0.05, or at most 0.01 $CO_2$ per gram of sorbent. Any of the lower and upper values described in this paragraph may be combined to form a range included within the present disclosure, for example, the maximal $CO_2$ binding capacity under optimal adsorption conditions may range from about 0.8 to about 2.8 mmol $CO_2$ per gram of sorbent. Those of skill in the art will recognize that the maximal $CO_2$ binding capacity under optimal adsorption conditions may have any value within this range, e.g., about 1.5 mmol $CO_2$ per gram of sorbent.

In some embodiments, the actual $CO_2$ binding capacity observed may vary depending on a variety of experimental parameters, e.g., the $CO_2$ concentration in the source gas, ambient temperature, pressure, humidity, etc., as well as on cycle number. For example, in some cases the $CO_2$ binding capacity observed for the first adsorption/desorption cycle may differ from the mean value observed over a series of subsequent adsorption/desorption cycles. In some cases, the $CO_2$ binding capacity observed for the first adsorption/desorption cycle may be higher than that observed for subsequent adsorption/desorption cycles and may range, for example, from about 1.4 to about 1.5 mmol $CO_2$ per gram of sorbent, while that for subsequent adsorption/desorption cycles may range from about 0.02 to about 0.2 mmol $CO_2$ per gram of sorbent. These values should be taken as non-limiting examples only, as the actual ranges will vary depending on the specific choice of sorbent and operating conditions.

In a preferred embodiment comprising the use of a strong base, type II anion exchange resin as sorbent, the mean value of $CO_2$ binding capacity may range from about 0.02 to about 5.0 mmol $CO_2$ per gram of sorbent. In some embodiments, the mean value of $CO_2$ binding capacity may be at least 0.02, at least 0.04, at least 0.08, at least 0.1, at least 0.2, at least 0.4, at least 0.6, at least 0.8, at least 1.0, at least 1.2, at least 1.4, at least 1.6, at least 1.8, at least 2.0, at least 2.2, at least 2.4, at least 2.6, at least 2.8, at least 3.0, at least 3.2, at least 3.4, at least 3.6, at least 3.8, at least 4.0, at least 4.2, at least 4.4, at least 4.6, at least 4.8, or at least 5.0 mmol $CO_2$ per gram of sorbent. In some embodiments, the mean value of $CO_2$ binding capacity may be at most 5.0, at most 4.8, at most 4.6, at most 4.4, at most 4.2, at most 4.0, at most 3.8, at most 3.6, at most 3.4, at most 3.2, at most 3.0, at most 2.8, at most 2.6, at most 2.4, at most 2.2, at most 2.0, at most 1.8, at most 1.6, at most 1.4, at moat 1.2, at most 1.0, at most 0.8, at most 0.6, at most 0.4, at most 0.2, at most 0.1, at most 0.08, at most 0.06, at most 0.04, or at most 0.02 mmol $CO_2$ per gram of sorbent. Any of the lower and upper values described in this paragraph may be combined to form a range included within the present disclosure, for example, the mean $CO_2$ binding capacity may range from about 0.04 to about 0.12 mmol $CO_2$ per gram of sorbent. Those of skill in the art will recognize that the mean $CO_2$ binding capacity may have any value within this range, e.g., about 0.11 mmol $CO_2$ per gram of sorbent.

In some embodiments, cyclic processes comprising carbon dioxide capture, carbon dioxide release, and/or sorbent regeneration steps may be implemented in order to meet the need for processing large volumes of ambient air in order to capture significant quantities of carbon dioxide without constructing an apparatus of immense size. The stability of the sorbent to repeated exposure to changes in temperature, pressure, humidity, or any combination thereof, may thus be of considerable importance for practical application. In preferred embodiments a moisture swing or humidity swing release mechanism is employed, as this approach makes use of existing differences in humidity levels to drive $CO_2$ adsorption and release and avoids the high energy penalties and associated costs incurred when using temperature, vacuum, and/or steam as a release mechanism. In some embodiments, the steps of carbon dioxide capture, carbon dioxide release, and/or sorbent regeneration may be performed serially or sequentially. In some embodiments, the steps of carbon dioxide capture, carbon dioxide release, and/or sorbent regeneration may be performed simultaneously or concurrently (e.g., in a continuous, overlapping manner). In some embodiments, the steps of carbon dioxide capture, carbon dioxide release, and/or sorbent regeneration may be performed simultaneously or concurrently using apparatus comprising multiple sorbent beds. In some embodiments, modular apparatus comprising one or more sorbent beds may be assembled to implement large, multi-bed systems having greater $CO_2$ capture and delivery capacity.

$CO_2$ release mechanisms: In general, the mechanism used to release (or desorb) the bound $CO_2$ (or other trace gases) from the sorbent (thereby regenerating the sorbent) will vary depending on the specific sorbent used. Any of a variety of release mechanisms known to those of skill in the art may be used, including but not limited to, temperature swing mechanisms (e.g., $CO_2$ release as a result of a temperature change), vacuum swing mechanisms (e.g., $CO_2$ release due to a change in pressure), humidity swing mechanisms (e.g., $CO_2$ release due to a change in humidity), wetting mechanisms (e.g., $CO_2$ release as a result of wetting the sorbent with a liquid or spray (e.g., water)), pH-based release and/or regeneration mechanisms (e.g., $CO_2$ release as a result of wetting the sorbent with a liquid or spray that has a different pH that that to which the sorbent was previously exposed, or wherein the sorbent is regenerated between adsorption/desorption cycles by wetting with, for example, a basic solution to release all residual $CO_2$ and/or other gaseous or particulate contaminants and then dried prior to the start of the next adsorption step), steam release mechanisms (e.g., $CO_2$ release due to exposure of the sorbent to steam), or any combination thereof (provided that the release mechanism or combination thereof is appropriate for the particular sorbent selected, and that the sorbent is stable under that set of release conditions).

Temperature swing mechanisms: In some embodiments of the disclosed methods and apparatus, the release of bound carbon dioxide (or other gas) from the sorbent may be achieved by means of a temperature swing mechanism (also referred to as a thermal swing mechanism) in which the sorbent preferentially binds $CO_2$ at lower temperatures and preferentially releases bound $CO_2$ at higher temperatures. In general, the transition from $CO_2$ (or other gas) adsorption to $CO_2$ (or other gas) release may be triggered by changes (increases) of temperature ranging from about 10° C. to about 200° C., or more. In some embodiments, the change (increase) in temperature required to trigger the transition from gas adsorption to gas release (e.g., to transition from about 90% saturation of binding sites to about 10% saturation) may be at least 10° C., at least 20° C., at least 30° C., at least 40° C., at least 50° C., at least 60° C., at least 70° C., at least 80° C., at least 90° C., at least 100° C., at least 125° C., at least 150° C., at least 175° C., or at least 200° C. In some embodiments, the change in temperature required to trigger a transition may be at most 200° C., at most 175° C., at most 150° C., at most 125° C., at most 100° C., at most 90° C., at most 80° C., at most 70° C., at most 60° C., at most 50° C., at most 40° C., at most 30° C., at most 20° C., or at most 10° C. Any of the lower and upper values described in this paragraph may be combined to form a range included within the present disclosure, for example, the change in temperature required to trigger a transition may range from about 30° C. to about 175° C. Those of skill in the art will recognize that in specific embodiments, the change in temperature required to trigger a transition may have any value within this range, e.g., about 55° C. In some embodiments, the change in temperature required to trigger a transition from gas adsorption to gas release may depend on how the endpoints of the transition are defined, e.g., a transition from about 90% saturation of binding sites to about 10% saturation may require a different increase in temperature than a transition from about 80% saturation to about 20% saturation. In some embodiments, the change in temperature required to trigger a transition may further depend on the ambient pressure and/or relative humidity.

Vacuum swing mechanisms: In some embodiments of the disclosed methods and apparatus, the release of bound carbon dioxide (or other gas) from the sorbent may be achieved by means of a vacuum swing mechanism in which the sorbent preferentially binds $CO_2$ at higher pressures (e.g., near ambient or atmospheric pressure) and preferentially releases bound $CO_2$ at lower pressures (e.g., under partial or full vacuum). In general, the transition from $CO_2$ (or other gas) adsorption to $CO_2$ (or other gas) release may be triggered by changes (decreases) of pressure ranging from about 10 torr to about 700 torr, or more. In some embodiments, the change (decrease) in pressure required to trigger the transition from gas adsorption to gas release (e.g., to transition from about 90% saturation of binding sites to about 10% saturation) may be at least 10 torr, at least 20 torr, at least 40 torr, at least 60 torr, at least 80 torr, at least 100 torr, at least 200 torr, at least 300 torr, at least 400 torr, at least 500 torr, at least 600 torr, or at least 700 torr. In some embodiments, the change (decrease) in pressure required to trigger the transition may be at most 700 torr, at most 600 torr, at most 500 torr, at most 400 torr, at most 300 torr, at most 200 torr, at most 100 torr, at most 80 torr, at most 60 torr, at most 40 torr, at most 20 torr, or at most 10 torr. Any of the lower and upper values described in this paragraph may be combined to form a range included within the present disclosure, for example, the change (decrease) in pressure required to trigger the transition may range from about 40 torr to about 500 torr. Those of skill in the art will recognize that in specific embodiments, the change in pressure required to trigger a transition may have any value within this range, e.g., about 260 torr. Those of skill in the art will recognize that in specific embodiments, the change (decrease) in pressure required to trigger the transition from gas adsorption to gas release may depend on how the endpoints of the transition are defined, e.g., a transition from about 90% saturation of binding sites to about 10% saturation may require a different decrease in pressure than a transition from about 80% saturation to about 20% saturation. In some embodiments, the change in pressure required to trigger a transition may further depend on the ambient temperature and/or relative humidity.

Humidity swing & wetting mechanisms: In preferred embodiments of the disclosed methods and apparatus, the release of bound carbon dioxide (or other gas) from the sorbent may be achieved by means of a humidity swing mechanism (also referred to as a moisture swing mechanism) in which the sorbent (e.g., a strong base, type 2 anion exchange material) preferentially binds $CO_2$ at low relative humidity and preferentially releases bound $CO_2$ at high relative humidity (see, for example, U.S. Pat. Nos. 7,708,806 B2, 8,273,160 B2, and 8,337,589 B2). The humidity swing mechanism provides an approach to regenerating the $CO_2$ sorbent that trades the input of heat required in a thermal swing approach, or the input of mechanical energy required in a vacuum swing approach, for the consumption of water, whose latent heats of condensation and evaporation provide the free energy that drives the humidity swing cycle (Wang, et al. (2011)). The humidity swing mechanism may thus enable a much more energy efficient and cost-effective means for capture of $CO_2$ from ambient air or other gas streams. In some embodiments, the humidity swing mechanism may enable one to perform cyclic $CO_2$ capture and release processes that require little or no input of external energy to drive the adsorption or desorption steps, thus avoiding the high energy penalties incurred when using thermal swing, vacuum swing, or steam stripping release mechanisms. The humidity swing mechanism is a general release mechanism that may be used in combination with a suitable sorbent material for $CO_2$ capture in a variety of applications, e.g., $CO_2$ capture from ambient (i.e., outdoor or atmospheric) air or from conditioned (i.e., indoor or enclosed) air, and that provides significant cost advantages for $CO_2$ capture compared to other release mechanisms when no additional conditioning or processing (e.g., heating, humidification, or de-humidification) of the ambient or indoor air is required. One non-limiting example of a commercially-available strong base, type 2 anion exchange material suitable for use in the disclosed methods and apparatus is Purolite A500 (OH form) (Lenntech BV, Netherlands).

As noted above, there is a strong humidity effect on the $CO_2$ adsorption equilibrium of, e.g., strong base, type 2 anion exchange resins, at room temperature such that the sorbent readily desorbs previously bound $CO_2$ as the water vapor concentration increases. Wetting of the sorbent also causes rapid desorption of $CO_2$, and may provide advantages in terms of improving the $CO_2$ desorption kinetics. The chemical reactions underlying the proposed mechanism for adsorption/desorption of $CO_2$ by strong base, type 2 anion exchange materials are summarized in reactions 5 to 8 (Wang, et al. (2011)):

$$OH^-R^+ + CO_2 \rightarrow HCO_3^-R^+ \quad (5)$$

$$CO_3^{2-}(R^+)_2 + H_2O + CO_2 \text{ (gaseous)} \rightarrow 2(HCO_3^-R^+) \quad (6)$$

$$OH^-R^+ + HCO_3^-R^+ \leftrightarrow CO_3^{2-}(R^+)_2 + H_2O \quad (7)$$

$$2(HCO_3^-R^+) \rightarrow CO_3^{2-}(R^+)_2 + H_2O + CO_2 \text{ (gaseous)} \quad (8)$$

where $R^+$ represents the quaternary ammonium ion in the resin. In the dry state, $CO_2$ reacts with hydroxide ions associated with the quaternary ammonium group to form bicarbonate ions according to reaction 5. $CO_2$ may also react with carbonate ions to form bicarbonate according to reaction 6. Because the resin is never entirely dry under ambient conditions with vapor pressure present, the water consumed in reaction 6 is thought to be provided by the hygroscopic resin. Reaction 7 converts bicarbonate and hydroxide into carbonate and water. In the dry state, the equilibrium in reaction 7 is thought to allow for the coexistence of bicarbonate ions and hydroxide ions in far larger concentrations than in an aqueous environment. The resin absorbs $CO_2$ until all hydroxide is consumed and reaches the bicarbonate state. The presence of moisture shifts the bicarbonate-carbonate equilibrium to what is expected in water, and $CO_2$ is released via reaction 8. Note that type 2 sorbent resins may only convert from the bicarbonate state back to the carbonate state during the desorption process. As the resin dries following exposure to moisture, the equilibrium represented by reaction 7 may shift to the left. Although this shift in equilibrium is somewhat counterintuitive due to the presence of a water molecule on the product side of the reaction, it should be noted that reaction 7 ignores the number of water molecules associated with ion hydration clouds, which may also change as the system dries out and which may thereby give rise to a more complicated net balance of water in the reaction.

As noted above, the gas adsorption/desorption reactions involved in the capture and release of $CO_2$ or other gases via a humidity swing mechanism can be fully reversible. In some embodiments, the adsorption of $CO_2$ by the sorbent may fully saturate at ambient concentrations as low as 100 ppm of carbon dioxide. In some embodiments, the humidity swing may be implemented using low energy processes that are fueled by the evaporation of water. The only requirement is that there be a difference between the relative humidity of the ambient air (or other gas stream) from which $CO_2$ is being removed and that of the greenhouse interior (or other enclosed environment) into which the $CO_2$ is being released. For small differences in relative humidity between the adsorption and desorption process steps, the difference in sorbent $CO_2$ binding capacity will be small and processing of larger volumes of air per unit time will be required to achieve a target $CO_2$ transfer rate. For large differences in relative humidity between the adsorption and desorption steps, the difference in sorbent $CO_2$ binding capacity will be correspondingly large, and the processing of smaller volumes of air may suffice. In some embodiments, the humidity swing (or increase in relative humidity) required to release an adsorbed gas such as $CO_2$ from the sorbent may range from about a 5% increase in relative humidity to about an 80% increase in relative humidity. In some instances, the humidity swing (or increase in relative humidity) required to release an adsorbed gas from the sorbent (e.g., to transition from about 90% saturation of binding sites to about 10% saturation) may be an at least 5%, at least 10%, at least 20%, at least 30%, at least 40%, at least 50%, at least 60%, at least 70%, or at least 80%, at least 90%, at least 95%, at least 98%, or at least 99%. In some embodiments, the humidity swing (or increase in relative humidity) required to release an adsorbed gas such as $CO_2$ from the sorbent (e.g., to transition from about 90% saturation of binding sites to about 10% saturation) may be at most 99%, at most 98%, at most 95%, at most 90%, at most 80%, at most 70%, at most 60%, at most 50%, at most 40%, at most 30%, at most 20%, at most 10%, or at most 5%. Any of the lower and upper values described in this paragraph may be combined to form a range included within the present disclosure, for example, the humidity swing (or increase in humidity) required to release an adsorbed gas such as $CO_2$ from the sorbent may range from about 10% to about 60%. Those of skill in the art will recognize that the humidity swing (or increase in humidity) required to release an adsorbed gas from the sorbent may have any value within this range, e.g., an increase in relative humidity of about 36%. In some embodiments, the change in humidity required to release an adsorbed gas from the paper-based sorbent may depend on how the endpoints of the transition are defined, e.g., a transition from about 90% saturation of binding sites to about 10% saturation may require a different increase in humidity than a transition from about 80% saturation to about 20% saturation. In some embodiments, the change in humidity required to trigger the transition between adsorption of $CO_2$ to release of $CO_2$ may further depend on the ambient temperature and/or pressure. In general, high relative humidity during the desorption step tends to have a greater impact on the sorbent's $CO_2$ binding and release capacity (per humidity swing), while low relative humidity during the adsorption step tends to have a stronger impact on sorbent drying rate (thus impacting the overall adsorption/desorption cycle time).

In some embodiments, a wetting mechanism may be used for release of $CO_2$ from the sorbent, optionally followed by active drying of the sorbent. For example, when strong base, type 2 anion exchange resins or other amine-based sorbents are used, adsorbed $CO_2$ may in some cases be released by partially or fully wetting the sorbent with a liquid, spray, or mist. In some embodiments, the liquid, spray, or mist may be water or an aqueous-based solution. In some embodiments, the liquid, spray, or mist may comprise a liquid sorbent solution. In some embodiments, the liquid sorbent solution may comprise a NaOH or $Na_2CO_3$ solution. In some embodiments, the liquid, spray, or mist may comprise a solution that has a different pH that that to which the sorbent was previously exposed.

In some embodiments, release mechanisms based on a humidity swing or wetting may be further facilitated through the use of an elevated temperature and/or application of a partial vacuum. For example, in some instances the humidity swing or wetting desorption reaction may be performed at a temperature that is higher than the ambient and/or operating temperature of the system as a whole. In some instances, the humidity swing or wetting desorption reaction may be performed at a temperature ranging from about 20° C. to about 50° C. In some instances, the desorption reaction may be performed at a temperature of at least 20° C., at least 25° C., at least 30° C., at least 35° C., at least 40° C., at least 45° C., or at least 50° C. In some instances, the desorption reaction may be performed at a temperature of at most 50° C., at most 45° C., at most 40° C., at most 35° C., at most 30° C., at most 25° C., or at most 20° C. Any of the lower and upper values described in this paragraph may be combined to form a range included within the present disclosure, for example, in some instances the desorption reaction may be performed at a temperature ranging from about 25° C. to about 45° C. Those of skill in the art will recognize that the temperature at which the desorption reaction is performed may have any value within this range, e.g., about 42° C.

In some instances the humidity swing or wetting desorption reaction may be performed at a temperature that is higher than the ambient and/or operating temperature of the system as a whole by a specified difference. For example, in some instances, the desorption reaction may be performed at a temperature of at least +5° C., +10° C., +20° C., at least +25° C., at least +30° C., at least +35° C., at least +40° C., at least +45° C., or at least +50° C. relative to the ambient or operating temperature of the system as a whole. In some instances, the desorption reaction may be performed at a temperature of at most +50° C., at most +45° C., at most +40° C., at most +35° C., at most +30° C., at most +25° C., at most +20° C., at most +10° C., or at most +5° C. relative to the ambient or operating temperature of the system as a whole. Any of the lower and upper values described in this paragraph may be combined to form a range included within the present disclosure, for example, in some instances the desorption reaction may be performed at a temperature ranging from about +25° C. to about +45° C. relative to the ambient or operating temperature of the system as a whole. Those of skill in the art will recognize that the temperature at which the desorption reaction is performed may have any value within this range, e.g., about +17° C. relative to the ambient or operating temperature of the system as a whole.

In some instances the humidity swing or wetting desorption reaction may be performed under a partial vacuum to facilitate release of captured $CO_2$ and/or to release the captured $CO_2$ in a more pure or concentrated form. For example, in some instances the humidity swing or wetting desorption reaction may be performed under a residual pressure ranging from about 760 Torr (1 atmosphere) to about 1 Torr. In some instances, the humidity swing or wetting desorption reaction may be performed under a residual pressure that is at most 760 Torr, at most 740 Torr, at most 720 Torr, at most 700 Torr, at most 650 Torr, at most 600 Torr, at most 550 Torr, at most 500 Torr, at most 450 Torr, at most 400 Torr, at most 350 Torr, at most 300 Torr, at most 250 Torr, at most 200 Torr, at most 150 Torr, at most 100 Torr, at most 50 Torr, or at most 1 Torr.

Steam stripping mechanisms: In some embodiments of the disclosed methods and apparatus, the release of bound carbon dioxide (or other gas) from the sorbent may be achieved by means of a steam stripping mechanism in which a suitable sorbent preferentially binds $CO_2$ at ambient temperature and relative humidity (e.g., near ambient or atmospheric pressure) and preferentially releases bound $CO_2$ when exposed to steam. In some instances, steam stripping may be viewed as a combination of temperature swing and humidity swing mechanisms. In some embodiments, the transition from $CO_2$ (or other gas) adsorption to $CO_2$ (or other gas) release may be triggered by exposure of the sorbent to wet steam (i.e., steam comprising a mist or aerosol of water droplets). In some embodiments, the transition from $CO_2$ (or other gas) adsorption to $CO_2$ (or other gas) release may be triggered by exposure of the sorbent to dry steam (i.e., steam comprising only water in the gas phase).

Combination release mechanisms: In some embodiments of the disclosed methods and systems, the release of bound carbon dioxide (or other gas) from the sorbent may be achieved by means of any combination of temperature swing, pressure swing, wetting, steam, and/or humidity swing mechanisms (provided that the release mechanism or combination thereof is appropriate for the particular sorbent selected, and that the sorbent is stable under that set of release conditions). For example, in some embodiments, the release of bound carbon dioxide from the sorbent may be implemented by using a combination of temperature swing and vacuum swing. In some embodiments, the release of bound carbon dioxide from the sorbent may be implemented by using a combination of temperature swing and humidity swing. In some embodiments, the release of bound carbon dioxide from the sorbent may be implemented by using a combination of vacuum swing and humidity swing.

Sorbent regeneration: In some embodiments, it may be necessary to regenerate the sorbent between $CO_2$ adsorption and desorption cycles. For example, in some cases where moisture-sensitive sorbents are employed, it may be advantageous to partially or fully wet the sorbent periodically to fully release any residual $CO_2$ and/or other gaseous or particulate contaminants (e.g., other acidic gases) and then dry the sorbent prior to use in the next $CO_2$ capture step. In some embodiments, the sorbent may be wetted with water, a basic solution, or secondary liquid sorbent, e.g., a NaOH or $Na_2CO_3$ solution, and then dried prior to use in the next $CO_2$ capture step. Regeneration allows one to restore the maximal $CO_2$ binding capacity of the sorbent. When other types of sorbents are used, regeneration steps may alternatively comprise exposing the sorbent to high temperature, high vacuum, extended periods of steam treatment, or any combination thereof. In some embodiments, regeneration steps may comprise exposing the sorbent to high temperature, high vacuum, extended periods of steam treatment, wetting, a humidity swing, or any combination thereof (provided that the specific sorbent used is suitably stable under the chosen set of regeneration conditions).

In some embodiments, a regeneration step may be performed as part of every cycle. In some embodiments, a regeneration step may be performed every few cycles. In some embodiments, a regeneration step may be performed at least every 1 cycle, at least every 5 cycles, at least every 10 cycles, at least every 100 cycles, at least every 1,000 cycles, or at least every 10,000 cycles. In some embodiments, a regeneration step may be performed at most every 10,000 cycles, at most every 1,000 cycles, at most every 100 cycles, at most every 10 cycles, at most every 5 cycles, or at most every 1 cycle. Any of the lower and upper values described in this paragraph may be combined to form a range included within the present disclosure, for example, in some embodiments a regeneration step may be performed every 10 to 1,000 cycles. Those of skill in the art will recognize that a regeneration step may be performed at any periodicity within this range, e.g., every 560 cycles.

In some embodiments, the sorbent may need to be replaced after a certain number of regeneration steps are performed, for example, if the regeneration step comprises the use of a caustic wash that eventually degrades the sorbent material. In some embodiments, the sorbent may need to be replaced after performing at least 1 regeneration step, at least 10 regeneration steps, at least 25 regeneration steps, at least 50 regeneration steps, at least 75 regeneration steps, at least 100 regeneration steps, at least 200 regeneration steps, at least 300 regeneration steps, at least 400 regeneration steps, at least 500 regeneration steps, at least 750 regeneration steps, at least 1,000 regeneration steps, at least 5,000 regeneration steps, or at least 10,000 regeneration steps. In some embodiments, the sorbent may need to be replaced after performing at most 10,000 regeneration steps, at most 5,000 regeneration steps, at most 1,000 regeneration steps, at most 750 regeneration steps, at most 500 regeneration steps, at most 400 regeneration steps, at most 300 regeneration steps, at most 200 regeneration steps, at most 100 regeneration steps, at most 75 regeneration steps, at most 50 regeneration steps, at most 25 regenerations steps, at most 10 regeneration steps, or at most 1 regeneration step. Any of the lower and upper values described in this paragraph may be combined to form a range included within the present disclosure, for example, in some embodiments the sorbent may need to be replaced after performing from 50 to 1,000 regeneration steps. Those of skill in the art will recognize that the sorbent may need to be replaced after performing any number of regeneration steps within this range of values, for example, the sorbent may need to be replaced after performing 1,250 regeneration steps.

Methods and apparatus for capture of $CO_2$ from ambient air: Disclosed herein are methods and apparatus for capture of $CO_2$ from a gas stream, e.g., a gas mixture or a stream of ambient air, using a cyclic process comprising: (i) adsorption of $CO_2$ by a packed or fluidized bed extractor comprising a sorbent, (ii) release of the adsorbed $CO_2$, and/or (iii) regeneration of the sorbent material. In some embodiments, the steps of carbon dioxide adsorption, carbon dioxide release, and/or sorbent regeneration may be performed serially or sequentially. In some embodiments, the steps of carbon dioxide adsorption, carbon dioxide release, and/or sorbent regeneration may be performed simultaneously or concurrently (e.g., in a continuous, overlapping manner). Following its release from the sorbent, the $CO_2$ may optionally be further concentrated, stored, sequestered, delivered to an enclosed environment, and/or used in a secondary process. In preferred embodiments, the disclosed methods and apparatus are used for removing carbon dioxide from ambient air (i.e., from outdoor or atmospheric air) using one or more packed bed and/or fluidized bed extractors comprising an anion exchange material, wherein the captured $CO_2$ is released from the anion exchange material using a humidity swing mechanism and delivered to the interior of a greenhouse (or other enclosed structure) where elevated concentrations of $CO_2$ may be beneficial for stimulating plant growth.

Methods and apparatus for capture of $CO_2$ from indoor air: In some embodiments, the disclosed apparatus may be used to transfer $CO_2$ from a high $CO_2$ environment (e.g., an indoor environment such as a home, office, school, or manufacturing site, where $CO_2$ concentrations may range from about 400 ppm to about 2,000 ppm, or higher) to a storage container or to the ambient environment (e.g., the outdoor environment or atmosphere). In this "indoor air purification" mode, apparatus that comprise the use of a moisture swing release mechanism will typically have higher per swing transfer capacity (mmol $CO_2$ per gram of sorbent) than when operated in the "ambient air capture mode" used for greenhouse applications, etc.

For example, disclosed herein are methods for capturing carbon dioxide from indoor air, the methods comprising: a) contacting a packed bed or fluidized bed extractor with a stream of indoor air drawn from within a first enclosed environment, wherein the packed bed or fluidized bed extractor comprises, for example, a humidity-sensitive sorbent material that adsorbs carbon dioxide from the indoor air, and wherein the water vapor pressure in the indoor air is less than the equilibrium water vapor pressure for air in contact with the sorbent; b) contacting the packed bed or fluidized bed extractor with a stream of ambient air or conditioned air, wherein the ambient air or conditioned air has a relative humidity that is higher than that of the indoor air of step (a), and wherein the sorbent material in the packed bed or fluidized bed extractor releases the adsorbed carbon dioxide upon contact with the ambient air or conditioned air; c) optionally, separating and concentrating the released carbon dioxide from water vapor, and delivering the released carbon dioxide to a second enclosed environment, to a storage container, or for use in a secondary process; and d), optionally, repeating steps (a) through (c). In some embodiments, the adsorption of carbon dioxide by the sorbent is performed at ambient room temperature (i.e., at the ambient temperature of the enclosed environment from which the indoor air is drawn). In some embodiments, there is no heating required for the release of carbon dioxide from the sorbent. In some embodiments, the first enclosed environment and the second enclosed environment may be the same, e.g., wherein stored carbon dioxide is re-released into the indoor air on an as-needed basis to maintain a specified concentration of $CO_2$ in the indoor environment. In some embodiments, stored carbon dioxide is released from a storage container into a third enclosed environment, e.g., a greenhouse or bioreactor. In general, the first enclosed environment, second enclosed environment, and/or third enclosed environment may comprise an apartment, house, residential building, school building, office building, commercial building, or any combination thereof. In some embodiments, the disclosed methods may further comprise conditioning the indoor air, ambient air, and/or conditioned air by heating, humidification, de-humidification, or any combination thereof. In some embodiments, the humidity-sensitive sorbent is an anion exchange material. In some embodiments, the anion-exchange material is a strong base, type II anion exchange material. In some embodiments, the steps of the method may be repeated at least once per day, at least twelve times per day, or at least twenty four times per day, at least 50 times per day, at least 75 times per day, at least 100 times per day, at least 125 times per day, at least 150 times per day, at least 175 times per day, at least 200 times per day, at least 225 times per day, at least 250 times per day, at least 275 times per day, or at least 300 times per day. Also disclosed are apparatus for performing these methods.

System design parameters: In some embodiments, the disclosed methods may be implemented using an apparatus comprising a single packed bed or fluidized bed extractor. In some embodiments, the disclosed methods may be implemented using an apparatus comprising two packed bed or fluidized bed extractors, three packed bed or fluidized bed extractors, four packed bed or fluidized bed extractors, five packed bed or fluidized bed extractors, six packed bed or fluidized bed extractors, seven packed bed or fluidized bed extractors, eight packed bed or fluidized bed extractors, nine packed bed or fluidized bed extractors, or ten or more packed bed or fluidized bed extractors. The methods or apparatus disclosed herein may comprise the use of any combination of packed bed and/or fluidized bed extractors. In some embodiments, two or more packed bed and/or fluidized bed extractors may be operated in series. In some embodiments, two or more packed bed and/or fluidized bed extractors may be operated in parallel.

Any of a variety of air flow mechanisms known to those of skill in the art may be used to provide and control the stream of gas, ambient air, indoor air, or humid air with which the sorbent of the packed or fluidized bed extractors are contacted. Examples include, but are not limited to, fans, blowers, ventilators, wind mills, etc. In some embodiments, one or more of these air flow mechanisms will be connected to the one or more packed bed or fluidized bed extractors by means of appropriate duct work or piping, and the apparatus may further comprise any of a variety of intake or inlet ports, valves, gates, vents, manifolds, flow dividers, outlet ports, etc. In general, a controller may be used to operate the one or more air flow mechanisms (or associated valves, gates, etc.) utilized by the disclosed methods and apparatus, and may provide for manual, semi-automated, or automated control of the volumetric flow rate and/or linear velocity of gas or air streams flowing through the one or more packed bed or fluidized bed extractors. In some embodiments, the controller may control the timing and synchronization of gas or air flow through two or more packed bed and/or fluidized bed extractors. In some embodiments, the duct work or piping may also connect the one or more air flow mechanisms and/or one or more packed bed or fluidized bed extractors to a storage structure or an enclosed environment.

In some embodiments, the disclosed apparatus may comprise the use of additional system components, including but not limited to, heaters, humidifiers, spray mechanisms, sensors, vacuum systems, concentrators, condensers, storage tanks, etc. For example, in some embodiments, a temperature swing release mechanism may be used, either alone or in combination with a humidity swing release mechanism, to release captured $CO_2$ from the sorbent, and a heater may be used to raise the temperature of the packed bed or fluidized bed extractor, or that of a gas or air stream passing through the packed bed or fluidized bed extractor. As another example, in some embodiments, a spray mechanism may be used to wet an anion exchange sorbent and thereby release captured $CO_2$. In some embodiments of the disclosed apparatus, e.g., those designed for capture of $CO_2$ from ambient air under non-optimal environmental conditions (e.g., where the average or transient climate conditions are too humid) or those designed for capture of $CO_2$ from indoor air (e.g., air within a house, residential building, office building, commercial building, etc.), the inlet air may be suitably conditioned (e.g., heated, cooled, humidified, de-humidified, etc.) prior to exposure to the sorbent in order to optimize the efficiency of $CO_2$ capture. In some embodiments, sensors (e.g., temperature sensors, pressure sensors, flow rate sensors, humidity sensors) may be used to monitor various process parameters, e.g., temperature, pressure, gas/air stream flow rate, and/or gas/air humidity, at different points in the apparatus, and may further be used to provide feedback to the controller in order to achieve and maintain optimal process parameter settings for maximizing $CO_2$ capture efficiency and/or the rate of transfer of $CO_2$ from, e.g., ambient air to an enclosed environment. In some embodiments, the disclosed apparatus may comprise optical sensors and/or infrared gas analyzers for monitoring the concentration of $CO_2$ or other gases at the inlet, outlet, and/or at other points within the apparatus. In some embodiments, the disclosed apparatus may further comprise vacuum systems for evacuating the head space above packed or fluidized beds prior to release of the adsorbed $CO_2$, thereby providing for release of higher purity $CO_2$. In some embodiments, the disclosed apparatus may comprise $CO_2$ storage capability so that the captured $CO_2$ may subsequently be released as needed to, for example, maintain a specified $CO_2$ concentration at the outlet of the apparatus or within an enclosed environment to which the apparatus is attached.

As noted above, in preferred embodiments, the only external energy input required to operate the disclosed apparatus is the energy used by the one or more air flow mechanisms used to contact the sorbent material within the packed bed or fluidized bed extractors with ambient air, a gas stream, and/or humid air (and the minimal amount of energy required to run the controller and/or sensors, if present). In preferred embodiments, there is no heating of ambient air prior to the extraction of $CO_2$ (i.e., the adsorption step is performed at ambient temperature), and no heating of the air or extractor required for $CO_2$ release (i.e., a humidity swing release mechanism is preferred). The preferred energy sources for these embodiments include solar power, wind power, hydraulic power, etc., which have little or no carbon footprint.

In general, the efficiency of $CO_2$ capture and the rate of $CO_2$ transfer may be dependent on a variety of design and operating parameters, e.g., the ambient concentration of $CO_2$ at the inlet, the type of sorbent used, the dimensions (e.g., cross-sectional area and thickness) of the packed sorbent bed in a packed bed extractor, the dimensions (e.g., cross-sectional area and static thickness) of the sorbent bed in a fluidized bed extractor, and the fluid-like properties of the sorbent therein as a function of air or gas flow rate through the extractor, etc.

In some embodiments, the $CO_2$ released from the sorbent may be concentrated (e.g., by removing water vapor using any of a variety of methods known to those of skill in the art in the case that a humidity swing release mechanism is used) and/or stored (e.g., in a storage tank or other storage structure). In some embodiments, the $CO_2$ released from the sorbent may be permanently sequestered, e.g., by direct injection of $CO_2$ into deep well or deep ocean storage. In some embodiments, the $CO_2$ released from the sorbent may be delivered to an enclosed environment, e.g., a greenhouse (where increased levels of $CO_2$ will improve conditions for growth), a bioreactor, or an enclosed algae or *lemna* (duckweed) culture. In some embodiments, the $CO_2$ released from the sorbent may be delivered for use in a secondary process where the $CO_2$ is transformed into a useful or benign product. The $CO_2$ may be delivered in whatever form is required for the secondary process, which may be gaseous, solid, or liquid $CO_2$. The secondary process may be any manufacturing, food processing, or other industrial process that uses $CO_2$ including, but not limited to, use as a machining coolant and lubricant, grit blasting for smoothing and paint removal, cryogenic cleaning, quick freeze processes, production and use of R744 refrigerant, $CO_2$-based dry cleaning solvents, perishable shipping container pre-cooling, perishable shipping inert environment maintenance, beverage carbonation, fire suppression, plant fertilization, horticulture or agriculture (e.g., through delivery of the released $CO_2$ to the interior of a greenhouse to promote plant growth), silvaculture, aquatic plant or algae production (e.g., through delivery of the released $CO_2$ to the interior of a bioreactor to promote duckweed (*lemna*) or algae growth), enhanced oil recovery, water softening, Solvay processes, as a propellant or pressurizing gas (e.g., for aerosol cans, inflation gas for life rafts), supercritical $CO_2$ extraction processes, semiconductor manufacturing, as an organic solvent, perfume aromatics, decaffeinating beverages (e.g., coffee and tea), supramics, pharmaceutical manufacturing, chemical production processes for manufacturing urea, methanol, inorganic carbonates, organic carbonates, polyurethanes, paint pigments, foaming agents, carbon-based fuels (i.e., synthetic fuels), fumigation (e.g., of grain elevators), neutralization of alkaline water, as a gas shield (e.g., for welding), etc. In any of these embodiments, the disclosed devices and systems (or apparatus) used to implement the disclosed methods may be modular in design, so that linking two or more modules creates a system having a higher $CO_2$ capture and/or delivery capacity. In some embodiments, the modular systems disclosed are not required to be co-located with large, stationary sources of $CO_2$ emissions such as fossil fuel-based power plants, oil refineries, etc.

In some embodiments, e.g., those in which the disclosed methods and apparatus are used to capture $CO_2$ from ambient air, the $CO_2$ concentration in the ambient air may range from about 300 ppm to about 500 ppm. In some embodiments, the $CO_2$ concentration in the ambient air may be at least 300 ppm, at least 350 ppm, at least 400 ppm, at least 450 ppm, or at least 500 ppm. In some embodiments, the $CO_2$ concentration in the ambient air or gas stream may be at most 500 ppm, at most 450 ppm, at most 400 ppm, at most 350 ppm, or at most 300 ppm. Any of the lower and upper values described in this paragraph may be combined to form a range included within the present disclosure, for example, the $CO_2$ concentration in the ambient air may range from about 350 ppm to about 450 ppm. Those of skill in the art will recognize that the $CO_2$ concentration of the ambient air may have any value within this range, e.g., about 390 ppm.

In some embodiments, e.g., those in which the disclosed methods and apparatus are used to capture $CO_2$ from a gas stream (e.g., a flue gas) or from air within an enclosed environment (e.g., the interior of a vehicle or building), the $CO_2$ concentration in the gas stream or enclosed environment may range from about 500 ppm to about 5,000 ppm. In some embodiments, the concentration of $CO_2$ in the gas stream or enclosed environment may be at least 500 ppm, at least 600 ppm, at least 700 ppm, at least 800 ppm, at least 900 ppm, at least 1,000 ppm, at least 1,100 ppm, at least 1,200 ppm, at least 1,300 ppm, at least 1,400 ppm, at least 1,500 ppm, at least 2,000 ppm, at least 2,500 ppm, at least 3,000 ppm, at least 4,000 ppm, or at least 5,000 ppm. In some embodiments, the concentration of $CO_2$ in the gas stream or enclosed environment may be at most 5,000 ppm, at most 4,000 ppm, at most 3,000 ppm, at most 2,500 ppm, at most 2,000 ppm, at most 1,500 ppm, at most 1,400 ppm, at most 1,300 ppm, at most 1,200 ppm, at most 1,100 ppm, at most 1,000 ppm, at most 900 ppm, at most 800 ppm, at most 700 ppm, at most 600 ppm, or at most 500 ppm. Any of the lower and upper values described in this paragraph may be combined to form a range included within the present disclosure, for example, the $CO_2$ concentration in the gas stream or enclosed environment may range from about 700 ppm to about 1,200 ppm. Those of skill in the art will recognize that the concentration of $CO_2$ in the gas stream or enclosed environment may have any value within this range, e.g., about 1,050 ppm.

In some embodiments, e.g., those in which the disclosed methods and apparatus are used to capture $CO_2$ from ambient air, the $CO_2$ adsorption and/or release processes may be performed at an ambient temperature ranging from about $-20°$ C. to about $40°$ C. For example, in some embodiments, the disclosed methods and apparatus may be suitable for direct air capture of $CO_2$ in a cold and dry climate such as is found in northern Alaska or Canada. In some embodiments, the ambient temperature may be at least $-20°$ C., at least $-10°$ C., at least $0°$ C. at least $5°$ C., at least $10°$ C., at least $15°$ C., at least $20°$ C., at least $25°$ C., at least $30°$ C., at least $35°$ C., or at least $40°$ C. In some embodiments, the ambient temperature may be at most $40°$ C., at most $35°$ C., at most $30°$ C., at most $25°$ C., at most $20°$ C., at most $15°$ C., at most $10°$ C., at most $5°$ C., at most $0°$ C., at most $-10°$ C., or at most $-20°$ C. Any of the lower and upper values described in this paragraph may be combined to form a range included within the present disclosure, for example, the ambient temperature may range from about $15°$ C. to about $30°$ C. Those of skill in the art will recognize that the ambient temperature may have any value within this range, e.g., about $21°$ C.

In some embodiments, the amount of $CO_2$ bound to the sorbent at the beginning and/or end of each capture (adsorption) and release (desorption) cycle may range from about 0% to about 100% of the maximal $CO_2$ binding capacity of the sorbent. In some embodiments, the amount of $CO_2$ bound to the sorbent at the beginning and/or end of each capture and release cycle may be at least 0%, at least 10%, at least 20%, at least 30%, at least 40%, at least 50%, at least 60%, at least 70%, at least 80%, or at least 90% of the maximal $CO_2$ binding capacity of the sorbent. In some embodiments, the amount of $CO_2$ bound to the sorbent at the beginning and/or end of each capture and release cycle may be at most 100%, at most 90%, at most 80%, at most 70%, at most 60%, at most 50%, at most 40%, at most 30%, at most 20%, or at most 10% of the maximal $CO_2$ binding capacity of the sorbent. Any of the lower and upper values described in this paragraph may be combined to form a range included within the present disclosure, for example, the amount of $CO_2$ bound to the sorbent at the beginning and/or end of each capture and release cycle may range from about 10% to about 80% of the maximal $CO_2$ binding capacity of the sorbent. Those of skill in the art will recognize that the amount of $CO_2$ bound to the sorbent at the beginning and/or end of each capture and release cycle may have any value within this range, e.g., about 54% of the maximal $CO_2$ binding capacity of the sorbent, and furthermore, that this value may vary with the specific choice of sorbent. In some embodiments, the amount of $CO_2$ bound to the sorbent at the beginning and/or end of each capture and release cycle may vary depending not only on the type of sorbent used, but also on the $CO_2$ concentration in the ambient air or gas mixture, the ambient temperature and humidity, the volumetric flow rates of the ambient air, gas mixture, and/or humid air through the packed bed or fluidized bed, etc.

In some embodiments, the maximal amount of $CO_2$ bound to the sorbent at the end of the capture step may range from about 10% to about 100% of the maximal $CO_2$ binding capacity of the sorbent. In some embodiments, the amount of $CO_2$ bound to the sorbent at the end of the capture step may be at least 10%, at least 20%, at least 30%, at least 40%, at least 50%, at least 60%, at least 70%, at least 80%, or at least 90% of the maximal $CO_2$ binding capacity of the sorbent. In some embodiments, the amount of $CO_2$ bound to the sorbent at the end of the capture process may be at most 100%, at most 90%, at most 80%, at most 70%, at most 60%, at most 50%, at most 40%, at most 30%, at most 20%, or at most 10% of the maximal $CO_2$ binding capacity of the sorbent. Any of the lower and upper values described in this paragraph may be combined to form a range included within the present disclosure, for example, the amount of $CO_2$ bound to the sorbent at the end of the capture step may range from about 30% to about 80% of the maximal $CO_2$ binding capacity of the sorbent. Those of skill in the art will recognize that the amount of $CO_2$ bound to the sorbent at the end of the capture step may have any value within this range, e.g., about 76% of the maximal $CO_2$ binding capacity of the sorbent, and furthermore, that this value may vary with the specific choice of sorbent. In some embodiments, the amount of $CO_2$ bound to the sorbent at the end of the capture step may vary depending not only on the type of sorbent used, but also on the $CO_2$ concentration in the ambient air or gas mixture, the ambient temperature and humidity, the volumetric flow rates of the ambient air, gas mixture, and/or humid air through the packed bed or fluidized bed, etc.

As noted above, in order to meet the need for processing large volumes of ambient air (or other gases) in order to capture significant quantities of carbon dioxide without constructing an apparatus of immense size, in some embodiments the disclosed methods may comprise implementing cyclic processes further comprising carbon dioxide capture, carbon dioxide release, and/or sorbent regeneration steps. In general, the number of cycles performed is based on the time required to perform the adsorption, desorption, and/or the duration and frequency of any required sorbent regeneration steps. In some embodiments of the disclosed methods and apparatus, the number of cycles performed per day may range from about 1 to about 300. In some embodiments, the number of cycles performed may be at least 1, at least 2, at least 4, at least 6, at least 8, at least 10, at least 12, at least 14, at least 16, at least 18, at least 20, at least 22, at least 24 cycles per day, at least 25 cycles per day, at least 50 cycles per day, at least 75 cycles per day, at least 100 cycles per day, at least 125 cycles per day, at least 150 cycles per day, at least 175 cycles per day, at least 200 cycles per day, at least 225 cycles per day, at least 250 cycles per day, at least 275 cycles per day, or at least 300 cycles per day. In some embodiments, the number of cycles performed may be at most 300 cycles per day, at most 275 cycles per day, at most 250 cycles per day, at most 225 cycles per day, at most 200 cycles per day, at most 175 cycles per day, at most 150 cycles per day, at most 125 cycles per day, at most 100 cycles per day, at most 75 cycles per day, at most 50 cycles per day, at most 25 cycles per day, at most 24, at most 22, at most 20, at most 18, at most 16, at most 14, at most 12, at most 10, at most 8, or at most 6, at most 4, at most 2, or at most 1 cycles per day. Any of the lower and upper values described in this paragraph may be combined to form a range included within the present disclosure, for example, the number of cycles performed per day may range from about 8 to about 125. Those of skill in the art will recognize that the number of cycles performed per day may have any value within this range, e.g., about 12.5 cycles per day.

In general, the overall cycle time for the cyclic processes of the disclose methods and apparatus may range from about 30 minutes to about 4 hours. In some embodiments, the cycle time may be at least 30 minutes, at least 40 minutes, at least 50 minutes, at least 1 hour, at least 2 hours, at least 3 hours, or at least 4 hours. In some embodiments, the cycle time may be at most 4 hours, at most 3 hours, at most 2 hours, at most 1 hour, at most 50 minutes, at most 40 minutes, or at most 30 minutes. Any of the lower and upper values described in this paragraph may be combined to form a range included within the present disclosure, for example, in some embodiments the cycle time may range from about 30 minutes to about 2 hours. Those of skill in the art will recognize that the cycle time may have any value within this range, e.g., about 1 hour, 12 minutes.

In general, the transfer rate at which captured and subsequently released carbon dioxide may be delivered to an enclosed environment (or released and concentrated, sequestered, or used in a secondary process) using the disclosed methods and apparatus may range from about 0.5 kg (~11.4 mol) $CO_2$ to about 500 kg (~11,360 mol) $CO_2$ per day per sorbent bed. In some embodiments, the rate at which carbon dioxide is transferred to an enclosed environment may be at least 0.5 kg, at least 1 kg $CO_2$, at least 10 kg $CO_2$, at least 25 kg $CO_2$, at least 50 kg $CO_2$, at least 75 kg $CO_2$, at least 100 kg $CO_2$, at least 125 kg $CO_2$, at least 150 kg $CO_2$, at least 175 kg $CO_2$, at least 200 kg $CO_2$, at least 225 kg $CO_2$, at least 250 kg $CO_2$, at least 275 kg $CO_2$, at least 300 kg $CO_2$, at least 325 kg $CO_2$, at least 350 kg $CO_2$, at least 375 kg $CO_2$, at least 400 kg $CO_2$, at least 425 kg $CO_2$, at least 450 kg $CO_2$, at least 475 kg $CO_2$, or at least 500 kg $CO_2$ per day per sorbent bed. In some embodiments, the rate at which carbon dioxide is transferred to an enclosed environment may be at most 500 kg $CO_2$, at most 475 kg $CO_2$, at most 450 kg $CO_2$, at most 425 kg $CO_2$, at most 400 kg $CO_2$, at most 375 kg $CO_2$, at most 350 kg $CO_2$, at most 325 kg $CO_2$, at most 300 kg $CO_2$, at most 275 kg $CO_2$, at most 250 kg $CO_2$, at most 225 kg $CO_2$, at most 200 kg $CO_2$, at most 175 kg $CO_2$, at most 150 kg $CO_2$, at most 125 kg $CO_2$, at most 100 kg $CO_2$, at most 75 kg $CO_2$, at most 50 kg $CO_2$, at most 25 kg $CO_2$, at most 10 kg $CO_2$, at most 1 kg $CO_2$, or at most 0.5 kg $CO_2$ per day per sorbent bed. Any of the lower and upper values described in this paragraph may be combined to form a range included within the present disclosure, for example, the rate at which carbon dioxide is transferred to an enclosed environment may range from about 10 kg $CO_2$ to about 75 kg $CO_2$ per day per sorbent bed. Those of skill in the art will recognize that the rate at which carbon dioxide is transferred to an enclosed environment may have any value within this range, e.g., about 2.5 kg $CO_2$ per day per sorbent bed. Multi-bed installations may thus transfer $CO_2$ in metric ton per day quantities.

In some embodiments, the volumetric flow rate of gas, ambient air, and/or humid air flowing through the one or more packed bed or fluidized bed extractors is dependent on the total cross-sectional area or total sorbent resin mass of the one or more beds. For example, the volumetric flow rate of gas, ambient air, and/or humid air flowing through the one or more packed bed or fluidized bed extractors may range from about 10 to about 100 $m^3$/hr/kg. In some embodiments, the volumetric flow rate of gas, ambient air, and/or humid air may be at least 10 $m^3$/hr/kg, at least 20 $m^3$/hr/kg, at least 30 $m^3$/hr/kg, at least 40 $m^3$/hr/kg, at least 50 $m^3$/hr/kg, at least 60 $m^3$/hr/kg, at least 70 $m^3$/hr/kg, at least 80 $m^3$/hr/kg, at least 90 $m^3$/hr/kg, or at least 100 $m^3$/hr/kg. In some embodiments, the volumetric flow rate of gas, ambient air, and/or humid air may be at most 100 $m^3$/hr/kg, at most 90 $m^3$/hr/kg, at most 80 $m^3$/hr/kg, at most 70 $m^3$/hr/kg, at most 60 $m^3$/hr/kg, at most 50 $m^3$/hr/kg, at most 40 $m^3$/hr/kg, at most 30 $m^3$/hr/kg, at most 20 $m^3$/hr/kg, or at most 10 $m^3$/hr/kg. Any of the lower and upper values described in this paragraph may be combined to form a range included within the present disclosure, for example, the volumetric flow rate of gas, ambient air, and/or humid air may range from about 20 $m^3$/hr/kg to about 80 $m^3$/hr/kg. Those of skill in the art will recognize that the volumetric flow rate of gas, ambient air, and/or humid air may have any value within this range, e.g., about 20.6 $m^3$/hr/kg.

In some embodiments, the purity of the $CO_2$ released from the sorbent may range from about 0.1 vol % pure to about 100 vol % pure without performing further purification. In some embodiments, the purity of the $CO_2$ released from the sorbent may be at least 0.1 vol %, at least 1 vol %, at least 5 vol %, at least 10 vol %, at least 20 vol %, at least 30 vol %, at least 40 vol %, at least 50 vol %, at least 60 vol %, at least 70 vol %, at least 80 vol %, at least 90 vol %, or at least 95 vol %. In some embodiments, the purity of the $CO_2$ released from the sorbent may be at most 95 vol %, at most 90 vol %, at most 80 vol %, at most 70 vol %, at most 60 vol %, at most 50 vol %, at most 40 vol %, at most 30 vol %, at most 20 vol %, at most 10 vol %, at most 5 vol %, or at most 1 vol %. Any of the lower and upper values described in this paragraph may be combined to form a range included within the present disclosure, for example, the purity of the $CO_2$ released from the sorbent may range from about 5 vol % to about 80 vol %. Those of skill in the art will recognize that the purity of $CO_2$ released from the sorbent may have any value within this range, e.g., about 0.14 vol %.

In some embodiments, e.g., those in which the $CO_2$ released from the sorbent is delivered to an enclosed environment (e.g., a greenhouse or other structure), the resulting $CO_2$ concentration of the air inside the greenhouse, i.e., the "indoor air", may range from about 200 ppm to about 4,000 ppm, or higher. In some embodiments, the resulting $CO_2$ concentration of the greenhouse air (or indoor air) may be at least 200 ppm, at least 300 ppm, at least 400 ppm, at least 500 ppm, at least 600 ppm, at least 700 ppm, at least 800 ppm, at least 900 ppm, at least 1,000 ppm, at least 1,100 ppm, at least 1,200 ppm, at least 1,300 ppm, at least 1,400 ppm, at least 1,500 ppm, at least 2,000 ppm, at least 2,500 ppm, at least 3,000 ppm, or at least 4,000 ppm. In some embodiments, the resulting $CO_2$ concentration of the greenhouse air (or indoor air) may be at most 4,000 ppm, at most 3,000 ppm, at most 2,500 ppm, at most 2,000 ppm, at most 1,500 ppm, at most 1,400 ppm, at most 1,300 ppm, at most 1,200 ppm, at most 1,100 ppm, at most 1,000 ppm, at most 900 ppm, at most 800 ppm, at most 700 ppm, at most 600 ppm, at most 500 ppm, at most 400 ppm, at most 300 ppm, or at most 200 ppm. Any of the lower and upper values described in this paragraph may be combined to form a range included within the present disclosure, for example, the $CO_2$ concentration of the greenhouse air (or indoor air) may range from about 800 ppm to about 1,400 ppm. Those of skill in the art will recognize that the $CO_2$ concentration of the greenhouse air (or indoor air) may have any value within this range, e.g., about 1,050 ppm.

In some embodiments, e.g., those in which the $CO_2$ released from the sorbent is delivered to an enclosed environment (e.g., a greenhouse or other structure) and a combination of $CO_2$ sensors and/or humidity sensors and feedback circuitry are used to monitor and control the $CO_2$ concentration and/or humidity of the air inside the greenhouse by varying, for example, the volumetric flow rate of ambient air or humid air flowing through the one or more packed bed or fluidized bed extractors, the $CO_2$ content of the greenhouse air may be maintained within a specified range of a desired target level for all or a portion of the day/night cycle. For example, in some embodiments, the $CO_2$ content of the greenhouse air may be maintained within a coefficient of variation of ±5%, ±10%, ±15%, or ±20% of the target $CO_2$ level. In some embodiments, the relative humidity of the greenhouse air may also be maintained within a specified range of a desired target level for all or a portion of the day/night cycle. For example, in some embodiments, the relative humidity of the greenhouse air may be maintained within a coefficient of variation of ±5%, ±10%, ±15%, or ±20% of the target relative humidity level.

Because of the high $CO_2$ capture and release efficiencies and low energy input requirements for the disclosed methods and apparatus (in particular, when using the preferred humidity swing release mechanism for release of captured $CO_2$ from a suitable sorbent), the total cost per ton of $CO_2$ that is captured and subsequently released for delivery to an enclosed environment (or released and concentrated, sequestered, converted to a useful product, or used in a secondary process) may be very low. For example, in some embodiments, the total cost for $CO_2$ captured from ambient air and delivered to an enclosed environment may range from about $10 per ton to about $1,000 per ton. In some embodiments, the total cost for $CO_2$ captured from ambient air and delivered to an enclosed environment may be at least $10 per ton, at least $50 per ton, at least $100 per ton, at least $200 per ton, at least $300 per ton, at least $400 per ton, at least $500 per ton, at least $600 per ton, at least $700 per ton, at least $800 per ton, at least $900 per ton, or at least $1,000 per ton. In some embodiments, the total cost for $CO_2$ captured from ambient air and delivered to an enclosed environment may be at most $1,000, at most $900, at most $800, at most $700, at most $600, at most $500, at most $400, at most $300, at most $200, at most $100 per ton, at most $50 per ton, or at most $10 per ton. Any of the values within this paragraph may be combined to form a range included in the present disclosure. For example, the total cost for $CO_2$ captured from ambient air and delivered to an enclosed environment may range from about $50 per ton to about $200 per ton.

Those of skill in the art will recognize that in specific embodiments, the total cost of the $CO_2$ captured and delivered to an enclosed environment may have any value within this range, for example, about $95 per ton.

The total cost for installing and operating carbon dioxide capture technologies may include contributions from: (i) capital investment, (ii) the cost of capture (i.e., the cost of energy required for operating the process), (iii) the cost of $CO_2$ release and regeneration of the sorbent, and (iv) the cost of sorbent losses and maintenance of equipment (Sans-Perez, et al. (2016)). Depending on how the captured $CO_2$ is subsequently utilized, there may be additional costs incurred for: (v) $CO_2$ compression, (vi) $CO_2$ transportation, (vii) geological sequestration or other forms of sequestration, (viii) leakage monitoring, and/or correcting or minimizing any unforeseen environmental impact. Past cost analyses have estimated that the total costs for direct capture of $CO_2$ from ambient air may range from about $30 to about $1,000 per ton, with most estimates coming in at the several hundred dollars per ton level. In preferred embodiments of the methods, devices, and systems disclosed herein, the use of a moisture swing release mechanism may dramatically lower the total cost for direct capture of $CO_2$ from ambient air (or indoor air), i.e., by circumventing the large energy penalties incurred through the use of thermal swing, vacuum swing, steam stripping, and other release mechanisms.

In preferred embodiments, the total cost of implementing the disclosed $CO_2$ capture methods, devices, and systems may be offset by subsequently converting the captured $CO_2$ to a useful product or by employing it in a secondary commercial process. Thus, in some embodiments, the net cost of for $CO_2$ captured from ambient air and delivered to an enclosed environment (or released and concentrated for subsequent sale, converted to a useful product, or used in a secondary process) may range from about $10 per ton to about $1,000 per ton. In some embodiments, the net cost for $CO_2$ captured from ambient air and delivered to an enclosed environment may be at least $10 per ton, at least $50 per ton, at least $100 per ton, at least $200 per ton, at least $300 per ton, at least $400 per ton, at least $500 per ton, at least $600 per ton, at least $700 per ton, at least $800 per ton, at least $900 per ton, or at least $1,000 per ton. In some embodiments, the net cost for $CO_2$ captured from ambient air and delivered to an enclosed environment may be at most $1,000, at most $900, at most $800, at most $700, at most $600, at most $500, at most $400, at most $300, at most $200, at most $100 per ton, at most $50 per ton, or at most $10 per ton. Any of the values within this paragraph may be combined to form a range included in the present disclosure. For example, the net cost for $CO_2$ captured from ambient air and delivered to an enclosed environment may range from about $50 per ton to about $200 per ton. Those of skill in the art will recognize that in specific embodiments, the net cost of the $CO_2$ captured and delivered to an enclosed environment may have any value within this range, for example, about $55 per ton.

Figure 3:
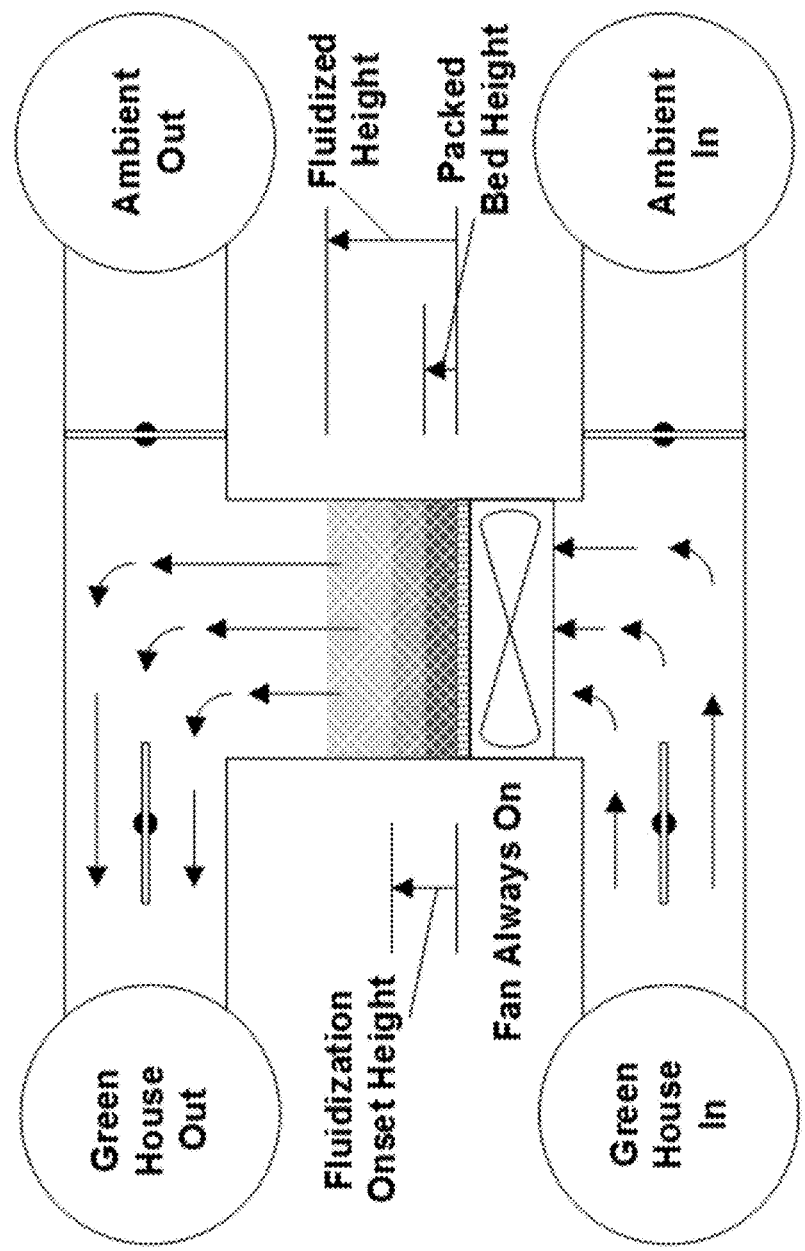
FIG. 3 provides a schematic illustration of one non-limiting example of an apparatus for capturing carbon dioxide from ambient air and transferring it to the interior of a greenhouse, wherein the apparatus comprises a single fluidized bed extractor and air flow is driven by a fan that runs continuously.

FIG. 3 provides a schematic illustration of one non-limiting example of an apparatus for capturing carbon dioxide from ambient air and transferring it to the interior of a greenhouse, wherein the apparatus comprises a single fluidized bed extractor and air flow is driven by a fan that runs continuously. The apparatus comprises two pairs of inlet and outlet ducts—one set that connects with the ambient air, and one set that connects with the interior of the greenhouse. The fan is located in the common flow path connecting the inlets to the outlets, and which includes the fluidized bed extractor comprising the sorbent material. In a preferred embodiment, the sorbent material comprises a strong base, type 2 anion exchange resin and a humidity swing release mechanism is employed. Two pairs of valves—one pair positioned within the ambient air inlet and outlet ducts, and one pair positioned within the greenhouse inlet and outlet ducts—are controlled by an air flow controller and are used to control which inlet air stream is contacted with the fluidized bed extractor at any given time. In operation, a flow of relatively dry ambient air is driven through the fluidized bed extractor by the fan for a first specified period of time while the greenhouse inlet and outlet valves are held shut, thereby enabling capture of $CO_2$ from the ambient air by the sorbent. Following the first specified period of time, the ambient air inlet and outlet valves are shut and the fan drives a flow of humid greenhouse air through the fluidized bed reactor for a second specified period of time, thereby causing release of the adsorbed $CO_2$ (in the case that the sorbent comprises a strong base, type 2 anion exchange material) and its delivery to the greenhouse interior. In some embodiments, the release of $CO_2$ by a strong base, type 2 anion exchange material may be facilitated by using an aqueous spray or wetting mechanism in conjunction with the flow of greenhouse air through the fluidized bed. In some embodiments, e.g., when an alternative sorbent is used in the fluidized bed, the release of $CO_2$ by the sorbent material may be facilitated, e.g., by using a heater to heat the inlet greenhouse air and/or the fluidized bed extractor in conjunction with the flow of greenhouse air through the fluidized bed. In some embodiments, the first specified period of time may be the same as or different from the second specified period of time. In some embodiments, a packed bed extractor may be used instead of a fluidized bed extractor. An air flow controller may be used to control the operation of the fan (e.g., on/off status, fan rotation speed, etc.) and/or the valves positioned in the ambient air and greenhouse inlets and outlets, and allows for manual, semi-automated, or automated control of the switching between ambient air and greenhouse air flow as well as other cyclic operational parameters.

Figure 4:
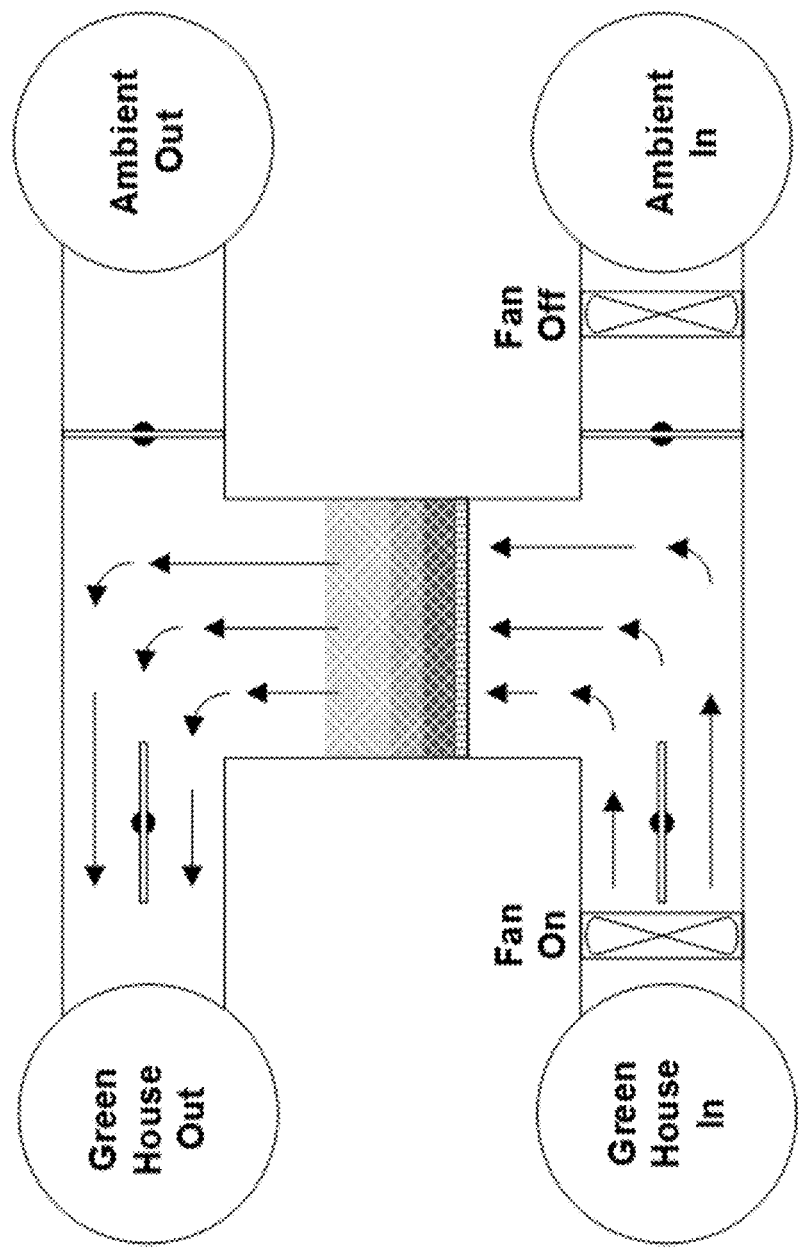
FIG. 4 provides a schematic illustration of another non-limiting example of an apparatus for capturing carbon dioxide from ambient air and transferring it to the interior of a greenhouse, wherein the apparatus comprises a single fluidized bed extractor and air flow is driven by the operation of two fans that cycle between on and off states. Although illustrated in this figure as comprising a single fluidized bed, in some embodiments a modular system may be installed that comprises multiple fluidized beds, where the air flow through each bed is controlled by its own pair of fans. This design approach may thus provide flexibility with respect to capacity expansion.

FIG. 4 provides a schematic illustration of another non-limiting example of an apparatus for capturing carbon dioxide from ambient air and transferring it to the interior of a greenhouse, wherein the apparatus comprises a single fluidized bed extractor and air flow is driven by the operation of two fans that cycle between on and off states. Although illustrated in this figure as comprising a single fluidized bed, in some embodiments a modular system may be installed that comprises multiple fluidized beds, where the air flow through each bed is controlled by its own pair of fans, and the respective inlets and outlets for each bed are optionally connected through inlet and outlet manifolds to a single pair of ambient air and greenhouse inlets and outlets. The apparatus illustrated in FIG. 4 comprises two pairs of inlet and outlet ducts—one set that connects with the ambient air, and one set that connects with the interior of the greenhouse. There is a fan located in each of the ambient air and greenhouse air inlet ducts. The latter connect to the common flow path connecting the inlets to the outlets, and which also includes the fluidized bed extractor comprising the sorbent material. In a preferred embodiment, the sorbent material comprises a strong base, type 2 anion exchange resin and a humidity swing release mechanism is employed. Two pairs of valves—one pair positioned within the ambient air inlet and outlet ducts, and one pair positioned within the greenhouse inlet and outlet ducts—are controlled by an air flow controller which also controls the two inlet fans, and are used in conjunction with the fans to control which inlet air stream is contacted with the fluidized bed extractor at any given time. In operation, a flow of relatively dry ambient air is driven through the fluidized bed extractor by the ambient air inlet fan for a first specified period of time while the greenhouse air inlet fan is off, and the greenhouse inlet and outlet valves are held shut, thereby enabling capture of $CO_2$ from the ambient air by the sorbent. Following the first specified period of time, the ambient air inlet fan is turned off and the ambient air inlet and outlet valves are shut, the greenhouse air inlet fan is turned on and the greenhouse inlet and outlet valves are opened, and the greenhouse inlet fan drives a flow of humid greenhouse air through the fluidized bed reactor for a second specified period of time, thereby causing release of the adsorbed $CO_2$ (in the case that the sorbent comprises a strong base, type 2 anion exchange material) and its delivery to the greenhouse interior. In some embodiments, the release of $CO_2$ by a strong base, type 2 anion exchange material may be facilitated by using an aqueous spray or wetting mechanism in conjunction with the flow of greenhouse air through the fluidized bed. In some embodiments, e.g., when an alternative sorbent is used in the fluidized bed, the release of $CO_2$ by the sorbent material may be facilitated, e.g., by using a heater to heat the inlet greenhouse air and/or the fluidized bed extractor in conjunction with the flow of greenhouse air through the fluidized bed. In some embodiments, the first specified period of time may be the same as or different from the second specified period of time. In some embodiments, a packed bed extractor may be used instead of a fluidized bed extractor. An air flow controller may be used to control the operation of the two inlet fans (e.g., on/off status, fan rotation speed, etc.) and/or the valves positioned in the ambient air and greenhouse inlets and outlets, and allows for manual, semi-automated, or automated control of the switching between ambient air and greenhouse air flow as well as other cyclic operational parameters. As noted above, the apparatus illustrated in FIG. 4 may be used as an individual module for the installation of modular systems that allow for flexible expansion of $CO_2$ capture and delivery capacity.

Figure 5:
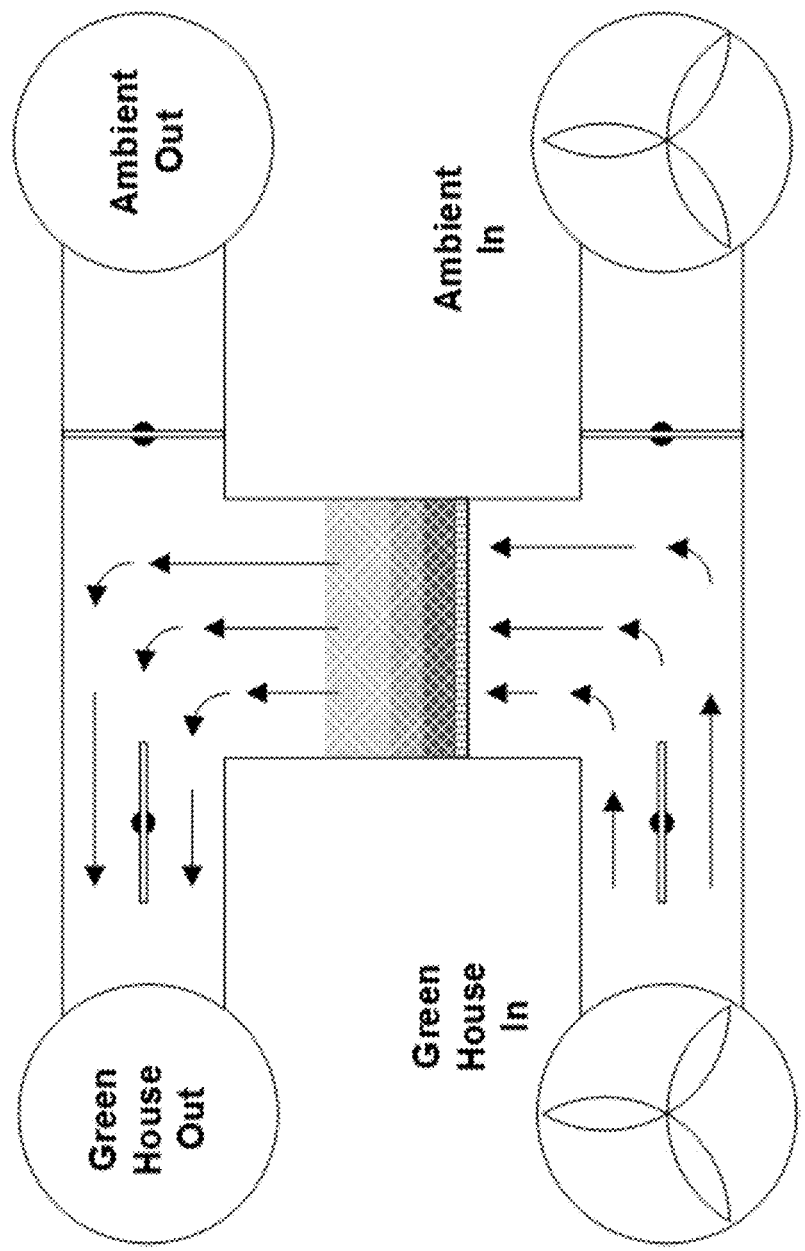
FIG. 5 provides a schematic illustration of another non-limiting example of an apparatus for capturing carbon dioxide from ambient air and transferring it to the interior of a greenhouse, wherein the apparatus comprises a single fluidized bed extractor and air flow is driven by two fans that are located in the ductwork of the greenhouse (or other structure in some embodiments), i.e., rather than within the apparatus itself. This design approach may be more capital efficient, but less flexible with respect to capacity expansion options than the approach illustrated in FIG. 4.

FIG. 5 provides a schematic illustration of another non-limiting example of an apparatus for capturing carbon dioxide from ambient air and transferring it to the interior of a greenhouse, wherein the apparatus comprises a single fluidized bed extractor and air flow is driven by fans that are located in the ductwork of the greenhouse (or other structure in some embodiments) rather than within the apparatus itself. Again, although illustrated in this figure as comprising a single fluidized bed, in some embodiments a multiple bed system may be installed, where the air flow through multiple beds is controlled a fan, or more than one fan, located in the ductwork of the greenhouse (or other structure). A multi-bed installation based on the design approach illustrated in FIG. 5 may prove to be more capital efficient than a multi-bed system based on the modular apparatus illustrated in FIG. 4.

Figure 6:
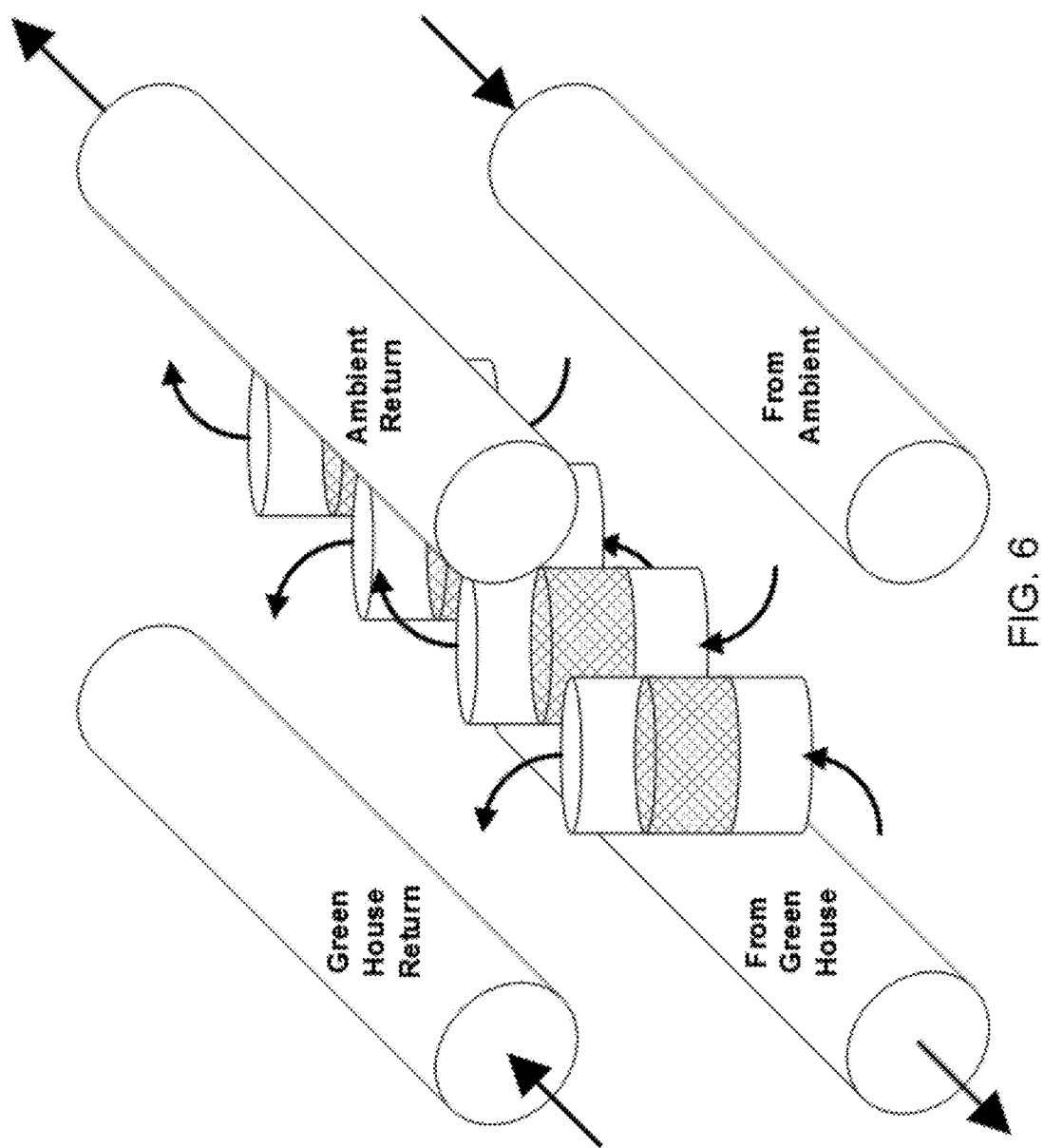
FIG. 6 provides a schematic illustration of one non-limiting example of an apparatus for capturing carbon dioxide from ambient air and transferring it to the interior of a greenhouse, wherein the apparatus comprises a plurality of fluidized bed extractors operated in parallel.

FIG. 6 provides a schematic illustration of one non-limiting example of an apparatus for capturing carbon dioxide from ambient air and transferring it to the interior of a greenhouse, wherein the apparatus comprises a plurality of fluidized bed extractors operated in parallel. Ambient air inlet and return manifolds are connected to a plurality of fluidized bed extractors in parallel, which in turn are connected to greenhouse air inlet and return manifolds. As with the apparatus illustrated in FIGS. 3-5, an air flow controller may be used in combination with two or more fans (not shown) and valves (not shown) to control and alternate between flows of ambient air and greenhouse air through the two or more fluidized beds. In operation, a flow of relatively dry ambient air is driven through the two or more fluidized bed extractors for a first specified period of time by one or more fans located at the ambient air inlet and/or outlet, or within the duct work connected to the ambient air inlet and/or outlet, thereby enabling capture of $CO_2$ from the ambient air by the sorbent. Optionally, a series of valves may be used to isolate the two or more fluidized beds from the greenhouse air inlet and return manifolds while ambient air is being contacted with the sorbent within the fluidized bed extractors. Following the first specified period of time, the ambient air inlet and/or outlet fan(s) are turned off and, optionally, a series of valves are used to isolate the two or more fluidized beds from the ambient air inlet and return manifolds. One or more fans connected to the greenhouse air inlet and/or outlet, or within the duct work connected to the greenhouse air inlet and/or outlet, are then turned on to drive a flow of humid greenhouse air through the two or more fluidized bed reactors for a second specified period of time, thereby causing release of the adsorbed $CO_2$ (in the case that the sorbent comprises a strong base, type 2 anion exchange material) and its delivery to the greenhouse interior. In some embodiments, the release of $CO_2$ by a strong base, type 2 anion exchange material may be facilitated by using an aqueous spray or wetting mechanism in conjunction with the flow of greenhouse air through the two or more fluidized beds. In some embodiments, e.g., when an alternative sorbent is used in the two or more fluidized beds, the release of $CO_2$ by the sorbent material may be facilitated, e.g., by using heater(s) to heat the inlet greenhouse air and/or the two or more fluidized bed extractors in conjunction with the flow of greenhouse air through the two or more fluidized beds. In some embodiments, the first specified period of time may be the same as or different from the second specified period of time. In some embodiments, two or more packed bed extractors may be used instead of two or more fluidized bed extractors. In some embodiments, a combination of packed bed and fluidized bed extractors may be used. In some embodiments, different types of sorbent may be used in the two or more packed bed and/or fluidized bed extractors. An air flow controller may be used to control the operation of the two or more fans (e.g., on/off status, fan rotation speed, etc.) and/or the valves used to isolate the two or more fluidized bed extractors from the ambient air or greenhouse air inlet and return manifolds, and allows for manual, semi-automated, or automated control of the switching between ambient air and greenhouse air flow as well as other cyclic operational parameters.

EXAMPLES

These examples are provided for illustrative purposes only and not to limit the scope of the claims provided herein.

Example 1

Simulation of Fluidized Bed Extractor Performance

Figure 7:
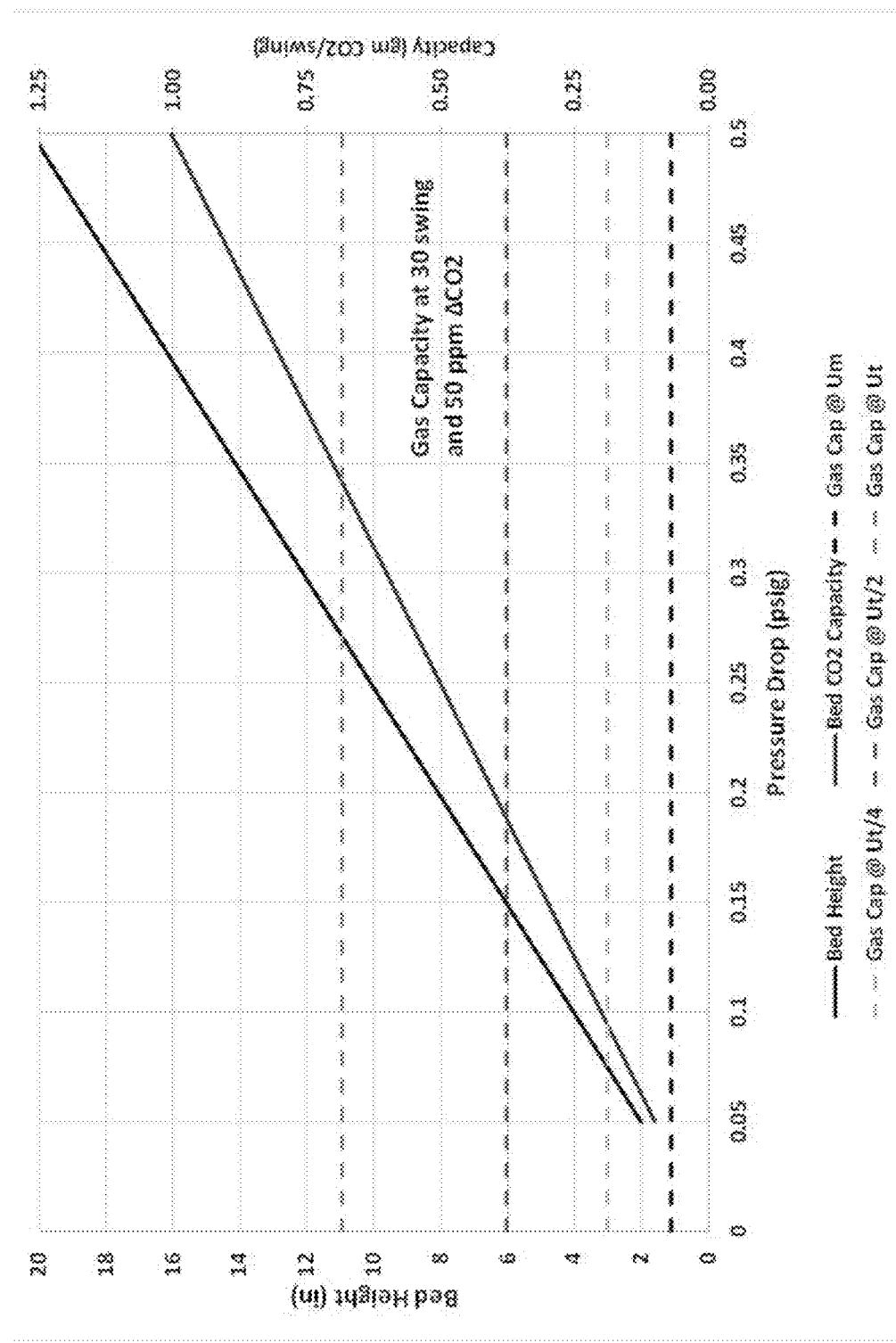
FIG. 7 provides one non-limiting example of simulation data for a fluidized bed extractor which illustrates the predicted relationships between bed height, pressure drop across the bed, and the carbon dioxide transfer capacity of the bed (in units of grams $CO_2$ per humidity swing cycle) under a defined set of operating conditions.

FIG. 7 provides one non-limiting example of simulation data for a fluidized bed extractor which illustrates the predicted relationships between bed height, pressure drop across the bed, and the carbon dioxide transfer capacity of the bed, i.e., the amount of carbon dioxide captured from ambient air and subsequently released by the bed (in units of grams $CO_2$ per humidity swing cycle) under a defined set of bed design parameters and operating conditions.

Example 2

Figure 8:
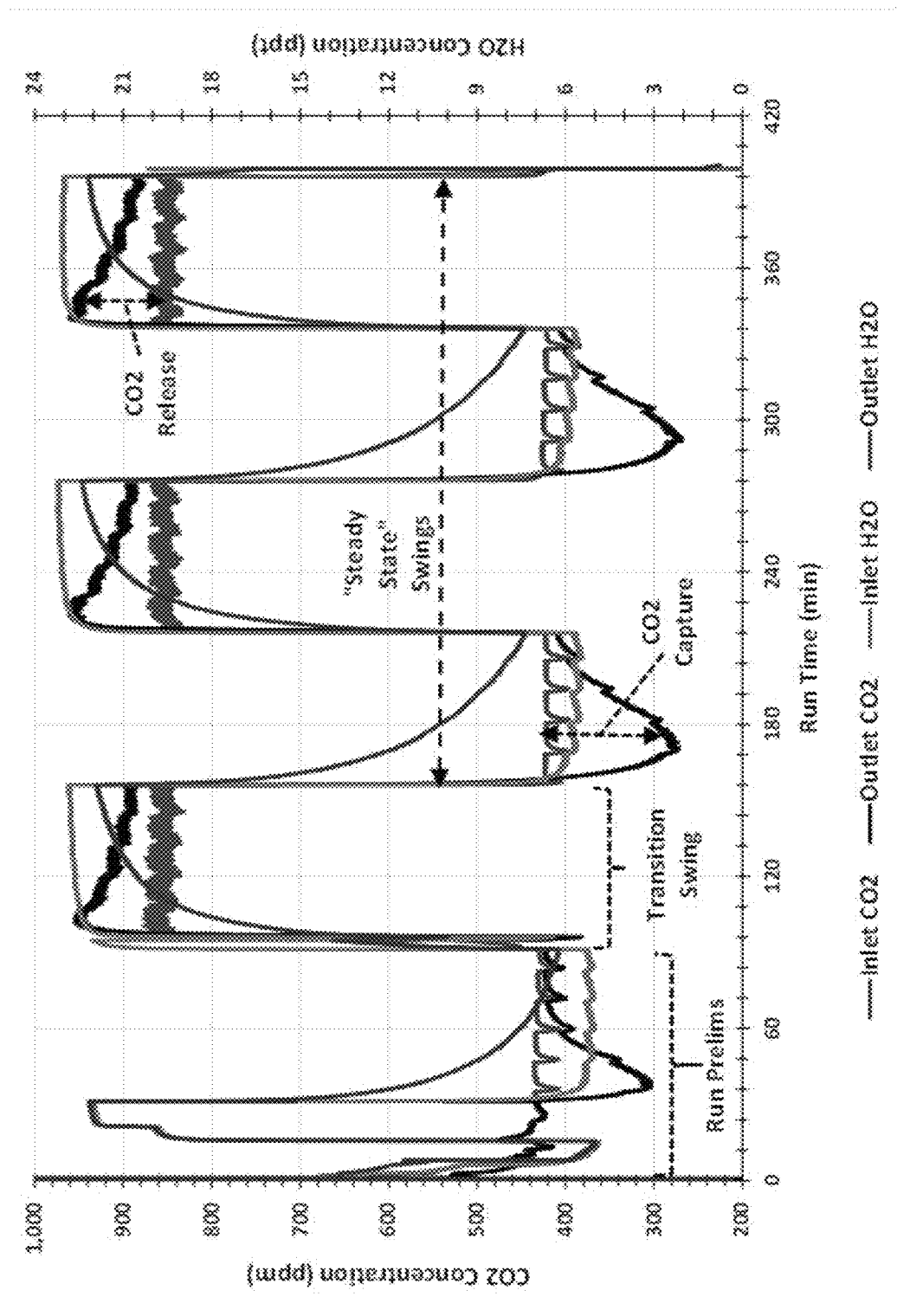
FIG. 8 provides one non-limiting example of performance data for carbon dioxide capture and release using a fluidized bed extractor, wherein $CO_2$ is released from an anion exchange resin using a humidity swing. Tests were performed in an open-loop (once through), laboratory-scale environmental chamber.

Experimental Performance Data for Carbon Dioxide Capture and Release Using a Humidity Swing FIG. 8 provides one non-limiting example of experimental performance data for carbon dioxide capture and release using a fluidized bed extractor, wherein $CO_2$ is released from an anion exchange resin using a humidity swing cycle of approximately 120 minutes in duration (approximately 60 minutes of adsorption and 60 minutes of desorption). Tests were performed in an open-loop, laboratory-scale environmental chamber utilizing a 2" diameter tube (1.87" inner diameter) as the housing for a fluidized bed consisting of 74 grams of a commercial anion exchange resin (Purolite A500 (OH form), Purolite, Bala Cynwyd, Pa.). The inlet gas flows for each swing segment was set to 25 standard liters per minute (slpm) and temperature was held between 22° C. and 23° C. The conditions of the ambient or adsorption flow were 8.5 ppt $H_2O$ (32% RH) and ~430 ppm $CO_2$. The desorption gas stream conditions were ~23 ppt $H_2O$ (~85% RH) and 850 ppm $CO_2$ (simulated greenhouse conditions). Inlet and outlet $CO_2$ and $H_2O$ concentrations were monitored using separate Li-Cor Li-840A $CO_2$/$H_2O$ gas analyzers.

Without the resin in place, approximate step changes in $CO_2$ and $H_2O$ concentrations were measured as the inlet gas stream was cycled between adsorption and desorption flows. With the resin in place, the low $H_2O$ level of the ambient gas stream drew water from the resin (desorbs water) and freed up reactive sites to adsorb $CO_2$. During the $CO_2$ adsorption phase, the gas leaving the resin bed had higher $H_2O$ and lower $CO_2$ concentrations than that entering the bed. Conversely during the $CO_2$ desorption phase, the gas leaving the bed had lower $H_2O$ and higher $CO_2$ concentrations than that entering the bed.

Example 3

Figure 9:
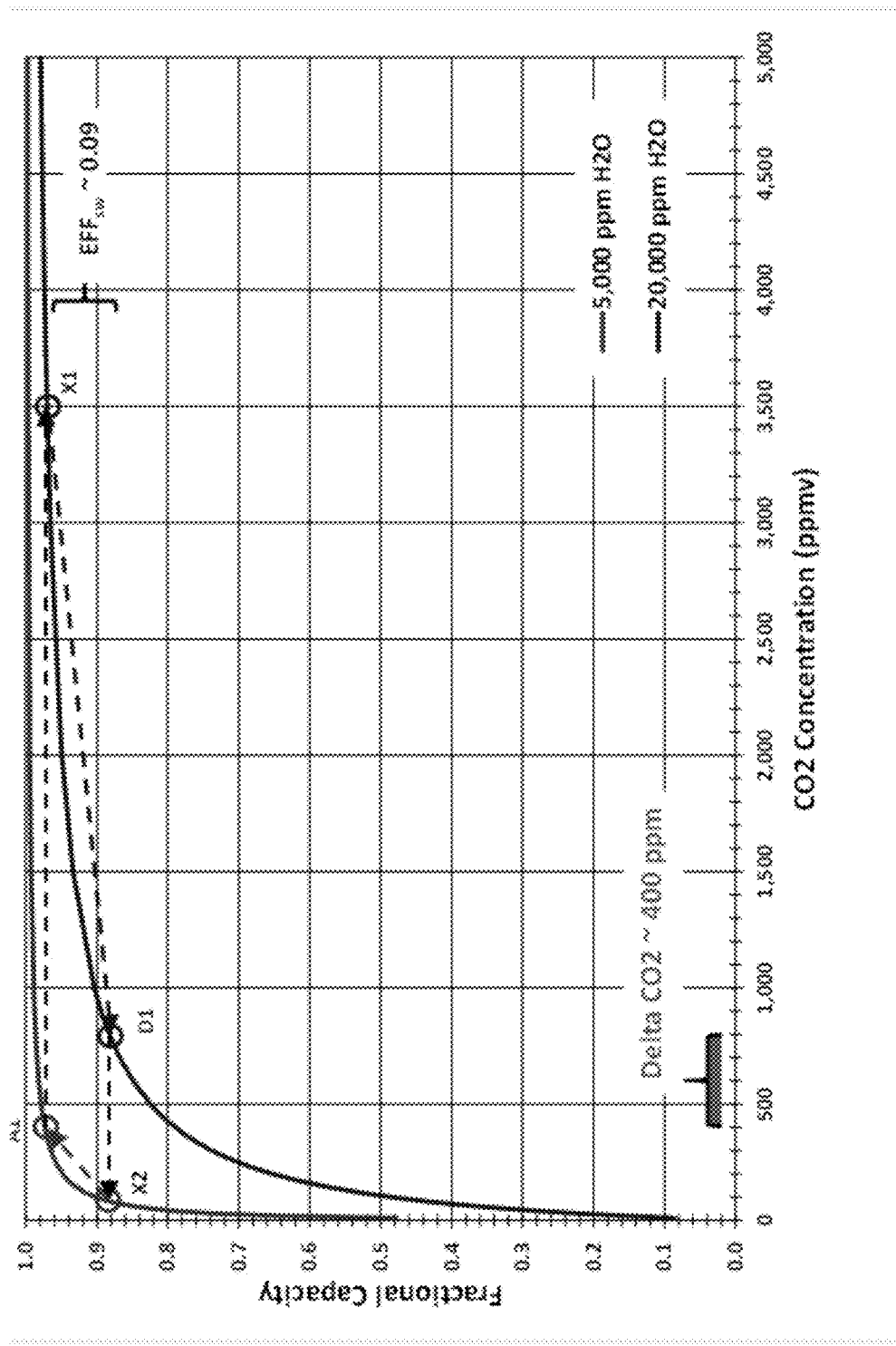
FIG. 9 provides one non-limiting example of $CO_2$ adsorption isotherm data for a typical "moisture swing" cycle using a humidity-sensitive sorbent at 25 C.

Description of a "Typical" Humidity Swing Cycle for a Pilot $CO_2$ Capture System FIG. 9 provides one non-limiting example of $CO_2$ adsorption isotherm data for a typical "moisture swing" cycle using a humidity-sensitive sorbent at 25 C. The proposed prototype $CO_2$ capture system is designed to achieve a transfer capacity of approximately 1.4 kg $CO_2$/day over 18 hours (75 gm $CO_2$/hr). The system is designed to operate near the lower practical capacity limit for a commercial unit. As envisioned, the system will consist of two fluidized sorbent beds that are connected in parallel and that operate 180-degrees out of phase, e.g., one will undergo an adsorption cycle while the other is undergoing a desorption cycle.

The design specification assumes that the gas stream conditions (e.g., temperature, $CO_2$ concentrations, $H_2O$ concentrations, specific gas throughput, etc.) for the gases that cycle through the unit result in an effective transfer capacity equal to 1.25 gm $CO_2$/nominal kg resin/swing cycle (where the term "nominal kg resin" refers to the "as delivered" or "out of the box" condition of the sorbent resin). The swing cycle refers to a pair of sequential adsorption and desorption steps. For the given example, a 2 hour swing cycle was symmetric, i.e., consisting of a 1 hour adsorption step and a 1 hour desorption step.

As mentioned in the technical literature (Wong, et. al., 2013), $CO_2$ and $H_2O$ compete for binding sites on the active resin. The transfer of $CO_2$ to and from the resin, as well as the inverse flow of moisture, is driven by the concentration gradient-based driving force between the gas streams and the resin as the system tends towards thermodynamic equilibrium. For a given system temperature and gas phase moisture level, there exists an equilibrium relationship between the gas phase $CO_2$ concentration (partial pressure) and the number or fraction of resin sites occupied by $CO_2$. The resin's maximum effective transfer capacity can therefore be expressed as the difference in resin site occupancy under the different gas stream conditions, similar to the manner in which temperature swing adsorption capacity may be defined by the difference in site occupancy between points on different adsorption isotherms. FIG. 9 illustrates the relation between site occupancy and $CO_2$ partial pressure based on a Langmuir model using data from Wong, et al. (2013) (Excellion I-200 resin sheet; binding isotherm data collected at 25 C). At low gas moisture levels (5 ppt $H_2O$; ~16% Relative Humidity), the initial slope between site occupancy and gas phase $CO_2$ level is steep and "levels off" as it approaches saturation (>90% capacity). In this example, a fractional capacity of ~97% occupancy is reached at typical ambient $CO_2$ levels (~400 ppm). At higher moisture levels, the initial slope decreases and the "leveling off" occurs at lower occupancy level. At 20 ppt moisture level (~64% Relative Humidity), an equivalent occupancy level is not reached until the $CO_2$ level exceeds 3500 ppm.

FIG. 9 illustrates how the moisture swing capacity is defined by the operating conditions. Starting at point A1, the end of the adsorption cycle, the resin has been exposed to the ambient air stream (400 ppm $CO_2$ and 5 ppt $H_2O$) long enough for the $CO_2$ site occupancy to be approximately equal to the equilibrium level (~97%). As the gas flow through the bed is switched from the "dry" ambient air source to a "wet" greenhouse air source having an elevated $CO_2$ level (e.g., ~800 ppm), the system shifts from the 5 ppt isotherm curve to the 20 ppt isotherm curve, i.e., from point A1 to point X1, and starts the desorption step process. The gas phase $CO_2$ concentration immediately adjacent to the resin surface initially rises to near the equilibrium level (3500 ppm). As the $CO_2$ is swept away and the resin site $CO_2$ occupancy drops, the gas phase $CO_2$ tends towards the ambient level, and the system moves from point X1 to point D1 (~88% occupancy) along the 20 ppt isotherm curve. The net effect of movement along the isotherm is desorption of $CO_2$ and corresponding adsorption of $H_2O$. When the gas flows are switched back to the ambient source, the system moves from point D1 to point X2. During the adsorption step, the system moves along the 5 ppt isotherm, from X1 to A1, adsorbing $CO_2$ and releasing $H_2O$. At point A1, the moisture swing is complete, with the net effect being transfer of $CO_2$ from the ambient to the greenhouse and transfer of $H_2O$ in the reverse direction. The amount of $CO_2$ transferred (transfer capacity) is defined by the difference in site occupancy at points A1 and D1, or ~9% (97%-88%) of the overall sites available. The resin's capacity is determined by: (i) the relative positions of the respective isotherms (greater separation between the two curves corresponds to larger capacity) and (ii) the $CO_2$ concentration of the respective gas streams (low desorption $CO_2$ values correspond to larger transfer capacity).

Roughly 66 kg of "as delivered" resin are required to provide the target pilot scale capacity in this example. Initially the resin contains 50%-60% water, by weight. It loses most of the water during the first adsorption step and operates within a relatively narrow range of lower moisture loading during typical swing cycles. Normally, the resin bed's mass, and bulk density, is roughly half of the "as delivered" value. The resin bed depth is determined by the target bed pressure drop which, in turn, sets the resin bed's cross sectional area. For the pilot scale example, setting the operating pressure drop to 2.5 in. $H_2O$ translates to a 7.3" (0.185 m) resting bed height and a 5.65 ft$^2$ (0.525 m$^2$) cross sectional area. Depending on whether one or two resin beds are employed, the diameter of cylindrical beds would be 32.2" (0.818 m) or 22.8" (0.578 m), respectively.

The operating conditions (temperature, humidity and $CO_2$ levels) of the ambient and enclosed space air streams determine the effective resin bed capacity (gm $CO_2$/kg resin/swing cycle). The total resin volume is set by the target system capacity, the resin's per-swing capacity, and the cycle/swing duration. The resin bed depth is determined by the acceptable pressure drop (e.g., blower cost per unit $CO_2$ captured). The overall resin bed area is determined by the resin capacity (volume) and bed depth. The required air flow through the resin bed is determined by swing cycle time and the average concentration difference realized during the swing cycle. Individual resin bed dimensions are limited by screen and support costs; beyond a certain size, multiple resin beds will be needed.

Example 4

Capture Systems Comprising a Two-Stage, Recirculating Fluidized Bed Extractor

Two of the main challenges in capturing $CO_2$ from air in a carbon neutral or carbon negative fashion arise from the facts that the concentration of $CO_2$ in the atmosphere is very low (e.g., about 410 ppm (or about 350 times lower than the concentration of $CO_2$ found in coal-based flue gas)), and that many of the conventional technologies for capturing $CO_2$ pre- or post-combustion in flue gas applications perform poorly at such low $CO_2$ concentrations, with very low $CO_2$ uptake and poor $CO_2$ selectivity, thereby dictating that large volumes of air must be processed in order to capture significant quantities of carbon dioxide. For example, the density of air at sea level and 15° C. is approximately 1.225 kg/m$^3$. At an atmospheric concentration of 410 ppm, the volume of air that must be processed to capture 1 kg of $CO_2$ (at 100% efficiency) is therefore approximately $1/((410 \times 1.225)/(10^6)) \cong 2{,}000$ m$^3$. The requirement for handling large volumes of air comes at the expense of the energy consumption required to move the air past or through the sorbent material, the cost for which will in general scale with the pressure drop across the extractor used to contact the air with the sorbent. Another significant cost for many extractor systems is the energy cost associated with the use of a thermal swing or pressure jump mechanism to release $CO_2$ or other adsorbed species from the sorbent material.

Prototype systems have been built and tested that comprise the use of an immobilized quaternary ammonium cation-based solid sorbent for $CO_2$ capture through a reversible chemical reaction. Using amine-functionalized solid sorbents presents multiple advantages when compared to conventional methods for capturing $CO_2$ from flue gas based on, e.g., aqueous amine solutions. The latter deactivate rapidly when placed in contact with oxygen under the conditions required for regeneration. and suffer from significant solvent loss via evaporation as a consequence of being in contact with massive flows of air. Solid amine-based sorbents applied in a gas-solid process such as direct air capture (DAC) also exhibit much faster adsorption kinetics, higher $CO_2$ capacity, higher stability, and higher resistance to contaminants compared to aqueous amine solutions.

Figure 10:
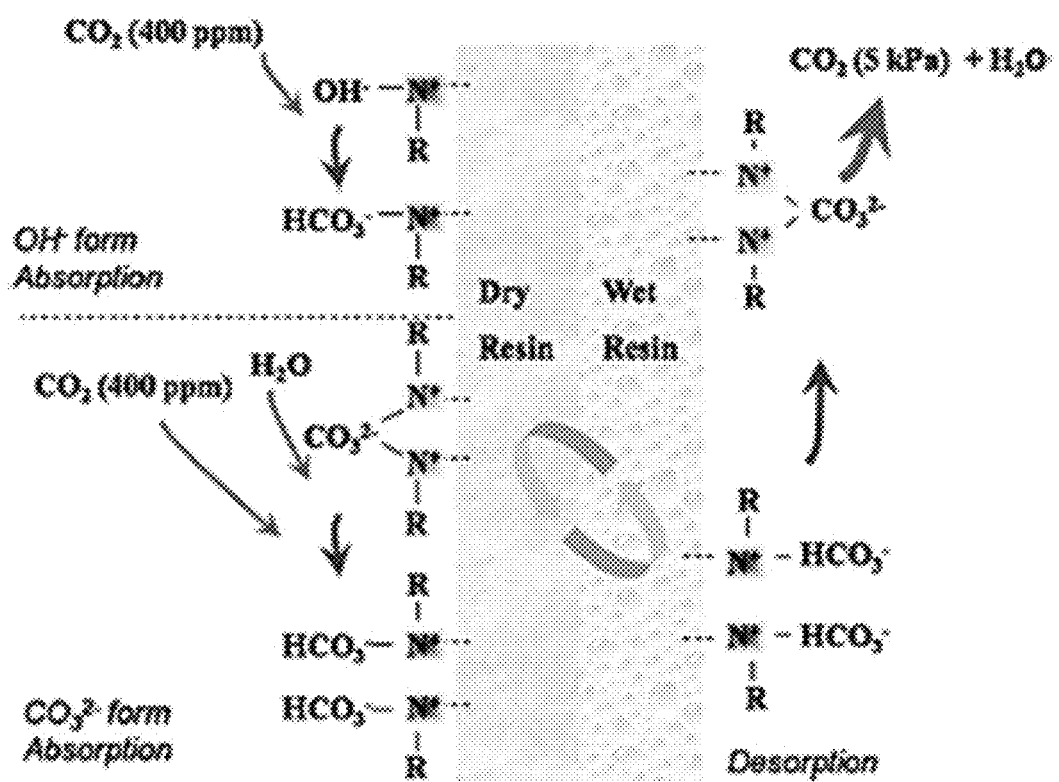
FIG. 10 provides a schematic illustration of the mechanism underlying a "moisture swing" release mechanism (from Wang, T., et al. (2011), "A Moisture Swing Sorbent for Carbon Dioxide Capture from Ambient Air", Environ. Sci. Technol. 45, 6670-6675).

One major advantage conferred by the use of specific amine-based solid sorbents, e.g., strong base, type II anion exchange materials, is the ability to implement a "moisture swing" (or "humidity swing") release mechanism whereby the sorbent is capable of adsorbing $CO_2$ when dry and releases the bound $CO_2$ when wet. As shown in FIG. 10, in dry conditions in the presence of $CO_2$, bicarbonate species are formed and bound to the resin. When the material is wetted, $CO_2$ is desorbed due to the formation of carbonate species. This approach uses the energy released during evaporation, thus avoiding the energy-consuming desorption step of temperature swing or vacuum swing release mechanisms. Although evaporation is spontaneous, it requires enthalpy, provided by the flow of air through the sorbent, and requires water losses estimated to be between 12 and 37 mol $H_2O$ per mol of $CO_2$ released. The moisture in this process may be applied in the form of a liquid, fine droplets (as in a spray or in a fog), or humidity.

Despite requiring little or no energy for release of $CO_2$ from the sorbent, humidity swing-based direct air capture (HS-DAC) processes have comparable carbon dioxide capture efficiency to other direct $CO_2$ capture methods. Preliminary results for a resin tested using an HS-DAC process yielded a $CO_2$ uptake in dry air of 0.86 mmol/g resin. Improvements to the resin used for HS-DAC have improved upon the early results, and recent data have yielded $CO_2$ uptakes of 2.26 mmol/g resin at 25° C., which is close to the highest level of $CO_2$ loading reported in the literature to date under direct air capture conditions (2.50 mmol/g resin). The HS-DAC process is completely reversible and repeatable, and because the desorption step doesn't require exposure to vacuum or high temperature, the lifetime of the sorbent may be significantly enhanced without diminished performance or material degradation.

Fluidized beds have been widely used for a variety of industrial applications (e.g., catalytic cracking, coal/biomass combustion and gasification), and provide high mass and heat transfer rates while maintaining very high contact efficiency between the gas and a solid sorbent material and minimizing pressure drops across the sorbent bed. We have tested quaternary ammonium cation-based solid sorbents in two bubbling fluidized bed (BFB) reactors adapted for the humidity swing DAC method. The first system was designed to operate at small scale (i.e., using gram scale quantities of sorbent) and enabled testing and screening of multiple sorbents and adsorption/desorption conditions. The second system was designed to work as a pilot demonstration unit to evaluate the performance of the sorbent on a much larger scale (i.e., using kilogram quantities of sorbent). This later system has generated test data that demonstrates the feasibility of the HS-DAC approach for designing and operating large scale direct air capture systems.

Single-stage fluidized bed extractor: FIG. 3 provides a schematic illustration of the first system, e.g., a BFB chamber, wherein the sorbent was contacted with ambient air. Thermo-couples and pressure sensors, as well as a see-through window, were installed to monitor the fluidized bed behavior. At the bottom and at the top of the BFB two screens were installed to prevent loss of sorbent. At the bottom of the BFB, gas inlets for $CO_2$-containing dry inlet air and moist air were installed, with individual valves and mass flow controllers installed to control the gas feed for the adsorption and desorption steps. A separate, electrically-heated moisture saturator was used to generate the moist air for desorbing $CO_2$ from the sorbent in system tests. $CO_2$ concentrations at the inlet and outlet of the BFB were continuously monitored using calibrated $CO_2$ analyzers Two-stage fluidized bed extractor system: Currently we are completing the engineering design of a full-scale commercial HS-DAC system in which carbon dioxide present in the inlet air is extracted by passing large volumes of inlet air through a first fluidized bed comprising the sorbent (at relatively low energy costs), and the adsorbed $CO_2$ is subsequently released at very low energy cost by using a humidity swing release mechanism, i.e., by contacting the sorbent with humid air. The design is related to one described by Zhang, et al. (2014), "Capturing $CO_2$ from ambient air using a polyethyleneimine—silica adsorbent in fluidized beds", Chem. Eng. Sci. 116:306-316, although the authors of that paper describe the use of a mesoporous silica-supported polyethyleneimine (PEI)—silica sorbent for $CO_2$ capture, and the use of a thermal swing release mechanism with or without the inclusion of moisture in the stripping gas to prevent thermal degradation of the sorbent at the high temperatures used for desorption.

Figure 11:
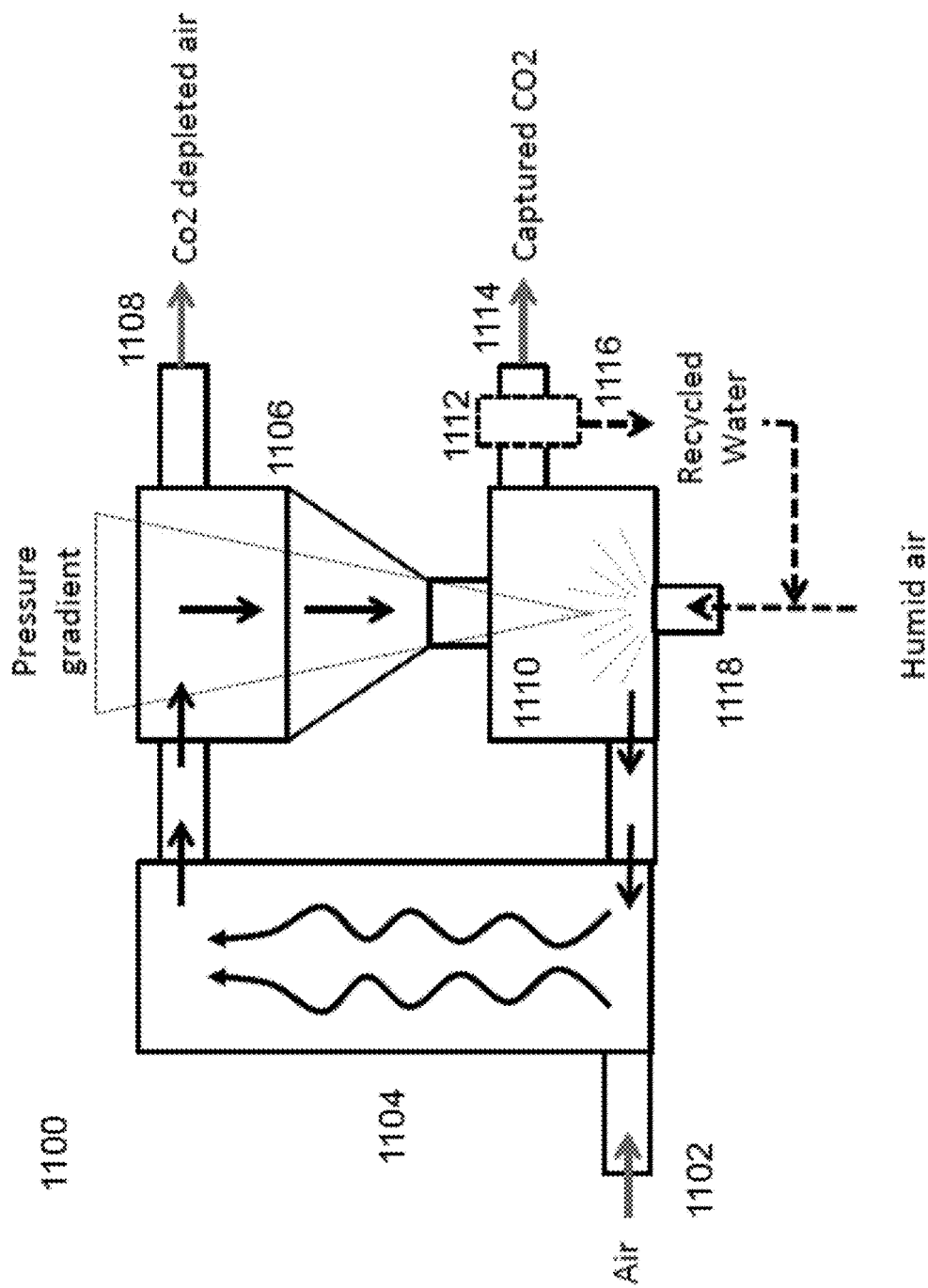
FIG. 11 shows a non-limiting schematic illustration of a two-stage fluidized bed system for capture of $CO_2$ from ambient air or indoor air and delivery to a condenser/concentrator, wherein the condenser/concentrator is configured to concentrate the $CO_2$ released from a sorbent, and to condense and recycle the water present in the humid air used to release $CO_2$ from the sorbent in the fluidized bed.

As illustrated in FIG. 11, one embodiment of the presently disclosed system 1100 comprises a first stage circulating fluidized bed (CFB) absorber 1104 to capture the $CO_2$ from ambient air (which enters the system through inlet 1102), a cyclone separator 1106 to separate the $CO_2$-loaded sorbent particles from the $CO_2$-depleted air (which exits the system through outlet 1108), and a second stage BFB desorber 1110 to release the bound $CO_2$ (which exits the system via condenser/concentrator 1112 and exits through outlet 1114) and regenerate the sorbent. A loop seal enables the regenerated sorbent to return to CFB adsorber. The decision to use separate chambers operating as CFB and BFB stages was based on the different kinetic requirements for adsorption and desorption. In one non-limiting example, the CFB adsorber 1104 is designed to have a cross-sectional area of approximately 113 $m^2$ (12 meter diameter) and a height of 40 meters, both of which are fairly typical dimensions for industrial-scale CFB-based facilities. The height was chosen to ensure sufficient gas—solid contact time with an air intake velocity of approximately 4 meters/sec. In this non-limiting example, a cylindrical BFB desorber 1110 with a smaller dimension of 4 meters in diameter and 5 meters in height was designed to act as the regenerator (desorber) for the sorbent. As the stripping gas (humid air) has a much smaller flow rate, the BFB desorber is operated in the bubbling fluidization regime. Condenser/concentrator 1112 is configured to concentrate the $CO_2$ released from a sorbent (which exits the system via outlet 1114), and to condense and recycle the water present in the humid air used to release $CO_2$ from the sorbent (which exits the system via outlet 1116). In some instances, the recycled water may be used to hydrate air to create or supplement the humid air introduced to the BFB desorber 1110 through inlet 1118. In some instances, the recycled water may be sprayed directly on the sorbent within the BFB desorber 1110 (dotted lines) through one or more spray nozzles connected to inlet 1118 or otherwise incorporated into the BFB desorber 1110 to facilitate the release of $CO_2$ from the sorbent. In some instances, water from another source (or in combination with the recycled water) may be used to humidify air introduced through inlet 1118 or may be sprayed directly on the sorbent within the BFB desorber 1110.

In some embodiments, the sorbent used in the fluidized beds, e.g., an anion exchange material or resin, is contacted with a stream of the inlet air entering the first fluidized bed (i.e., the CFB reactor 1104) which may be ambient (i.e., atmospheric) air or indoor air. In some embodiments, the ambient air or indoor air may be pre-conditioned to maintain a temperature and/or humidity within a specified range. In some embodiments, the system may be operated in geographical locales where the humidity of ambient air or indoor air is typically very low such that no pre-conditioning is required.

In some embodiments, a pressure gradient (dotted triangle) may be applied across the cyclone separator 1106 (e.g., comprising a reduced pressure near the outlet of the separator) to facilitate separation of $CO_2$-loaded sorbent particles from the $CO_2$-depleted air. In some instances, the reduced pressure near the outlet of the separator may be about 750 Torr, about 725 Torr, about 700 Torr, about 675 torr, about 650 Torr, about 625 Torr, about 600 Torr, about 575 Torr, about 550 Torr, about 525 Torr, about 500 Torr, or lower. In some embodiments, the connection between the outlet of the cyclone separator 1106 and the inlet of the BFB desorber 1110 may be sealed, and a vacuum applied to the sorbent within the desorber (as described previously) to facilitate release of $CO_2$ from the sorbent particles and provide a more concentrated stream of $CO_2$. In some embodiments, the temperature of the interior of the BFB desorber 1110 may be elevated (e.g., to about 40° C.) to facilitate release of $CO_2$ from the sorbent particles. In some instances, elevating the temperature within the BFB desorber 1110 may offset an air temperature decrease (e.g., about 10-15° C.) incurred as the air passes through CFB adsorber 1104.

In some embodiments, the humid air used for releasing bound $CO_2$ form the sorbent may be humid air delivered via inlet 1118 from a greenhouse (or other biomass growing system). In some embodiments, the air stream or concentrated gas stream comprising the released $CO_2$ is passed from the second fluidized bed (i.e., the BFB reactor 1110) back to a greenhouse or other biomass growing system via outlet 1114.

In some embodiments, the system 1100 illustrated in FIG. 11 may be configured to deliver the captured $CO_2$ to a storage tank and stored for later use. In some embodiments, the system may be configured to deliver the captured $CO_2$ to a secondary process, e.g., for production of synthetic fuels or other products (or any of the other secondary processes outlined above). In yet other embodiments, the system may be configured to deliver the captured $CO_2$ to a greenhouse or other biomass growing system, where enhanced levels of carbon dioxide may facilitate the rate of plant growth.

As illustrated in FIG. 11, in some embodiments the system may comprise a condenser 1112 for condensing and recycling the water present in the humid air after contacting it with the sorbent, thereby enabling its reuse, e.g., for irrigation purposes.

Conversion or sequestration of captured $CO_2$: In some embodiments, the system 1100 depicted in FIG. 11 may be used to capture $CO_2$ from the atmosphere and deliver it for conversion to useful products, to stimulate growth of plants or other sources of biomass (e.g., algae), or to sequester it, e.g., by converting it to a form that may be safely mixed into the soil.

For example, in one preferred embodiment, a direct air capture system as depicted in FIG. 11 or as described elsewhere in this disclosure may be connected to, or integrated with, a controlled environment agriculture (CEA) system optimized for growing *Lemna*, a rapidly growing aquatic plant that has been widely used as a feedstock for raising domestic animals and may also be processed to produce starch and protein. Closed growing systems prevent water loss, and enable water and nutrient recycling. In chambers comprising high concentrations of $CO_2$, the growth rate of *Lemna* can be increased several fold over its rate in ambient concentrations. Under optimal conditions, *Lemna* may produce 64 grams of biomass per gram starting weight in a week. At carbon dioxide concentrations of 1500 ppm, we have achieved biomass growth rates of 8× every 24 to 48 hours.

In addition to providing a valuable feedstock, the growth of *Lemna* in environmentally-controlled systems supplied with $CO_2$ by a direct air capture system also provides a means for sequestering excess $CO_2$. Plants draw down $CO_2$ present in the atmosphere. About half is returned to the atmosphere by plant respiration, while the rest is converted into new biomass via photosynthesis. The remaining $CO_2$ trapped in biomass is eventually released back in the atmosphere upon decomposition. Intercepting the carbon cycle and trapping the carbon fixed by plants in a stable form provides a means for creating an efficient carbon sink that helps to reduce atmospheric $CO_2$.

Pyrolysis is an example of a process for trapping the carbon captured by plants in a stable form. During pyrolysis, organic material is heated in the absence of oxygen and thermo-chemically converted into carbon-rich solid (biochar) and volatile matter (syngas and bio-oil). Through the use of pyrolysis, "labile" biomass carbon—carbon that is easily degraded and recycles continuously in the biosphere—can be converted into "recalcitrant" carbon which resists degradation and can be safely sequestered in soil. While biogenic organic materials provide only temporary carbon storage—with an estimated half-life of only weeks—carbon in the form of biochar can be stable in soil for tens of thousands of years. Estimates of the amount of land available to receive converted carbon in the form of biochar suggest that between 80 and 270 gigatons of carbon could be sequestered in the soil, a range that is similar to estimates of the current atmospheric imbalance of $CO_2$ of about 220 gigatons. Sequestering carbon in the form of biochar returned to soil has the additional benefit of activating existing natural carbon sinks by enhancing soil quality and restoring the complex soil ecosystem. Addition of biochar to soil increases plant growth, improves the soil's physical properties, enhances soil moisture storage, increases pH in acidic soil, reduces nutrient-loss as well as methane-release in hydromorphic soil, enhances microbial and mycorrhizal growth, and accelerates nitrification with the net effect of promoting the accumulation of humic materials.

*Lemna* are extremely amenable to pyrolysis conversion, and the biochar obtained from *Lemna* is light and highly porous—ideal for soil priming. Analysis of *Lemna* pyrolysis products has shown that biochar is the most prevalent product, with an average yield of 48%, closely followed by bio-oil (38%) and syngas (13%). Syngas is highly valuable as it can be used to produce electricity or converted into biofuel(s). Bio-oil and syngas obtained from *Lemna* pyrolysis are highly valuable as they can be transformed into bio-diesel and bio-fuels using well established Fischer-Tropsch (FT) technology at a scale that could be economically competitive with petroleum based processes.

*Lemna* growing systems: As noted, in some embodiments, a direct air capture system of the present disclosure, such as the one illustrated in FIG. 11, may be connected to or integrated with a system designed and optimized for growing *Lemna* that is sustainable, environmentally sound, economically feasible, and optimized for productivity. In some embodiments, the system design may comprise the use of vertical closed-system greenhouses with minimal water and nutrient recycling and with minimal carbon emissions. The use of such a closed-system may also enable one to locate and operate these systems on marginal land, thereby minimizing or eliminating the impact on the use of valuable arable land.

State-of-the art controlled environment technologies may be integrated with the disclosed direct air capture systems to develop self-sustaining *Lemna* farms that have minimal impact on natural resources. In one embodiment, a *Lemna* farm may comprise one or more glass greenhouses each of which contain one or more high-density ventilated racks housing one or more tiers of *Lemna* growing chambers (e.g., 5 to 25 tiers per rack). In one embodiment, for example, each *Lemna* growing chamber may be about 2 meters long, 1 meter wide, and 0.2 meters tall. Each growing chamber may be filled to a level of about 5 cm with water and nutrients, with the remaining 15 cm of vertical space within the chamber dedicated to air circulation. In some embodiments, *Lemna* will be collected continuously, drained, and transported to external collecting containers where it will be dried. The ventilated racks will deliver water and nutrients to each *Lemna* chamber, as well as air enriched with $CO_2$. In some embodiments comprising integrated aquaponics systems for raising fish, as will be described below, the amount of additional nutrients required may be very low given the supply of nutrients provided by the fish. The racks may also contain the plumbing for collecting and harvesting the *Lemna*.

Overall this system design may enable one to dramatically reduce the gas exchange volume, the use of water, and the amount of nutrients required, while expanding the growing surface by factors of 5× to 25× compared to a ground-level pond. The system thus provides, for example, a growth capacity equivalent to that of a 1,000 ha surface in an actual footprint of 40 ha.

The system design may also include LED lights and infrared cameras to maximize and monitor growth, to reduce handling requirements, and importantly, to decouple *Lemna* growth from natural sunlight, thereby enabling growth of *Lemna* in some embodiments of the disclosed system in regular temperature-controlled buildings rather than in expensive glass greenhouses.

The *Lemna* growing system will require access to both water and energy. In some embodiments, energy may be supplied by a photovoltaic heliostat system, e.g., a 2,000 megawatt system. In some embodiments, water may be supplied by a desalination system.

The growth of *Lemna* year round under controlled conditions may enable one to double or more than double the yield compared to growth in open ponds (e.g., 30 to 150 tons/ha/year). The combined use of aquaponics and controlled environment agriculture will further optimize growth and increase it by a factor of at least 3-fold.

As noted above, in some embodiments the integration of the *Lemna* growing system with an aquaponics system for raising fish may reduce the nutrient requirements of the overall system. Fish tanks will be located in an adjacent area within the *Lemna* growth facility. *Lemna* and other duckweed family members have been grown for centuries as feeding stock for animals and fish. Their optimal amino acid balance and high protein content (as high as 35-45%) make them an ideal food. *Lemna* can be fed directly to fish such as tilapias and carp, or it can be dried and incorporated into a custom pelleted feed. The ability of *Lemna* to efficiently absorb ammonia, nitrate, phosphorous, and potassium, as well as other waste products of intensive fresh water fish cultures, such as magnesium, calcium, sodium, chlorine, boron, and iron make these plants ideal for integrated aquaponic systems. *Lemna* can remove up to 99% of nutrients and dissolved solids in wastewater. Tilapia and/or carps will be grown in containers connected to a water/nutrient recirculating system. The fish tanks will provide the vast majority of nutrients (80%) required for *Lemna* to grow. *Lemna*, on the other hand, will then remove and consume nearly all of the fish waste products and convert them into biomass that subsequently becomes a high protein food for the fish. As the water is fed directly to the roots of the plants and then re-circulated to the fish tanks, the system uses much less water than traditional agriculture. This low energy, low water-use system provides a natural, sustainable and economically valuable approach to intensive *Lemna* growth.

Use of captured carbon dioxide in secondary processes: In some embodiments, carbon dioxide captured from ambient air (i.e., outdoor air or atmospheric air) may be used in any of a variety of secondary processes known to those of skill in the art not only to sequester the captured $CO_2$ and prevent its re-release to the atmosphere, but to produce useful and commercially-important products. Any of the sorbents, methods, and system configurations for direct air capture of carbon dioxide described herein, or in U.S. Pat. Nos. 7,655,069 B2; 7,708,806 B2; 7,993,432 B2; 8,083,836 B2; 8,088,197 B2; 8,133,305 B2; 8,221,527 B1; 8,246, 723 B2; 8,262,774 B2; 8,273,160 B2; 8,337,589 B2; 8,715,393 B2; 8,999,279 B2; 9,205,372 B2; 9,266,051 B2; 9,266,052 B2; 9,527,747 B2; 9,616,375 B2; 9,861,933 B2; 10,010,829 B2 or related foreign applications, may be used to capture carbon dioxide from the outdoor environment or, in some instances, from other sources, e.g., indoor air, an exhaust gas, a flue gas, etc.

Thus the present disclosure includes general methods and apparatus for capturing $CO_2$ from a gas and using it in a secondary process. The disclosed methods for removing carbon dioxide from a gas and utilizing said carbon dioxide in a secondary process will generally comprise: a) contacting a sorbent material with the gas to capture carbon dioxide; b) releasing carbon dioxide from the sorbent material in a concentrated form; and c) utilizing the concentrated carbon dioxide in a secondary process. In some embodiments, the sorbent material may comprise a solid sorbent that comprises an amine. In some embodiments, the sorbent material may comprise an anion exchange material. In some preferred embodiments, the sorbent material may comprise a strong base, Type II anion exchange material. In some preferred embodiments, the gas is contacted with the sorbent material in a fluidized bed reactor. In some embodiments, the carbon dioxide is released from the sorbent material by subjecting the sorbent material to a change in temperature, pressure, humidity, or any combination thereof. In some preferred embodiments, the carbon dioxide is released from the sorbent material by subjecting the sorbent material to a change in humidity, or by wetting the sorbent material with water, steam, or an aqueous solution.

Similarly, the disclosed apparatus for removing carbon dioxide from a gas and utilizing said carbon dioxide in a secondary process will generally comprise: a) an extractor comprising a sorbent material capable of capturing carbon dioxide from the gas; b) a gas flow mechanism configured to contact the sorbent material within the extractor with a stream of the gas; c) a carbon dioxide release mechanism configured to release and concentrate carbon dioxide captured by the sorbent; and d) a carbon dioxide delivery mechanism to deliver concentrated carbon dioxide to a secondary process. Again, in some embodiments, the sorbent material may comprise a solid sorbent that comprises an amine. In some embodiments, the sorbent material may comprise an anion exchange material. In some preferred embodiments, the sorbent material may comprise a strong base, Type II anion exchange material. In some preferred embodiments, the gas is contacted with the sorbent material in an extractor comprising a fluidized bed reactor design. In some embodiments, the carbon dioxide is released from the sorbent material using a release mechanism configured to subject the sorbent material to a change in temperature, pressure, humidity, or any combination thereof. In some preferred embodiments, the release mechanism is configured to release carbon dioxide from the sorbent material by subjecting the sorbent material to a change in humidity, or by wetting the sorbent material with water, steam, or an aqueous solution.

There are a wide variety of existing and emerging secondary processes that utilize carbon dioxide for commercial purposes in producing useful products. Examples include, but are not limited to, enhanced oil recovery (EOR), urea yield boosting, enhanced geothermal systems, polymer processing, algae cultivation, carbonate mineralization, $CO_2$ concrete curing, bauxite residue carbonation, $CO_2$ as a feedstock for liquid fuel production, and enhanced coal bed methane recovery.

A more detailed but still non-limiting list of existing and emerging secondary processes for utilizing carbon dioxide captured from ambient air or other sources is provided in Table 1.

TABLE 1

Existing and emerging processes that utilize carbon dioxide (adapted from "Global CCS Institute - $CO_2$ Reuse Technologies")

| Existing & Emerging Uses | Brief Description |
|---|---|
| Enhanced oil recovery (EOR) | $CO_2$ is injected into depleted oil fields as a solvent that reduces the viscosity of the oil, thus enabling it to flow more easily to the production well. Once production is complete, the $CO_2$ can potentially be permanently stored in the reservoir. |
| Urea yield boosting (non-captive use only)* | Additional $CO_2$ obtained from an external source can be compressed and combined with surplus ammonia during urea production from natural gas to produce additional urea. |

TABLE 1-continued

Existing and emerging processes that utilize carbon dioxide (adapted from "Global CCS Institute - $CO_2$ Reuse Technologies")

| Existing & Emerging Uses | Brief Description |
| --- | --- |
| Other oil and gas industry Applications | Liquid $CO_2$ is used as a fluid for the stimulation/fracturing of oil and gas wells. |
| Beverage carbonation | Carbonation of beverages with high-purity $CO_2$. |
| Wine making | $CO_2$ is used as a seal gas to prevent oxidation of wine during maturation. $CO_2$ is also produced during the fermentation process, and is often already captured on-site for reuse for its inert gas properties. |
| Food processing, preservation and packaging | $CO_2$ is used for various applications in the food industry, including cooling while grinding powders such as spices, or as an inert atmosphere to prevent food spoilage. In packaging applications, $CO_2$ is used in modified atmosphere packaging (MAP) of products such as cheese, poultry, snacks, produce and red meat, or in controlled atmosphere packaging (CAP) of food products to extend shelf life. |
| Coffee decaffeination | Supercritical $CO_2$ is used as the solvent for decaffeinating coffee. |
| Pharmaceutical processes | Use of $CO_2$ in the pharmaceutical industry may overlap with other uses identified, as it typically includes inerting, chemical synthesis, supercritical fluid extraction, product transportation at low temperature, and acidification of wastewater. |
| Horticulture | $CO_2$ is provided to greenhouses to maintain optimal $CO_2$ concentration and maximize plant growth rate. |
| Pulp and paper processing | $CO_2$ is used to reduce pH during pulp washing operations. |
| Water treatment | $CO_2$ is used for re-mineralization of water following reverse osmosis and for pH control (reduction). |
| Inerting | $CO_2$ is used in a wide range of applications where the physical properties of an inert gas are desirable. This includes applications covered under other use categories, such as a welding shielding gas, and as a gas used in food packaging and in wine production. |
| Steel manufacture | $CO_2$ is used in a minority of basic oxygen furnaces as a bottom stirring agent. It is also used for dust suppression. |
| Metal working | Used for varied purposes, including chilling parts for shrink fitting, and hardening of sand cores and molds. |
| Supercritical $CO_2$ as a solvent | $CO_2$ is useful for high-pressure extraction and as a solvent to isolate targeted compounds, such as fragrances and flavors. |
| Electronics | Printed circuit board manufacture uses small quantities of $CO_2$ in niche applications, predominantly as a cleaning fluid. |
| Pneumatics | Pneumatic applications for $CO_2$ include use as a portable power source (pressurized gas) for pneumatic hand tools and equipment, as well as a power source for paintball guns and other recreational equipment. |
| Welding | Used as a shrouding gas to prevent oxidation of the weld metal. |
| Refrigerant gas | $CO_2$ is used as the working fluid in refrigeration plant, particularly for larger industrial air conditioning and refrigeration systems. |
| Fire suppression technology | When applied to a fire, $CO_2$ provides a heavy blanket of gas that reduces the oxygen level to a point where combustion cannot occur. $CO_2$ is used in fire extinguishers, as well as in industrial fire protection systems. |
| Enhanced coal bed methane recovery (ECBM) | In $CO_2$-ECBM, $CO_2$ is injected into coal seams, where it preferentially adsorbs onto the coal, displacing and releasing adsorbed methane, which can then be recovered at the surface. |
| Enhanced geothermal systems (EGS) - $CO_2$ as a working fluid | There are two ways in which supercritical $CO_2$ may be utilized in EGS geothermal power generation. Firstly, it may be used as the circulating heat exchange fluid. The benefit here is that the significant density difference between the cold $CO_2$ flowing down the injection well(s) and the hot $CO_2$ flowing up the production well (s) would eliminate the need for a circulation pump. Secondly, this concept could be extended, and the circulating $CO_2$ could also be used directly as the working fluid in a supercritical $CO_2$ power cycle. |

TABLE 1-continued

Existing and emerging processes that utilize carbon dioxide (adapted from "Global CCS Institute - $CO_2$ Reuse Technologies")

| Existing & Emerging Uses | Brief Description |
|---|---|
| Power generation - $CO_2$ as a working fluid | Supercritical $CO_2$ power cycles need not be limited to geothermal power plants, as the benefits of high efficiency and compact turbo machinery are not heat source-specific. The nuclear power industry is particularly interested in supercritical $CO_2$ power cycles for this reason. |
| Polymer processing | One example of $CO_2$ as a feedstock for polymer processing involves the transformation of carbon dioxide into polycarbonates using proprietary zinc based catalyst system. A variety of other process routes and end products have been proposed. |
| Chemical synthesis (excludes polymers and liquid fuels/hydrocarbons) | Carbon and oxygen are both key elements in organic chemistry. Consequently, there are a wide range of chemicals that can at least theoretically utilize $CO_2$ as a feedstock for production, including organic acids, alcohols, esters, and sugars. For example, acetic acid can be produced by direct catalysis of $CO_2$ and methane. |
| Algal bio-fixation | The productivity of algal cultivation systems can be increased significantly (up to a saturation point) by the injection/addition of $CO_2$ to the growth medium/solution. |
| Mineralization | |
| Calcium carbonate and magnesium carbonate | Mildly concentrated $CO_2$ is contacted with mineral-loaded alkaline brine. The $CO_2$ present in the gas precipitates out as mineral carbonates (limestone/dolomite equivalent precipitates). The resulting product can be further processed to form an aggregate equivalent product for the construction industry, and can also potentially displace a small portion of Portland Cement in concrete. |
| Baking soda (sodium bicarbonate) | A variant of mineralization wherein $CO_2$ is contacted with sodium rich brine, resulting in the formation of sodium bi-carbonate ($NaHCO_3$). |
| $CO_2$ concrete curing | This technology is focused on precast concrete production facilities, where $CO_2$ is permanently stored as un-reactive limestone within the concrete. This also limits the need for heat and steam in the curing process. The result is a reduction in emissions of $CO_2$ equivalent to up to 120 kg of $CO_2$ per tonne (286 lbs. $CO_2$ per US ton) of precast concrete. |
| Bauxite residue treatment ('red mud') | The extraction of alumina from bauxite ore results in a highly alkaline bauxite residue slurry known as 'red mud'. Concentrated $CO_2$ can be injected into the red mud slurry to partially neutralize the product, improving its manageability, reducing its disposal costs and limiting its potential environmental impacts. In the neutralization process, the $CO_2$ is converted to mineral form (typically carbonates). The resulting product remains slightly alkaline, and has potential as a soil amendment for acidic soils. |
| Liquid fuels | |
| Renewable methanol | Electrolysis of water produces $H_2$. The $H_2$ is combined with captured $CO_2$, compressed and reacted over a catalyst at moderate temperature and pressure (~5 MPa, ~225° C.) to produce methanol and water. |
| Formic acid | Electro-reduction of $CO_2$ to produce formic acid (HCOOH) and $O_2$. Formic acid is used as a hydrogen carrier, with hydrogen the primary fuel. Formic acid has been classified as a liquid fuel as hydrogen is only released from the liquid formic acid as required. |
| Genetically engineered micro-organisms for direct fuel secretion | Engineered product-specific photosynthetic organisms circulate in a solution of micronutrients and brackish water, producing hydrocarbon products as a by-product of metabolism. Energy input is direct, un-concentrated solar energy. |
| $CO_2$ injection to conventional methanol synthesis | The yield of methanol from conventional methanol synthesis can be increased (some estimates suggest up to a 20 percent yield increase) by the injection of additional $CO_2$ upstream of the methanol reformer. |

*Unless otherwise stated, all references to urea production refer to the incremental additional production of urea from surplus ammonia and non-captive $CO_2$, e.g, the supply of $CO_2$ from a source external to the process and not that generated and subsequently used within the process itself.

Thus, a variety of secondary processes may benefit from utilization of $CO_2$ captured directly from the atmosphere or from other sources. For example, in some embodiments, the secondary process may comprise using the concentrated carbon dioxide to cure cement or concrete. In some embodiments, the secondary process may comprise using the concentrated carbon dioxide to form calcium carbonate, magnesium carbonate, or sodium bicarbonate. In some embodiments, the calcium carbonate or magnesium carbonate may be further processed to form an aggregate product for the construction industry. In some embodiments, as noted above, the secondary process may comprise using the concentrated carbon dioxide to enhance plant growth within a greenhouse environment. In some embodiments, the secondary process may comprise using the concentrated carbon dioxide to enhance the growth of aquatic plants or algae. In some embodiments, the aquatic plants may comprise plants of the *Lemna, Azolla,* or *Oryza* genera. In some embodiments, the aquatic plants or algae may be further utilized as feedstock for production of protein, starch or starch derivatives, animal feed, biofuel, bioplastic, biochar, syngas, graphene, energy, heat, or any combination thereof. In some embodiments, the secondary process may comprise using the concentrated carbon dioxide to produce methanol, formic acid, or syngas. In some embodiments, the secondary process may comprise using the concentrated carbon dioxide to produce carbon fiber, carbon nanotubes, fullerene, graphene, a polymer, or any combination thereof. In some embodiments, the polymer thus formed may comprise a polyurethane foam, a polycarbonate, or an acrylonitrile butadiene styrene. In some embodiments, the secondary process comprises using the concentrated carbon dioxide for enhanced oil recovery or enhanced coal bed methane recovery. In some embodiments, the gas may be ambient air, outdoor air, indoor air, an exhaust gas, or a flue gas.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in any combination in practicing the invention. It is intended that the following claims define the scope of the invention and that methods and structures within the scope of these claims and their equivalents be covered thereby.

What is claimed is:

1. An apparatus for capturing carbon dioxide from ambient air, the apparatus comprising:
   a) a first packed bed or fluidized bed extractor, wherein the packed bed or fluidized bed extractor comprises a humidity-sensitive sorbent that is capable of adsorbing carbon dioxide from a stream of ambient air at ambient temperature;
   b) a first air flow mechanism configured to contact the first packed bed or fluidized bed extractor with a stream of ambient air;
   c) a second air flow mechanism configured to contact the first packed bed or fluidized bed extractor with a stream of humid air;
   d) a *Lemna* growing system comprising a greenhouse that further comprises one or more vertical racks, each of which further comprises one or more growth chambers, each having *Lemna* disposed therein; and
   e) a controller configured to turn the first air flow mechanism and the second air flow mechanism on and off in an alternating fashion such that the stream of humid air delivers carbon dioxide released from the sorbent to the *Lemna* growing system.

2. The apparatus of claim 1, further comprising at least a second packed bed or fluidized bed extractor connected in series or in parallel to the first packed bed or fluidized bed extractor.

3. The apparatus of claim 1, wherein the sorbent comprises a strong base, type 2 anion exchange resin.

4. The apparatus of claim 1, wherein the second air flow mechanism does not contain a heating element.

5. The apparatus of claim 1, the sorbent being configured to undergo a drying or regeneration process following contact with the stream of humid air.

6. The apparatus of claim 1, wherein the controller is configured to turn the first air flow mechanism and the second air flow mechanism on and off in an alternating fashion at least 10 times per day.

7. The apparatus of claim 1, wherein the *Lemna* growing system comprises a bioreactor.

8. The apparatus of claim 1, wherein the only external energy input required is the energy used by the controller and the first and second air flow mechanisms to contact the sorbent material with ambient air or humid air in steps (b) and (c).

9. The apparatus of claim 1, wherein the released carbon dioxide is delivered to the enclosed environment at a rate of at least 10 kg $CO_2$ per day.

10. A system for capturing carbon dioxide from a gas or air, the system comprising:
    a) a first fluidized bed, wherein the first fluidized bed comprises a humidity-sensitive sorbent that is contacted with a stream of dry gas or air, and wherein the sorbent is capable of adsorbing carbon dioxide from the stream of dry gas or air;
    b) a second fluidized bed in fluid communication with the first fluidized bed, wherein the humidity-sensitive sorbent is contacted with a stream of humid gas or air such that adsorbed carbon dioxide is released from the sorbent;
    c) a *Lemna* growing system comprising a greenhouse that further comprises one ore more vertical racks, each of which further comprises one or more growth chambers, each having *Lemna* disposed therein; and
    wherein the humidity-sensitive sorbent is returned from the second fluidized bed to the first fluidized bed via a loop seal, and wherein the released carbon dioxide is delivered to the *Lemna* growing system.

11. The system of claim 10, further comprising a condenser for condensing moisture in the humid gas or air used to release the carbon dioxide from the sorbent.

12. The system of claim 10, wherein the humidity sensitive sorbent is a strong base, type II anion exchange resin.

13. The system of claim 10, wherein the stream of humid gas or air is delivered to the system from the greenhouse, and wherein the released carbon dioxide is delivered to the greenhouse.

14. The system of claim 10, wherein the vertical racks comprise plumbing for delivering carbon dioxide laden air or nutrients to each of the one or more growth chambers.

15. The system of claim 10, wherein the *Lemna* growing system further comprises an integrated aquaponics system for raising fish.

* * * * *